United States Patent
Wu et al.

(10) Patent No.: US 11,949,978 B2
(45) Date of Patent: Apr. 2, 2024

(54) IMAGE CONTENT REMOVAL METHOD AND RELATED APPARATUS

(71) Applicant: Huawei Technologies Co., Ltd., Shenzhen (CN)

(72) Inventors: Lei Wu, Shanghai (CN); Xu Zhang, Xi'an (CN); Minghui Yu, Shenzhen (CN); Yugang Chen, Shanghai (CN); Muchun Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/928,533

(22) PCT Filed: May 29, 2021

(86) PCT No.: PCT/CN2021/097045
§ 371 (c)(1),
(2) Date: Nov. 29, 2022

(87) PCT Pub. No.: WO2021/244455
PCT Pub. Date: Dec. 9, 2021

(65) Prior Publication Data
US 2023/0217097 A1 Jul. 6, 2023

(30) Foreign Application Priority Data
May 30, 2020 (CN) .......................... 202010481007.5

(51) Int. Cl.
*H04N 23/63* (2023.01)
*G06T 5/00* (2006.01)
(Continued)

(52) U.S. Cl.
CPC .......... *H04N 23/632* (2023.01); *G06T 5/005* (2013.01); *G06T 7/194* (2017.01); *H04N 23/611* (2023.01);
(Continued)

(58) Field of Classification Search
CPC .. H04N 23/632; H04N 23/611; H04N 23/633; H04N 23/64; H04N 23/6811;
(Continued)

(56) References Cited

U.S. PATENT DOCUMENTS

| 2005/0129324 A1* | 6/2005 | Lemke .................. G06V 10/26 382/284 |
|---|---|---|
| 2015/0015678 A1 | 1/2015 | Kato |
| 2015/0042837 A1 | 2/2015 | Chen et al. |

FOREIGN PATENT DOCUMENTS

| CN | 105827952 A | 8/2016 |
|---|---|---|
| CN | 106210542 A | 12/2016 |

(Continued)

*Primary Examiner* — Yogesh K Aggarwal
(74) *Attorney, Agent, or Firm* — Slater Matsil, LLP

(57) ABSTRACT

This application discloses an image content removal method, and relates to the field of computer vision. The method includes: enabling a camera application; displaying a photographing preview interface of the camera application; obtaining a first preview picture and a first reference frame picture that are captured by a camera; determining a first object in the first preview picture as a to-be-removed object; and determining to-be-filled content in the first preview picture based on the first reference frame picture, where the to-be-filled content is image content that is of a second object and that is shielded by the first object in the first preview picture. The terminal generates a first restored picture based on the to-be-filled content and the first preview picture. In this way, image content that a user does not want in a picture or a video shot by the user can be removed.

19 Claims, 62 Drawing Sheets

(51) Int. Cl.
  *G06T 7/194* (2017.01)
  *H04N 23/60* (2023.01)
  *H04N 23/611* (2023.01)
  *H04N 23/68* (2023.01)
  *G06V 10/74* (2022.01)
  *G06V 10/77* (2022.01)
  *H04N 23/667* (2023.01)

(52) U.S. Cl.
  CPC ........... *H04N 23/633* (2023.01); *H04N 23/64* (2023.01); *H04N 23/6811* (2023.01); *H04N 23/6812* (2023.01); *G06T 2207/20021* (2013.01); *G06V 10/761* (2022.01); *G06V 10/7715* (2022.01); *H04N 23/667* (2023.01)

(58) Field of Classification Search
  CPC .. H04N 23/6812; H04N 23/667; G06T 5/005; G06T 7/194; G06T 2207/20021; G06V 10/761; G06V 10/7715
  See application file for complete search history.

(56) References Cited

FOREIGN PATENT DOCUMENTS

| | | |
|---|---|---|
| CN | 106937055 A | 7/2017 |
| CN | 107343149 A | 11/2017 |
| CN | 108566516 A | 9/2018 |
| CN | 110443764 A | 11/2019 |
| CN | 110728270 A | 1/2020 |
| JP | 6104066 B2 | 3/2017 |
| WO | 2014013673 A1 | 1/2014 |

\* cited by examiner

Selfie stick

First target image

First area

Second target image

First reference image

Second reference image

Mask map of the second target image

Third target image

Fourth target image

First target feature map

First reference feature map

IMAGE CONTENT REMOVAL METHOD AND RELATED APPARATUS

CROSS-REFERENCE TO RELATED APPLICATIONS

This application is a national stage of International Application No. PCT/CN2021/097045, filed on May 29, 2021, which claims priority to Chinese Patent Application No. 202010481007.5, filed on May 30, 2020. Both of the aforementioned applications are hereby incorporated by reference in their entireties.

TECHNICAL FIELD

This application relates to the field of computer vision, and in particular, to an image content removal method and a related apparatus.

BACKGROUND

With development of smartphones, picture and video shooting has become one of the most important features. As photographing functions of the smartphones become increasingly powerful, more people use the smartphones to replace cameras to shoot pictures. To provide a wider shooting angle, a smartphone may be usually fixed on an extendable selfie stick, and an extension amount of the extendable stick is freely adjusted to implement shooting selfies at a plurality of angles. However, when the selfie stick is used to shoot a selfie, a part of the selfie stick may be photographed. To be specific, the selfie stick may exist in a shot picture or video, affecting user experience.

In an existing solution, to remove the selfie stick from the shot picture or video, a shooting terminal is provided with a dual-fisheye lens. To be specific, the shooting terminal is provided with two camera lenses each having a shooting angle of 180°, to jointly form a shooting range of approximately 200°. When the selfie stick is located in a shooting dead angle of the two camera lenses, the shooting terminal can hide the selfie stick by cropping and stitching pictures shot by the two 180° camera lenses. However, when a specific deviation angle is generated between the selfie stick and the two camera lenses, a part of the selfie stick remains visible in a picture obtained through cropping and stitching by the shooting terminal. In the existing solution, the selfie stick can be completely removed only when the shooting terminal has a special camera hardware configuration and the selfie stick has a special placement position. This selfie stick removal condition is exacting and cannot be applicable to most shooting terminals.

SUMMARY

This application provides an image content removal method and a related apparatus, so that image content that a user does not want can be removed from a picture or a video shot by the user on a terminal having no special camera, to improve a display effect of image content that the user wants in the picture or the video, and improve user experience.

According to a first aspect, this application provides an image content removal method, including: A terminal enables a camera application. The terminal displays a photographing preview interface of the camera application. The terminal obtains a first preview picture and a first reference frame picture that are captured by a camera. Both the first preview picture and the first reference frame picture include image content of a first object and image content of a second object. In the first preview picture, the image content of the first object shields a partial image of the second object. The terminal determines the first object in the first preview picture as a to-be-removed object. The terminal determines to-be-filled content in the first preview picture based on the first reference frame picture, where the to-be-filled content is image content that is of the second object and that is shielded by the first object in the first preview picture. The terminal generates a first restored picture based on the to-be-filled content and the first preview picture, where in the first restored picture, the image content of the first object is replaced with the shielded image content of the second object. The terminal displays the first restored picture in the photographing preview interface.

According to the image content removal method provided in this application, during photographing, the terminal can obtain a preview picture and a reference frame picture through the camera, and remove, from the preview picture based on the reference frame picture, image content (for example, a selfie stick) that a user does not want, so that a display effect of image content that the user wants in the picture or a video can be improved, and user experience is improved.

In a possible implementation, after the terminal displays the first restored picture in the photographing preview interface, the method further includes: The terminal displays a removal disabling control in the photographing preview interface. The terminal receives a first input of a user for the removal disabling control. In response to the first input, the terminal obtains a second preview picture captured by the camera. The terminal displays the second preview picture in the photographing preview interface. In this way, the terminal can disable a removal function for a specified object in a preview picture according to a requirement of the user.

In a possible implementation, before the terminal obtains the first preview picture and a reference frame picture that are captured by the camera, the method further includes: The terminal displays a third preview picture in the photographing preview interface. The terminal displays a removal confirmation control after identifying that the third preview picture includes the to-be-removed object. The terminal receives a second input of a user for the removal confirmation control. That the terminal obtains a first preview picture and a first reference frame picture that are captured by a camera specifically includes: In response to the second input, the terminal obtains the first preview picture and the first reference frame picture that are captured by the camera. In this way, the terminal can remove a first object from a preview picture after user confirmation.

In a possible implementation, the method further includes: In response to a third input, the terminal displays a countdown for specified duration in the photographing preview interface. In this way, a countdown can be displayed before a first object in a preview picture is removed, so that a user can perceive processing time.

In a possible implementation, before the terminal displays the first restored picture in the photographing preview interface, the method further includes: The terminal displays a third preview picture in the photographing preview interface. The terminal receives a tap operation performed by a user on the third preview picture. That the terminal determines the first object in the first preview picture as a to-be-removed object specifically includes: In response to the tap operation, the terminal identifies a tap position of the tap operation on the third preview picture. The terminal determines the first object as the to-be-removed object based on image content at the tap position in the third preview picture. In this way, the terminal can determine, based on the tap operation of the user, an object that the user wants to remove.

In a possible implementation, before the terminal displays the first restored picture in the photographing preview interface, the method further includes: The terminal displays a third preview picture in the camera application interface. The terminal identifies image content of one or more removable objects in the third preview picture, and displays a removal control corresponding to the removable object. The terminal receives a fourth input of a user for a first removal control in one or more removal controls. That the terminal determines the first object in the first preview picture as a to-be-removed object specifically includes: In response to the fourth input, the terminal determines the first object corresponding to the first removal control as the to-be-removed object. In this way, the terminal can identify all removable objects in a preview picture, and provide a user with a prompt, so that the user can select a to-be-removed object.

In a possible implementation, before the terminal obtains the first preview picture and the first reference frame picture that are captured by the camera, the method further includes: The terminal displays a first shooting mode control in the photographing preview interface. The terminal receives a fifth input of a user for the first shooting mode control. That the terminal obtains a first preview picture and a first reference frame picture that are captured by a camera specifically includes: In response to the fifth input, the terminal obtains the first preview picture and the first reference frame picture that are captured by the camera. In this way, the terminal can enable an object removal function in a specific shooting mode.

In a possible implementation, before the terminal obtains the first preview picture and the first reference frame picture that are captured by the camera, the method further includes: The terminal displays a picture shaking prompt when the terminal determines that a picture shot by the terminal experiences a large range of motion, where the picture shaking prompt provides a user with a prompt that the picture shot by the terminal experiences a large range of motion. In this way, the terminal can obtain user cooperation, to ensure removal quality of the object.

In a possible implementation, that the terminal determines that a picture shot by the terminal experiences a large range of motion specifically includes: The terminal obtains angular velocity data and acceleration data of the terminal by using an inertial measurement unit. When an angular velocity in any direction in the angular velocity data is greater than a specified angular velocity value, or an acceleration in any direction in the acceleration data is greater than a specified acceleration value, the terminal determines that the picture shot by the terminal experiences a large range of motion. In this way, the terminal can detect a picture range of motion based on motion data.

In a possible implementation, before the terminal obtains the first preview picture and the first reference frame picture that are captured by the camera, the method further includes: The terminal displays a third preview picture in the camera application interface. The terminal displays a movement operation prompt when identifying that the third preview picture includes the specified image content, where the movement operation prompt prompts a user to move the terminal in a specified direction. That the terminal determines the to-be-filled content in the first preview picture based on the first reference frame picture specifically includes: When the terminal determines that a picture range of motion between the first preview picture and the first reference frame picture exceeds a specified threshold, the terminal determines the to-be-filled content in the first preview picture based on the first reference frame picture. In this way, the terminal can prompt the user to move the terminal in a specified direction, to ensure a removal effect of an object in a preview picture.

In a possible implementation, that the terminal determines that a picture range of motion between the first preview picture and the first reference frame picture exceeds a specified threshold specifically includes: The terminal generates a first mask map after segmenting the first object from the first preview picture. The terminal generates a second mask map after segmenting the first object from the first reference frame picture. The terminal calculates an intersection over union between the first mask map and the second mask map, and when the intersection over union between the first mask map and the second mask map is less than a specified intersection over union value, the terminal determines that the picture range of motion between the first preview picture and the first reference frame picture exceeds the specified threshold.

In a possible implementation, that the terminal determines that a picture range of motion between the first preview picture and the first reference frame picture exceeds a specified threshold specifically includes: The terminal identifies the first object in the first preview picture, and segments the first object from the first preview picture. The terminal identifies the first object in the first reference frame picture, and segments the first object from the first reference frame picture to obtain a second reference frame picture. The terminal encodes, into a first target feature map, a first preview picture obtained after the first object is segmented off. The terminal encodes the second reference frame picture into a first reference feature map. The terminal calculates a similarity between the first target feature map and the first reference feature map, and when the similarity between the first target feature map and the first reference feature map is less than a specified similarity value, the terminal determines that the picture range of motion between the first preview picture and the first reference frame picture exceeds the specified threshold.

In a possible implementation, the method further includes: The terminal receives a fifth input of a user. The terminal locally saves the first restored picture in response to the fifth input.

In a possible implementation, that the terminal determines the to-be-filled content in the first preview picture based on the first reference frame picture specifically includes: The terminal identifies the first object in the first preview picture, and segments the first object from the first preview picture. The terminal identifies the first object in the first reference frame picture, and segments the first object from the first reference frame picture to obtain a second reference frame picture. The terminal calculates missing optical flow information between the second reference frame picture and a first preview picture obtained after the first object is segmented off. The terminal completes the missing optical flow information based on the second reference frame picture and an optical flow completion model, to obtain complete optical flow information between the second reference frame picture and the first preview picture obtained after the first object is segmented off. The terminal determines, from the second reference frame picture based on the complete optical flow information, the to-be-filled content in the first preview picture. In this way, the terminal may restore a preview picture by using an optical flow field.

In a possible implementation, that the terminal determines the to-be-filled content in the first preview picture based on the first reference frame picture specifically includes: The terminal identifies the first object in the first preview picture, and segments the first object from the first preview picture. The terminal identifies the first object in the first reference frame picture, and segments the first object from the first reference frame picture to obtain a second reference frame picture. The terminal encodes, into a first target feature map, a first preview picture obtained after the first object is segmented off. The terminal encodes the second reference frame picture into a first reference feature map. The terminal determines, from the first reference feature map, a to-be-filled feature similar to a feature around a first area in the first target feature map. That the terminal generates a first restored picture based on the to-be-filled content and the first preview picture specifically includes: The terminal fills, with the to-be-filled feature, an area in which the first object is located in the first target feature map, to obtain a second target feature map. The terminal decodes the second target feature map to obtain the first restored picture. In this way, the terminal may restore a preview picture by using a reference frame picture at a feature layer.

In a possible implementation, that the terminal generates a first restored picture based on the to-be-filled content and the first preview picture specifically includes: The terminal fills, with the to-be-filled feature, an area in which the first object is located in the first preview picture, to obtain a coarse restored picture. The terminal generates details and textures of a filled area in the coarse restored picture to obtain the first restored picture. In this way, the terminal may further generate details and textures of the filled area.

In a possible implementation, after the terminal determines the to-be-filled content in the first preview picture based on the first reference frame picture, the method further includes: The terminal obtains a fourth preview picture captured by the camera. The terminal obtains a motion angle and a rotation angle that are of the terminal and that are between a time point when the camera captures the first preview picture and a time point when the camera captures the fourth preview picture. The terminal determines, based on the motion angle and the rotation angle that are of the terminal and an area in which the first object is located in the first preview picture, an area in which the first object is located in the fourth preview picture. The terminal segments the first object from the fourth preview picture. The terminal determines, from the first preview picture based on the area in which the first object is located in the fourth preview picture, to-be-filled content of the fourth preview picture. The terminal fills, with the to-be-filled content of the fourth preview picture, the area in which the first object is located in the fourth preview picture, to obtain a second restored picture. The terminal displays the second restored picture in the photographing preview interface. In this way, when removing an object from consecutive frames of pictures, the terminal infers a position of a selfie stick in a subsequent frame based on motion data, to determine to-be-filled content of the selfie stick area in the subsequent frame, so as to reduce removal time.

In a possible implementation, the first object includes a selfie stick or a background person.

According to a second aspect, this application provides a terminal, including a camera, one or more processors, and one or more memories. The one or more memories and the camera are coupled to the one or more processors. The one or more memories are configured to store computer program code, and the computer program code includes computer instructions. When the one or more processors execute the computer instructions, the terminal is enabled to perform the image content removal method according to any one of the possible implementations of any one of the foregoing aspects.

According to a third aspect, this application provides a terminal, including one or more function modules. The one or more function modules are configured to perform the image content removal method according to any one of the possible implementations of any one of the foregoing aspects.

According to a fourth aspect, an embodiment of this application provides a computer storage medium, including computer instructions. When the computer instructions are run on a terminal, the terminal is enabled to perform the image content removal method according to any one of the possible implementations of any one of the foregoing aspects.

According to a fifth aspect, an embodiment of this application provides a computer program product. When the computer program product runs on a computer, the computer is enabled to perform the image content removal method according to any one of the possible implementations of any one of the foregoing aspects.

DETAILED DESCRIPTION OF ILLUSTRATIVE EMBODIMENTS

The following clearly and completely describes the technical solutions in embodiments of this application with reference to the accompanying drawings. In descriptions of embodiments of this application, "/" indicates "or" unless otherwise stated. For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

The following describes a method for removing a selfie stick from a shot picture in an existing solution.

Figure 1A:
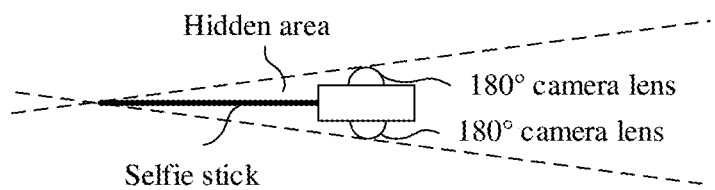
FIG. 1A and FIG. 1B are schematic diagrams of a principle of removing a selfie stick in a conventional technology.
Figure 1B:
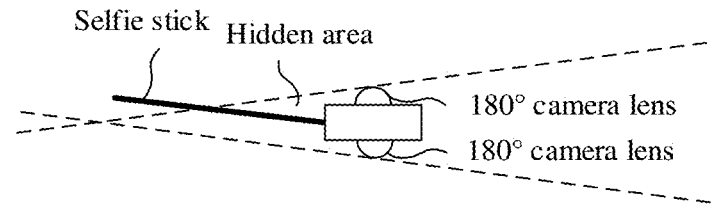

FIG. 1A and FIG. 1B are schematic diagrams of a principle of a method for removing a selfie stick from a shot picture in an existing solution.

As shown in FIG. 1A, in the existing solution, a shooting terminal is provided with two 180° camera lenses. After obtaining two pictures shot by the two 180° camera lenses, the shooting terminal may crop a shared display area in the two pictures, and then stitch the two pictures into one picture. When a user fixes the shooting terminal on a selfie stick to shoot a picture, the selfie stick needs to be placed in a shooting dead angle of the shooting terminal, so that the selfie stick in a picture can be completely removed when the shooting terminal crops and stitches two pictures shot by the two 180° camera lenses.

As shown in FIG. 1B, when the selfie stick is not completely within a shooting dead angle, when the shooting terminal crops and stitches two pictures shot by the two 180° camera lenses, a part that is of the selfie stick and that is not within the shooting dead angle cannot be removed, and also appears in a picture obtained through stitching.

It can be learned from the foregoing existing solution that the selfie stick can be completely removed only when the shooting terminal has a special camera hardware configuration and the selfie stick has a special placement position. This selfie stick removal condition is exacting and cannot be applicable to most shooting terminals.

Therefore, embodiments of this application provides an image content removal method, so that image content (for example, a selfie stick) that a user does not want can be removed from a picture or a video shot by the user on a terminal having no special camera, to improve a display effect of image content that the user wants in the picture or the video, and improve user experience.

Figure 2A:
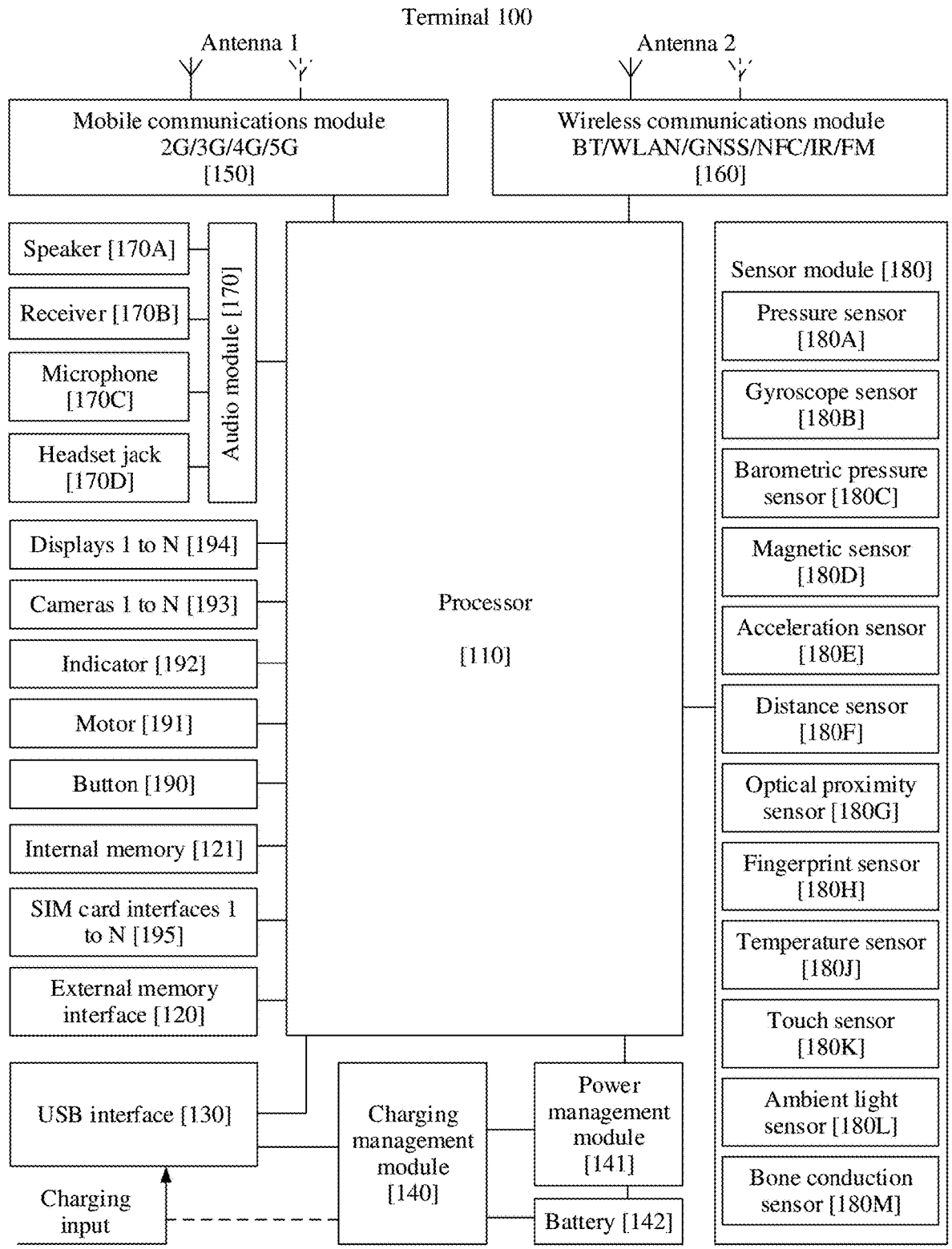
FIG. 2A is a diagram of a hardware structure of a terminal according to an embodiment of is this application.

FIG. 2A is a schematic diagram of a structure of a terminal 100.

The following uses the terminal 100 as an example to specifically describe this embodiment. It should be understood that the terminal 100 shown in FIG. 2A is merely an example, and the terminal 100 may have more or fewer components than those shown in FIG. 2A, may combine two or more components, or may have different component configurations. The components shown in the figure may be implemented in hardware including one or more signal processing and/or application-specific integrated circuits, software, or a combination of hardware and software.

The terminal 100 may include a processor no, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the terminal 100. In some other embodiments of this application, the terminal 100 may include more or fewer components than those shown in the figure, or some components may be combined, or some components may be split, or there may be a different component layout. The components shown in the figure may be implemented by hardware, software, or a combination of software and hardware.

The processor no may include one or more processing units. For example, the processor no may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the terminal 100. The controller may generate an operation control signal based on instruction operation code and a time sequence signal, to complete control of instruction reading and instruction execution.

A memory may be further disposed in the processor no, and is configured to store instructions and data. In some embodiments, the memory in the processor no is a cache. The memory may store instructions or data just used or cyclically used by the processor no. If the processor no needs to use the instructions or the data again, the processor no may directly invoke the instructions or the data from the memory. This avoids repeated access, reduces waiting time of the processor no, and improves system efficiency.

In some embodiments, the processor no may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface 130.

The charging management module 140 is configured to receive a charging input from a charger. The charger may be a wireless charger or a wired charger.

The power management module 141 is configured to connect to the battery 142, the charging management module 140, and the processor no. The power management module 141 receives an input from the battery 142 and/or the charging management module 140, and supplies power to the processor 110, the internal memory 121, an external memory, the display 194, the camera 193, the wireless communications module 160, and the like.

A wireless communication function of the terminal 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the terminal 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution applied to the terminal 100, including 2G, 3G, 4G, 5G, or the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 may be disposed in a same device as at least some modules of the processor 110.

The modem processor may include a modulator and a demodulator. The modulator is configured to modulate a to-be-sent low-frequency baseband signal into a medium or high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communication solution that is applied to the terminal 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 of the terminal 100 is coupled to the mobile communications module 150, and the antenna 2 is coupled to the wireless communications module 160, so that the terminal 100 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The terminal 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor no may include one or more GPUs that execute program instructions to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini LED, a micro LED, a micro OLED, a quantum dot light-emitting diode (quantum dot light-emitting diode, QLED), or the like. In some embodiments, the terminal 100 may include one or N displays 194, where N is a positive integer greater than 1.

The terminal 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal, and may further process another digital signal in addition to a digital image signal. For example, when the terminal 100 selects a frequency, the digital signal processor is configured to perform Fourier transform and the like on frequency energy.

The video codec is configured to compress or decompress a digital video. The terminal 100 may support one or more video codecs. In this way, the terminal 100 can play or record videos in a plurality of coding formats, for example, moving picture experts group (moving picture experts group, MPEG)-1, MPEG-2, MPEG-3 and MPEG-4.

The NPU is a neural-network (neural-network, NN) computing processor. The NPU quickly processes input information by referring to a structure of a biological neural network, for example, by referring to a mode of transmission between human brain neurons, and may further continuously perform self-learning. The NPU can implement applications such as intelligent cognition of the terminal 100, such as image recognition, facial recognition, speech recognition, and text understanding.

The external memory interface 120 may be configured to connect to an external storage card, for example, a micro SD card, to extend a storage capability of the terminal 100. The external storage card communicates with the processor no through the external memory interface 120, to implement a data storage function. For example, files such as music and videos are stored in the external storage card.

The internal memory 121 may be configured to store computer-executable program code. The executable program code includes instructions. The processor no runs the instructions stored in the internal memory 121, to perform various function applications of the terminal 100 and data processing. The internal memory 121 may include a program storage area and a data storage area. The program storage area may store an operating system, an application required by at least one function (for example, a sound playing function or an image playing function), and the like. The data storage area may store data (such as audio data and a phone book) created during use of the terminal 100. In addition, the internal memory 121 may include a high-speed random access memory, or may include a nonvolatile memory, for example, at least one magnetic disk storage device, a flash memory, or a universal flash storage (universal flash storage, UFS).

The terminal 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode audio signals.

The speaker 170A, also referred to as a "loudspeaker", is configured to convert an electrical audio signal into a sound signal.

The receiver 170B, also referred to as an "earpiece", is configured to convert an electrical audio signal into a sound signal.

The microphone 170C, also referred to as a "mike" or a "mic", is configured to convert a sound signal into an electrical signal.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 100 determines pressure intensity based on a change in the capacitance. When a touch operation is performed on the display 194, the terminal 100 detects intensity of the touch operation by using the pressure sensor 180A. The terminal 100 may also calculate a touch position based on a detection signal of the pressure sensor 180A. In some embodiments, touch operations that are performed at a same touch position but have different touch operation intensity may correspond to different operation instructions.

The gyroscope sensor 180B may be configured to determine a motion posture of the terminal 100. In some embodiments, an angular velocity of the terminal boo around three axes (namely, axes x, y, and z) may be determined by using the gyroscope sensor 180B. The gyroscope sensor 180B may be configured to implement image stabilization during photographing.

The barometric pressure sensor 180C is configured to measure barometric pressure.

The magnetic sensor 180D includes a Hall sensor. The terminal 100 may detect opening and closing of a flip cover by using the magnetic sensor 180D.

The acceleration sensor 180E may detect magnitudes of accelerations of the terminal 100 in various directions (usually on three axes). A magnitude and a direction of gravity may be detected when the terminal 100 is still.

The distance sensor 180F is configured to measure a distance. The terminal 100 may measure a distance in an infrared manner or a laser manner. In some embodiments, in a photographing scenario, the terminal 100 may measure a distance by using the distance sensor 180F to implement quick focusing.

The optical proximity sensor 180G may include, for example, a light-emitting diode (LED) and an optical detector, for example, a photodiode. The light-emitting diode may be an infrared light-emitting diode.

The ambient light sensor 180L is configured to sense ambient light brightness. The terminal 100 may adaptively adjust brightness of the display 194 based on the sensed ambient light brightness. The ambient light sensor 180L may also be configured to automatically adjust white balance during photographing.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of a touch event. A visual output related to the touch operation may be provided by using the display 194. In some other embodiments, the touch sensor 180K may alternatively be disposed on a surface of the terminal 100 at a position different from that of the display 194.

The bone conduction sensor 180M may obtain a vibration signal.

The button 190 includes a power button, a volume button, and the like. The button 190 may be a mechanical button, or may be a touch button. The terminal 100 may receive a button input, and generate a button signal input related to a user setting and function control of the terminal 100.

The motor 191 may generate a vibration prompt.

The indicator 192 may be an indicator light, and may be configured to indicate a charging status and a power change, or may be configured to indicate a message, a missed call, a notification, and the like.

The SIM card interface 195 is configured to connect to a SIM card.

A software system of the terminal 100 may use a layered architecture, an event-driven architecture, a microkernel architecture, a microservice architecture, or a cloud architecture. In this embodiment of the present invention, an Android system with the layered architecture is used as an example to illustrate a software structure of the terminal 100.

Figure 2B:
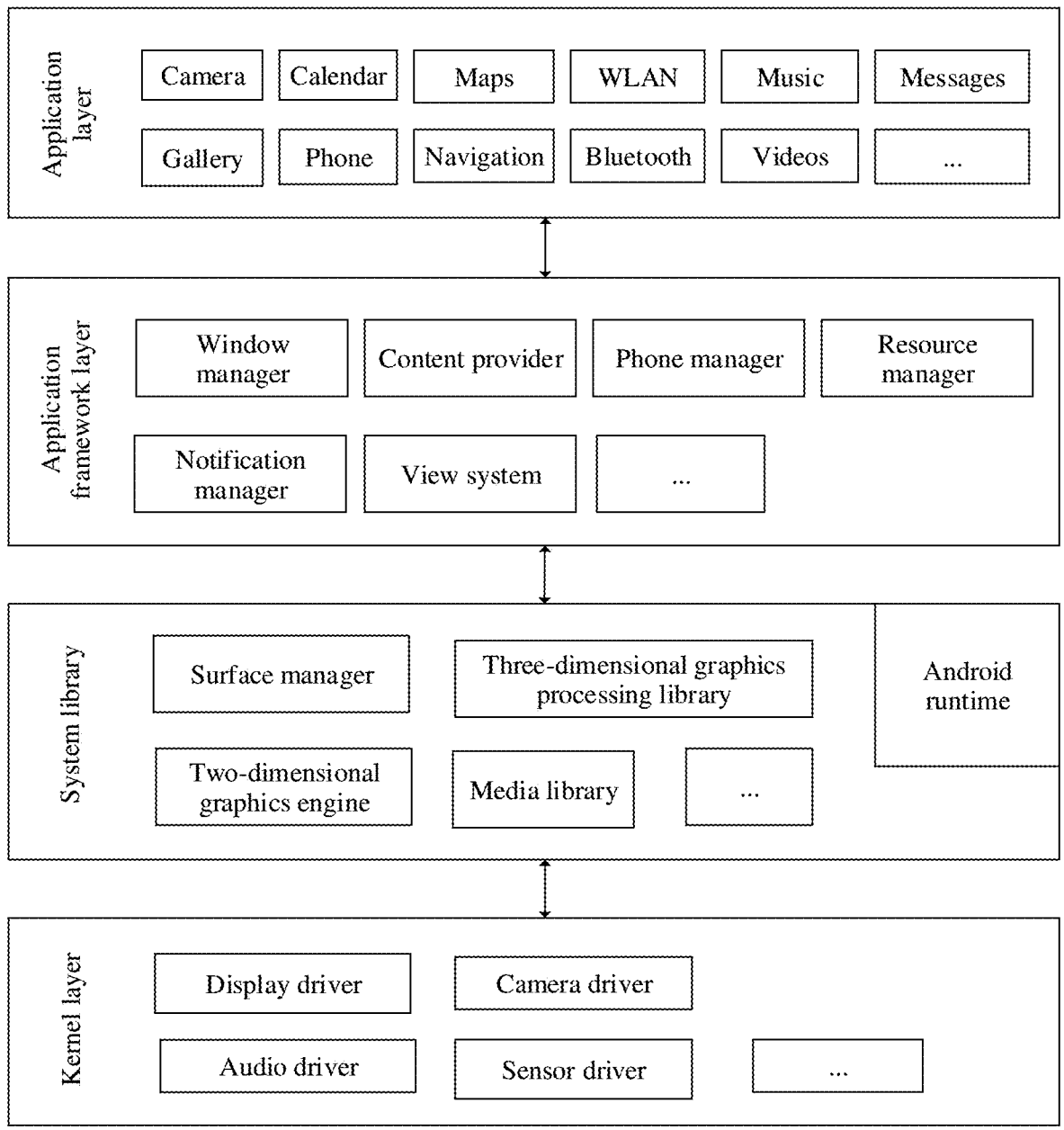
FIG. 2B is a schematic diagram of a software architecture of a terminal according to an embodiment of this application.

FIG. 2B is a block diagram of a software structure of the terminal 100 according to an embodiment of the present invention.

In a layered architecture, software is divided into several layers, and each layer has a clear role and task. The layers communicate with each other through a software interface. In some embodiments, the Android system is divided into four layers from top to bottom: an application layer, an application framework layer, an Android runtime (Android runtime) and system library, and a kernel layer.

The application layer may include a series of application packages.

As shown in FIG. 2B, the application packages may include applications such as Camera, Gallery, Calendar, Phone, Maps, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2B, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, a phone book, and the like.

The view system includes visual controls such as a control for displaying text and a control for displaying an image. The view system may be configured to construct an application. A display interface may include one or more views. For example, a display interface including a Messages notification icon may include a text display view and an image display view.

The phone manager is configured to provide a communication function of the terminal wo, for example, management of a call status (including answering, declining, or the like).

The resource manager provides an application with various resources such as a localized character string, an icon, an image, a layout file, and a video file.

The notification manager enables an application to display notification information in a status bar, and may be configured to convey a notification-type message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background, or may be a notification that appears on the screen in a form of a dialog window. For example, text information is prompted in the status bar, a prompt tone is played, the terminal vibrates, or an indicator light blinks.

The Android runtime includes a kernel library and a virtual machine. The Android runtime is responsible for scheduling and management of the Android system.

The kernel library includes two parts: a function that needs to be invoked in Java language, and a kernel library of Android.

The application layer and the application framework layer run in the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the terminal 100 with reference to a photographing capture scenario.

When the touch sensor 180K receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. For example, the touch operation is a single-tap touch operation and a control corresponding to the single-tap operation is a control of a Camera icon. Camera invokes an interface at the application framework layer, to enable Camera, then enables the camera driver by invoking the kernel layer, and captures a static image or a video by using the camera 193.

The following specifically describes an image content removal method in embodiments of this application with reference to an application scenario.

In some application scenarios, before a user uses the terminal 100 to shoot a picture, the terminal 100 may automatically identify whether specified image content (for example, a selfie stick) exists in a preview picture shot by a camera. When identifying that the specified image content exists, the terminal 100 may automatically remove the specified image content from the preview picture, and output a removal prompt. The removal prompt provides the user with a prompt that the specified image content is removed from the preview picture currently. After the user presses a shooting button, the terminal 100 may save, as a picture, a preview picture obtained after the specified image content is removed, and store the picture in Gallery. When the user disables a function of removing the specified image content by the terminal 100, the terminal 100 may revert to displaying the specified image content in the preview picture. In this way, image content that the user does not want can be removed when the user performs photographing. This improves a display effect of image content that the user wants in a shot picture, and improves user experience.

Figure 3A:
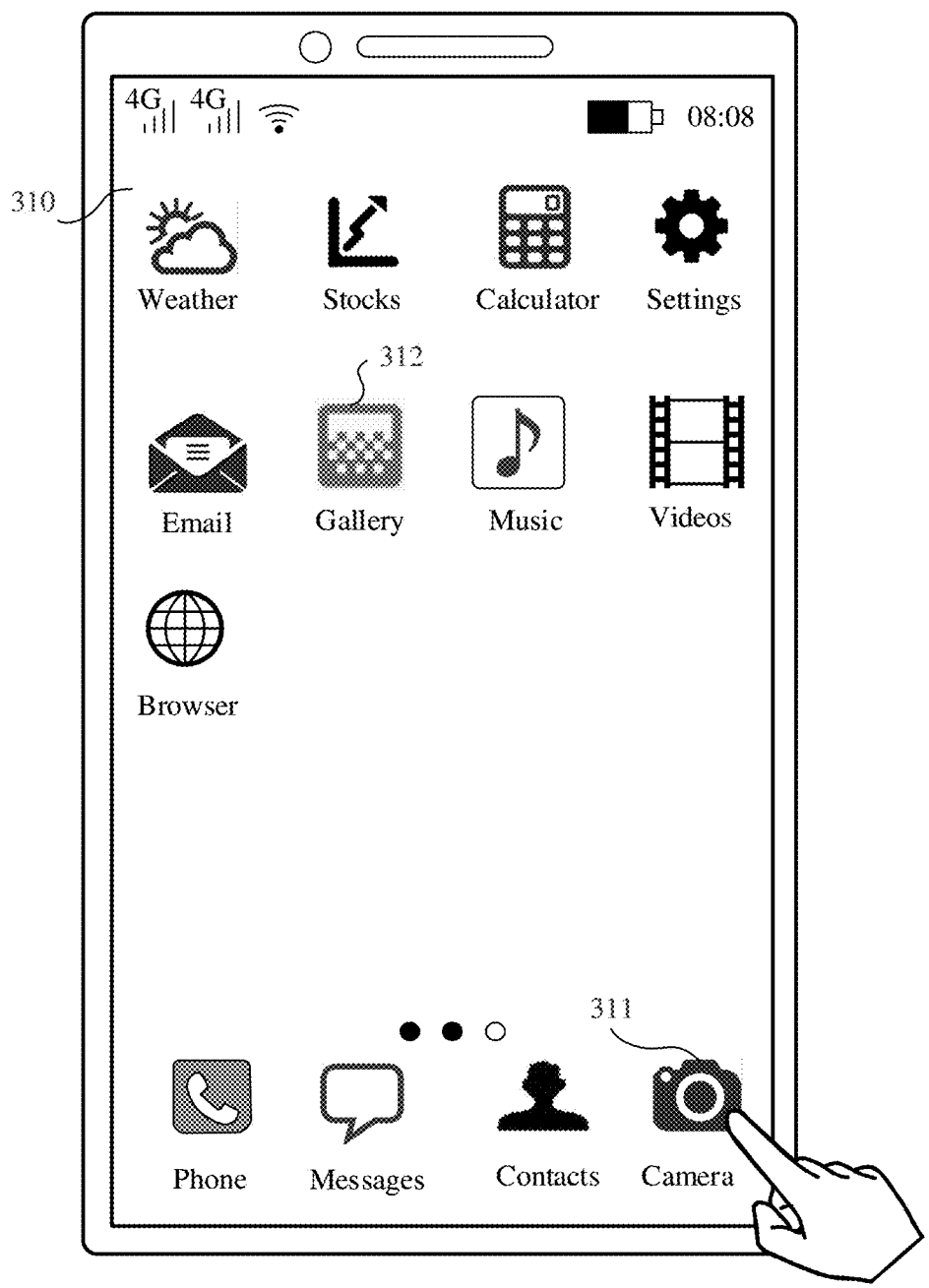
FIG. 3A to FIG. 3F are schematic diagrams of a group of interfaces according to an embodiment of this application.

For example, as shown in FIG. 3A, the terminal 100 may display an interface 310 of a home screen. The interface 310 displays a page on which an application icon is placed. The page includes a plurality of application icons (for example, a Weather icon, a Stocks icon, a Calculator icon, a Settings icon, an Email icon, a Gallery icon 312, a Music icon, a Videos icon, and a Browser icon). A page indicator is further displayed below the plurality of application icons, to indicate a position relationship between the currently displayed page and another page. There are a plurality of tray icons (for example, a Phone icon, a Messages icon, a Contacts icon, and a Camera icon 311) below the page indicator, and the tray icons remain displayed when the page is switched. In some embodiments, the page may alternatively include a plurality of application icons and a page indicator. The page indicator may not be a part of the page, and may exist independently. The tray icons are also optional. This is not limited in embodiments of this application.

The terminal 100 may receive an input operation (for example, tapping) performed by the user on the Camera icon 311. In response to the input operation, the terminal 100 may display a viewfinder screen 320 shown in FIG. 3B.

Figure 3B:
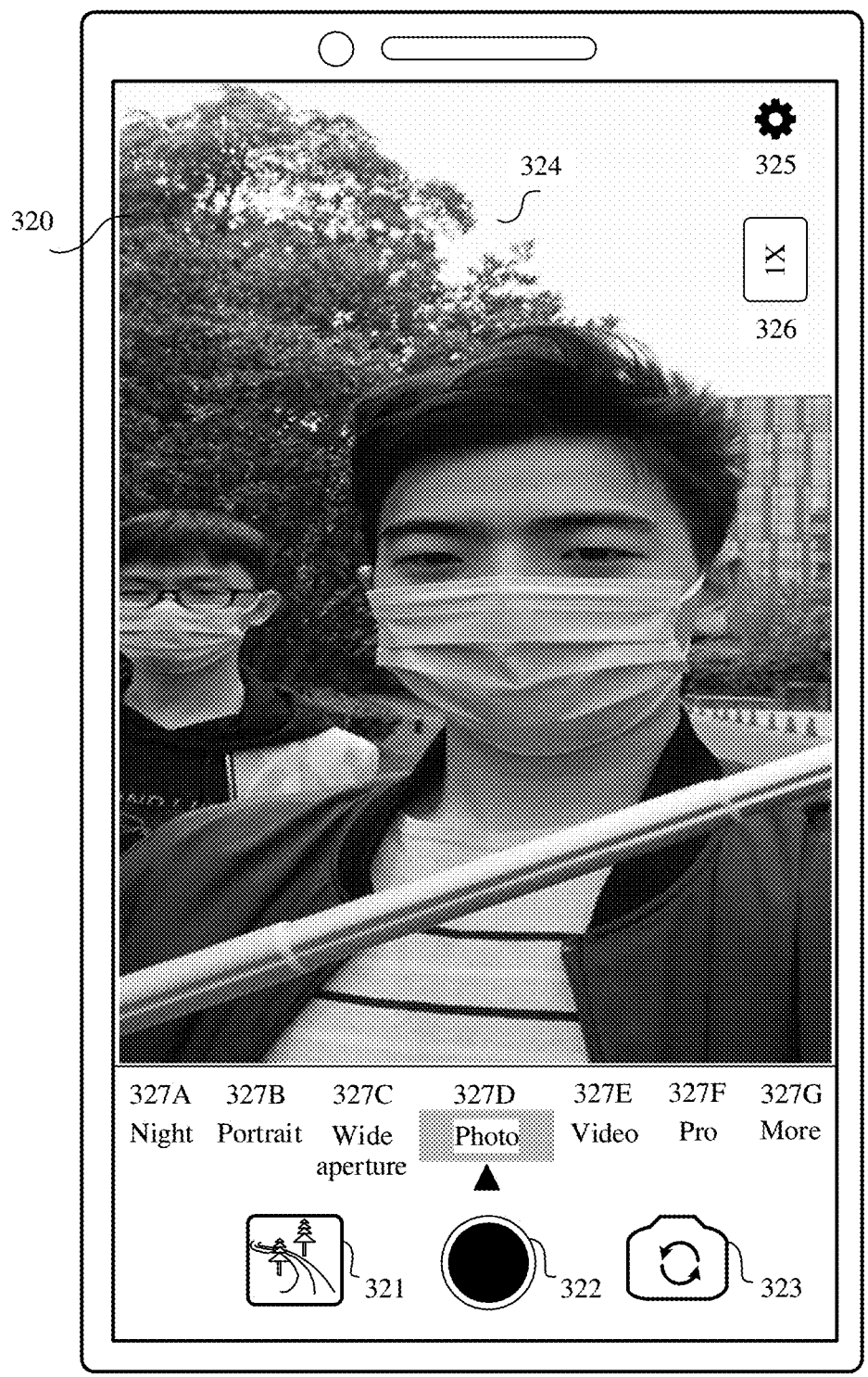

As shown in FIG. 3B, the viewfinder screen 320 may include a redisplay control 321, a shooting control 322, a camera switching control 323, a preview picture 324, a settings control 325, a zoom ratio control 326, and one or more shooting mode controls (for example, a "night mode" control 372A, a "portrait mode" control 372B, a "cloud augmentation mode" control 372C, a "photo mode" control 372D, a "video mode" control 372E, a "professional mode" control 372F, and "more modes" control 327G) The redisplay control 321 may be configured to display a shot picture. The shooting control 322 may be configured to trigger saving of a picture shot by a camera. The camera switching control 323 may be configured to switch between cameras for photographing. The settings control 325 may be configured to set a photographing function. The zoom ratio control 326 may be configured to set a zoom ratio of the camera. The shooting mode control may be configured to trigger enabling of an image processing procedure corresponding to the shooting mode. For example, the "night mode" control 372A may be configured to trigger increasing of brightness, color richness, and the like in a shot picture. The "portrait mode" control 372B may be configured to trigger blurring of a background of a person in a shot picture. The "cloud augmentation mode" control 372C may be configured to trigger augmentation of a picture effect of a shot picture by using a processing capability of a cloud server. As shown in FIG. 3B, the shooting mode currently selected by the user is the "photo mode".

The terminal 100 may identify whether the specified image content (for example, the selfie stick) exists in the preview picture. If the specific image content exists, the terminal 100 may remove the specified image content from the preview picture, and output an identification prompt. The identification prompt provides the user with a prompt that the specified image content is identified and the specified image content is being removed.

Figure 3C:
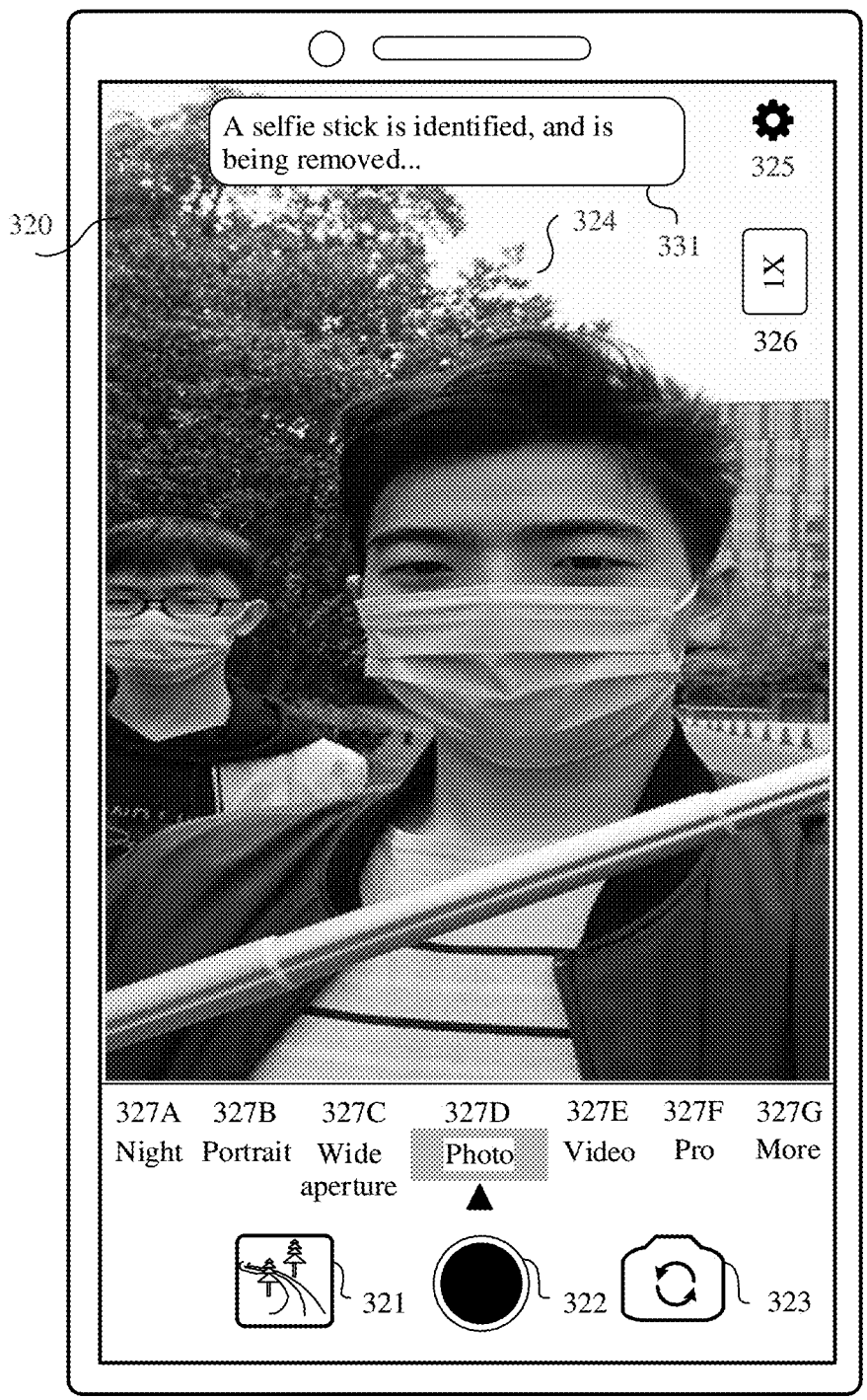

For example, as shown in FIG. 3C, after identifying a selfie stick in the preview picture 324, the terminal 100 may display a prompt 331. The prompt 331 may provide the user with a prompt that the selfie stick in the preview picture 324 is identified and the selfie stick in the preview picture is being removed. The prompt 331 may be a text prompt (for example, "A selfie stick is identified, and is being removed . . . "). In some possible implementations, the prompt 331 may alternatively be a prompt of a type such as a picture, a video, or a sound.

Optionally, in a process of removing the specified image content from the preview picture, the terminal 100 may detect whether a range of motion of the preview picture is excessively large. If the range of motion is excessively large, the terminal 100 may output a picture shaking prompt. The picture shaking prompt may prompt the user to stabilize the device to reduce a shake range of the preview picture.

Figure 3D:
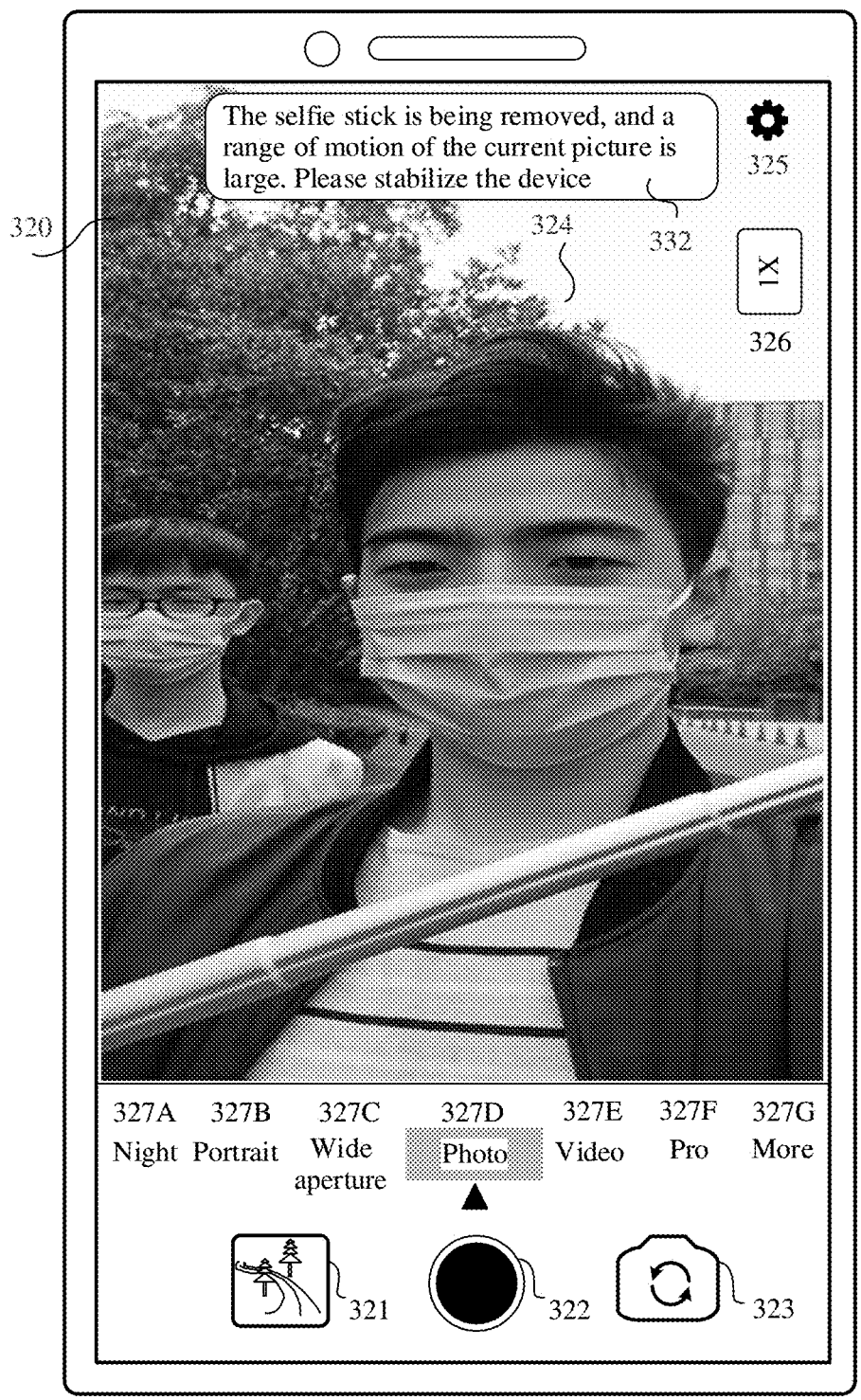

For example, as shown in FIG. 3D, in a process of removing the specified image content from the preview picture, if the terminal 100 detects whether a range of motion of the preview picture is excessively large, the terminal 100 may display a prompt 332. The prompt 332 may be a text prompt (for example, "The selfie stick is being removed, and a range of motion of the current picture is large. Please stabilize the device"). In some possible implementations, the prompt 331 may alternatively be a prompt of a type such as a picture, a video, or a sound.

After removing the specified image content from the preview picture, the terminal 100 may receive an input (for example, a tap) of the user for a shooting control. In response to the operation, the terminal 100 may save, as a picture, a preview picture obtained after the specified image content is removed, and store the picture in Gallery.

After removing the specified image content from the preview picture, the terminal 100 may display the preview picture obtained after the specified image content is removed and a removal disabling control. The removal disabling control may be configured to trigger the terminal 100 to cancel removal of the specified image content in the preview picture.

Figure 3E:
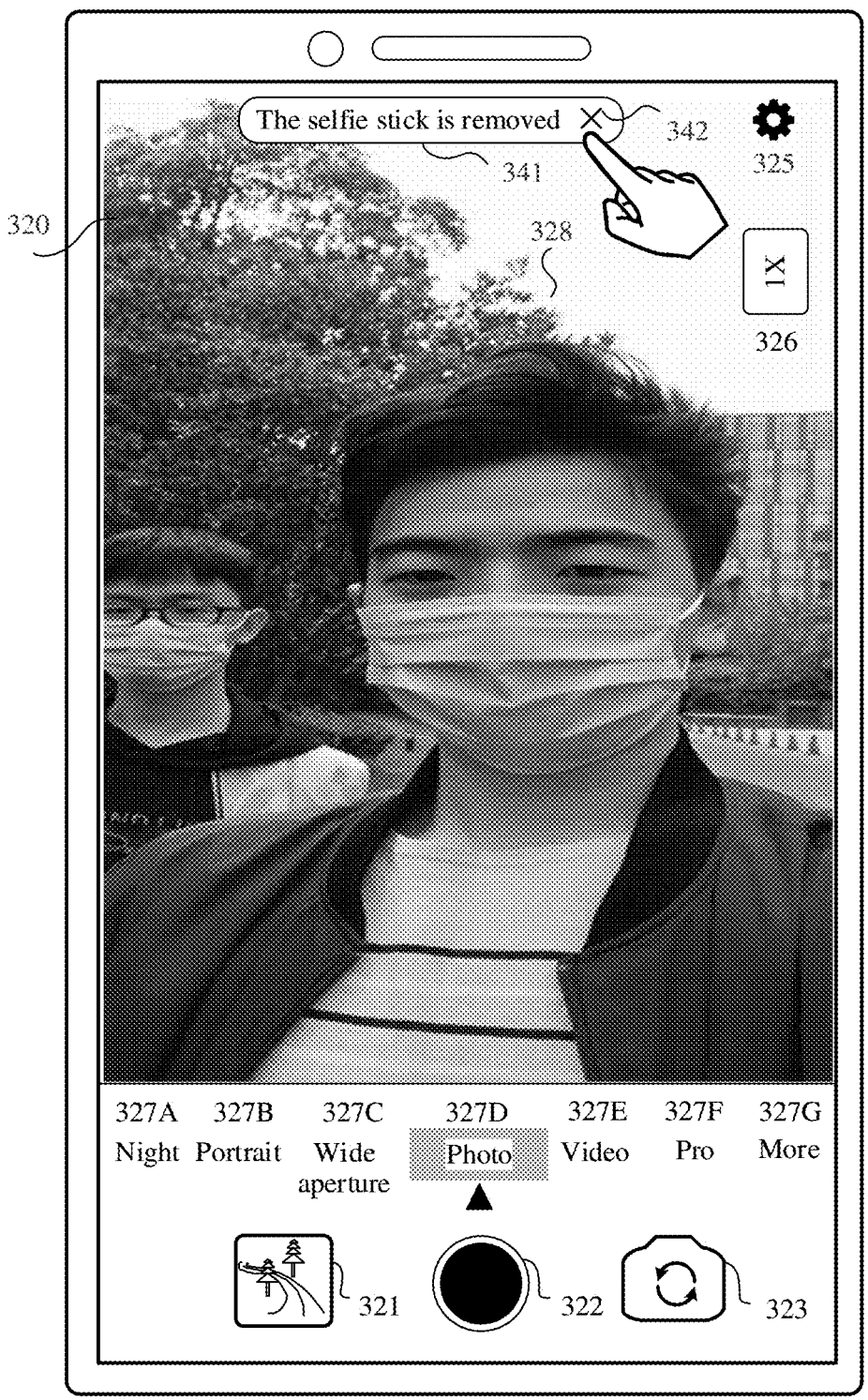
Figure 3F:
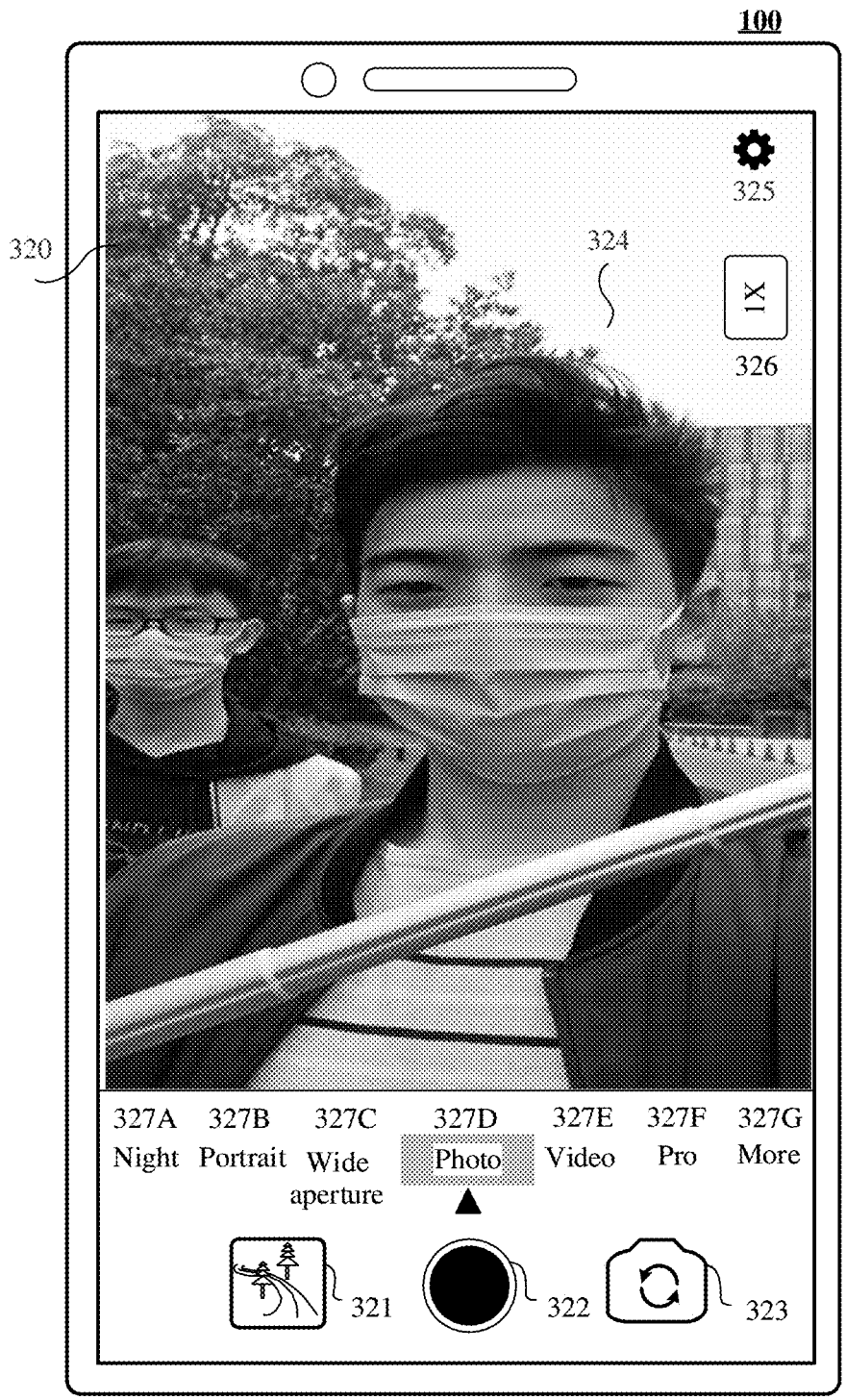

For example, as shown in FIG. 3E, after removing the selfie stick from the preview picture 324, the terminal 100 may display a prompt box 341 and a preview picture 328 obtained after the selfie stick is removed. Compared with the preview picture 324, in the preview picture 328, the selfie stick is removed. The prompt box 341 includes a text prompt (for example, "The selfie stick is removed") and a removal disabling control 342. The terminal 100 may receive an input (for example, a tap) performed by the user on the removal disabling control 342. In response to the input, the terminal 100 may cancel removal of the selfie stick in the preview picture 328, and display the preview picture 324 shown in FIG. 3F. As shown in FIG. 3F, the preview picture 324 includes the selfie stick.

In a possible implementation, when the terminal 100 identifies that the specified image content exists in the preview picture of a Camera interface, the terminal 100 may display a removal confirmation control. The removal confirmation control may be configured to trigger the terminal 100 to remove the specified image content from the preview picture. In this way, before removing the specified image content from the preview picture, the terminal 100 may confirm with the user whether to remove the specified image content. After the user confirms to remove the specified image content, the terminal 100 removes the specified image content from the preview picture. This improves user experience.

Figure 4A:
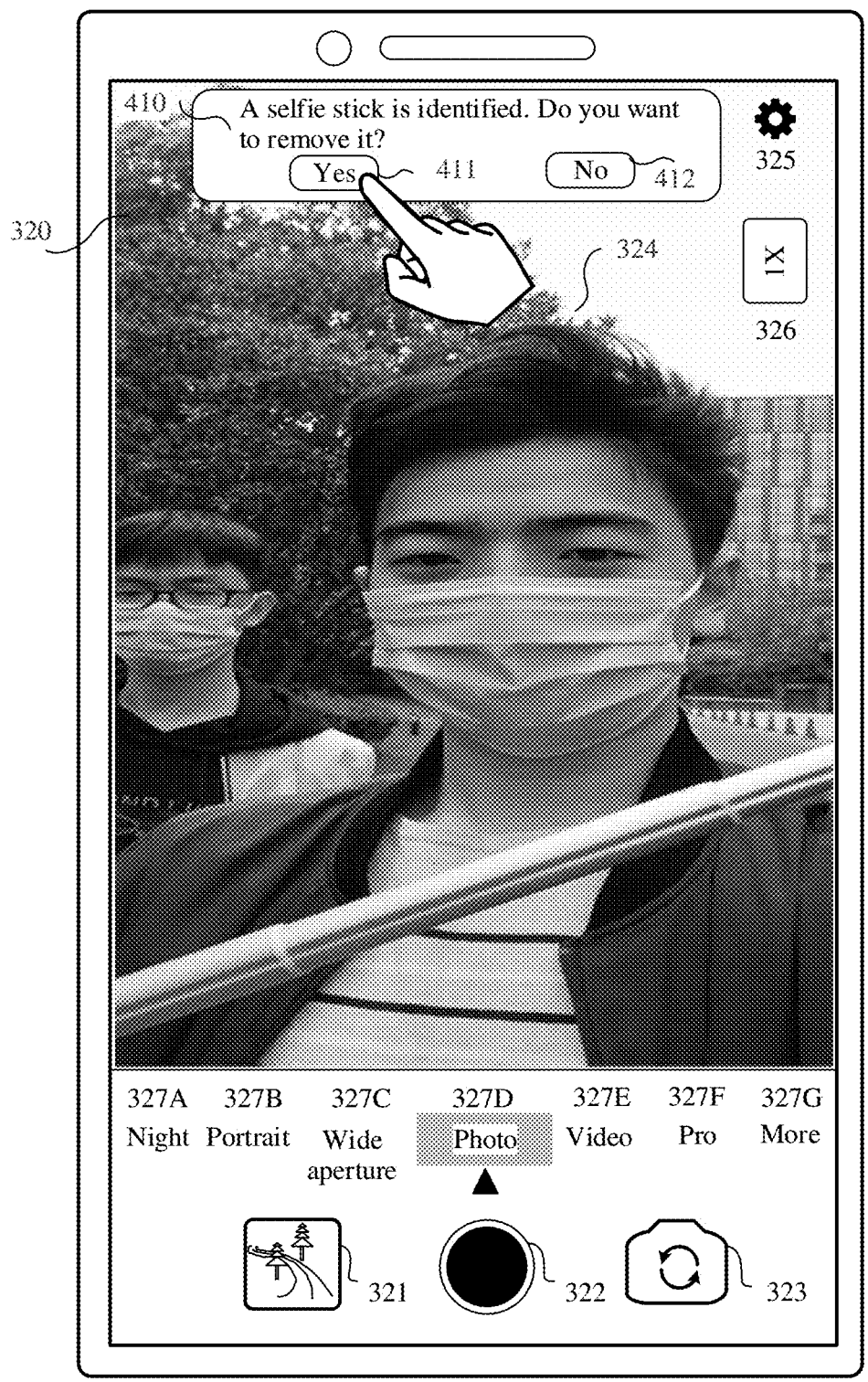
FIG. 4A to FIG. 4G are schematic diagrams of another group of interfaces according to an embodiment of this application.
Figure 4B:
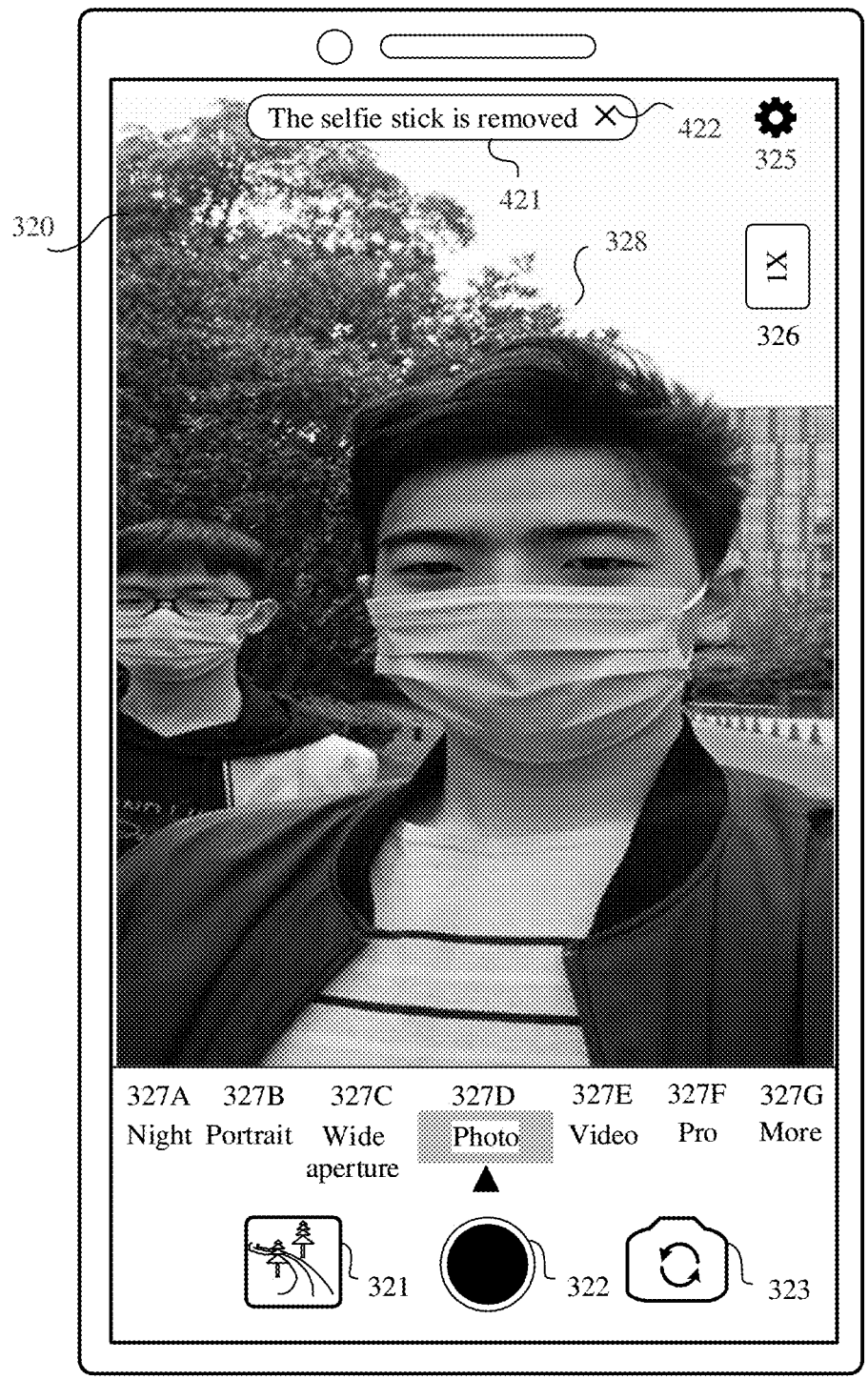

For example, as shown in FIG. 4A, when the terminal 100 identifies that the selfie stick exists in the preview picture 324 of the Camera interface 320, the terminal 100 may display a prompt box 410. The prompt box 410 includes a text prompt (for example, "A selfie stick is identified. Do you want to remove it?"), a removal confirmation control 411 and a removal refusal control 412. The removal confirmation control 411 may be configured to trigger the terminal 100 to remove the specified image content from the preview picture. The removal refusal control 412 may trigger the terminal 100 to refuse to remove the specified image content from the preview picture. The terminal 100 may receive an input (for example, a tap) of the user for the removal confirmation control 411. In response to the input, the terminal 100 may remove the selfie stick from the preview picture 324, and replace the preview picture 324 with the preview picture 328 shown in FIG. 4B. The preview picture 328 does not include the selfie stick. Optionally, after removing the selfie stick from the preview picture 324, the terminal 100 may further display a prompt box 421. The prompt box 421 includes a text prompt (for example, "The selfie stick is removed") and a removal disabling control 422. The removal disabling control 422 may be configured to trigger the terminal 100 to cancel removal of the specified image content in the preview picture.

In some embodiments, the terminal 100 may use a solution of removing specified image content (for example, a selfie stick) from a preview picture by using an adjacent frame picture. In this case, the terminal 100 needs to find, from the adjacent frame picture, content shielded by the specified image content in the preview picture. Therefore, a position of the specified picture content in the adjacent frame picture needs to be different from a position of the specified picture content in the preview picture. When the terminal 100 identifies that the specified image content exists in the preview picture of a Camera interface, the terminal 100 may output an operation prompt. The operation prompt may prompt the user to move the terminal 100 in a specified direction. In this way, an effect of removing the specified image content can be better.

Figure 4C:
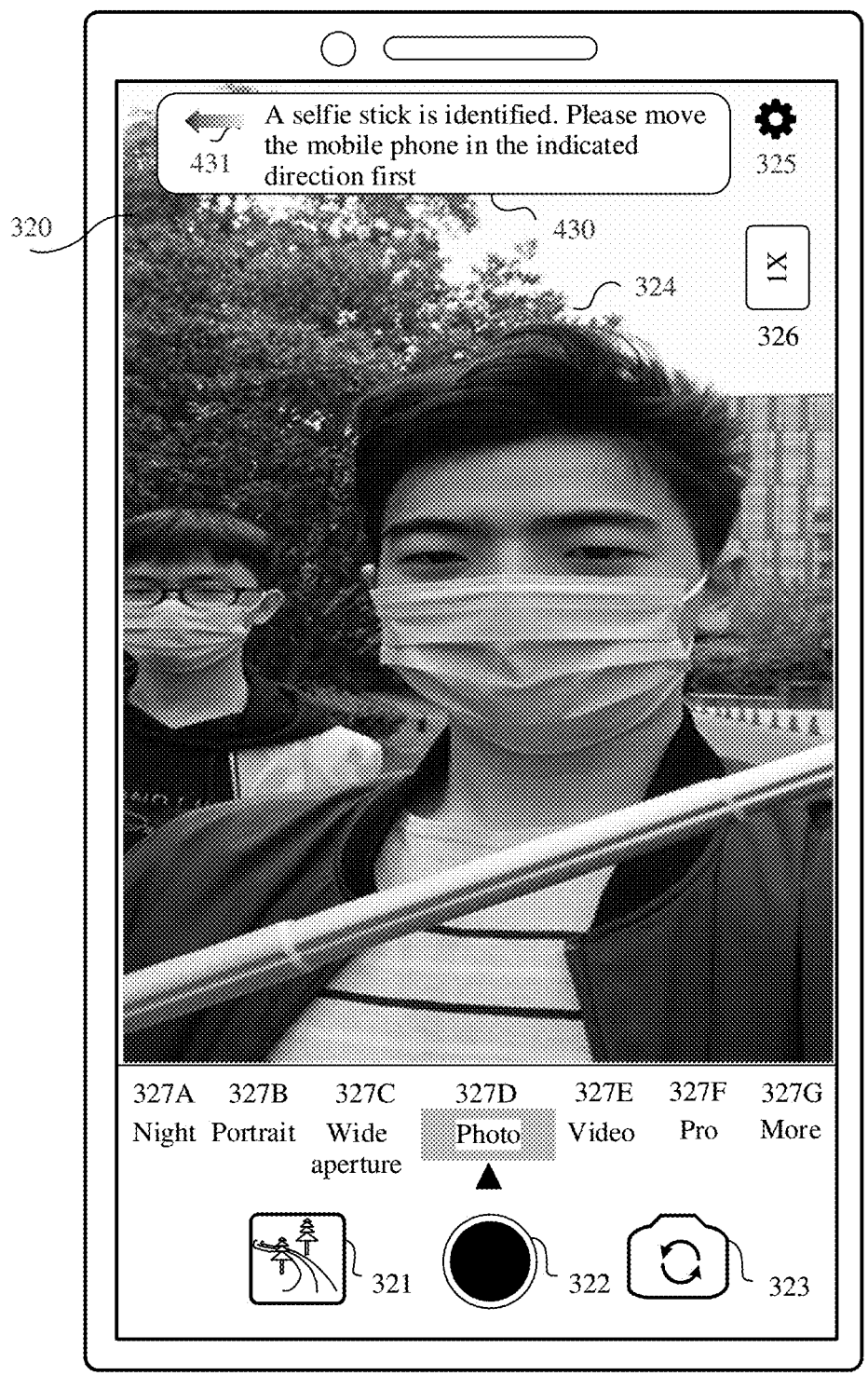

For example, as shown in FIG. 4C, when the terminal 100 identifies that the selfie stick exists in the preview picture 324 of the Camera interface 320, the terminal 100 may display an operation prompt box 430. The operation prompt box 430 includes a text prompt (for example, "A selfie stick is identified. Please move the mobile phone in the indicated direction first") and a direction mark 431 (for example, a mark pointing to the left). The user may complete, based on the operation prompt box 430, an operation corresponding to the operation prompt box 430 (for example, move the terminal 100 leftwards).

Figure 4D:
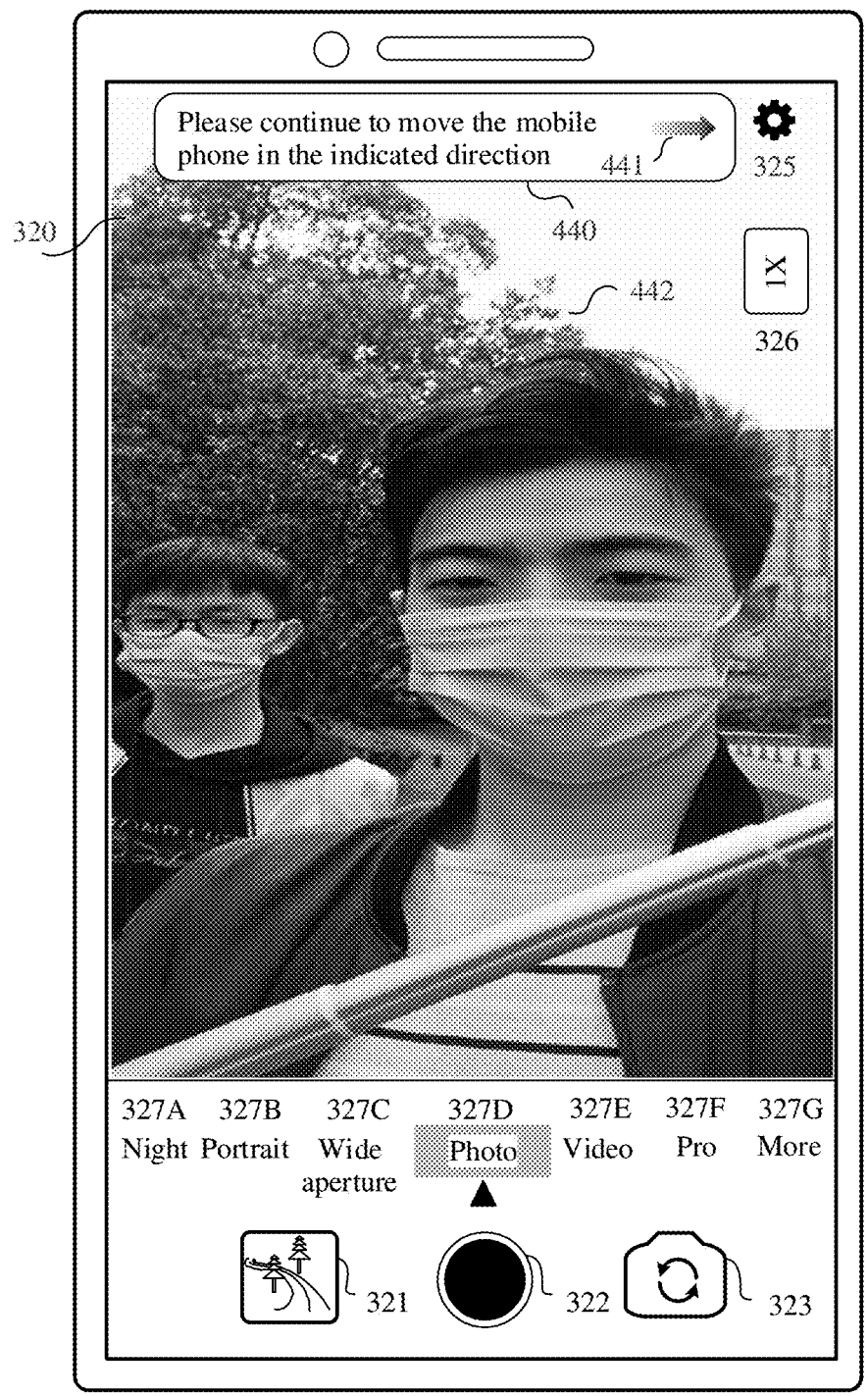

In a possible implementation, the terminal 100 may sequentially display a plurality of operation prompts, to gradually indicate the user to complete a specified operation. As shown in FIG. 4D, after the user moves the terminal 100 rightwards, the terminal 100 may display a captured frame of picture 442. After detecting that the terminal 100 completes the operation corresponding to the operation prompt box 430, the terminal 100 may continue to display an operation prompt box 440 in the Camera interface 320. The operation prompt box 440 includes a text prompt (for example, "Please continue to move the mobile phone in the indicated direction") and a direction mark 441 (for example, a mark pointing to the right). After completing the operation (for example, moving the terminal 100 rightwards) corresponding to the operation prompt box 430, the user may complete an operation (for example, moving the terminal 100 rightwards) corresponding to the operation prompt box 440.

In a process in which the user moves the terminal 100, the terminal 100 may obtain content shielded by the specified image content in the preview picture. After the terminal 100 obtains the content shielded by the specified image content in the preview picture, the terminal 100 may output an operation completion prompt. The operation completion prompt may provide the user with a prompt that the indicated operation is completed and the specified image content is being removed.

Figure 4E:
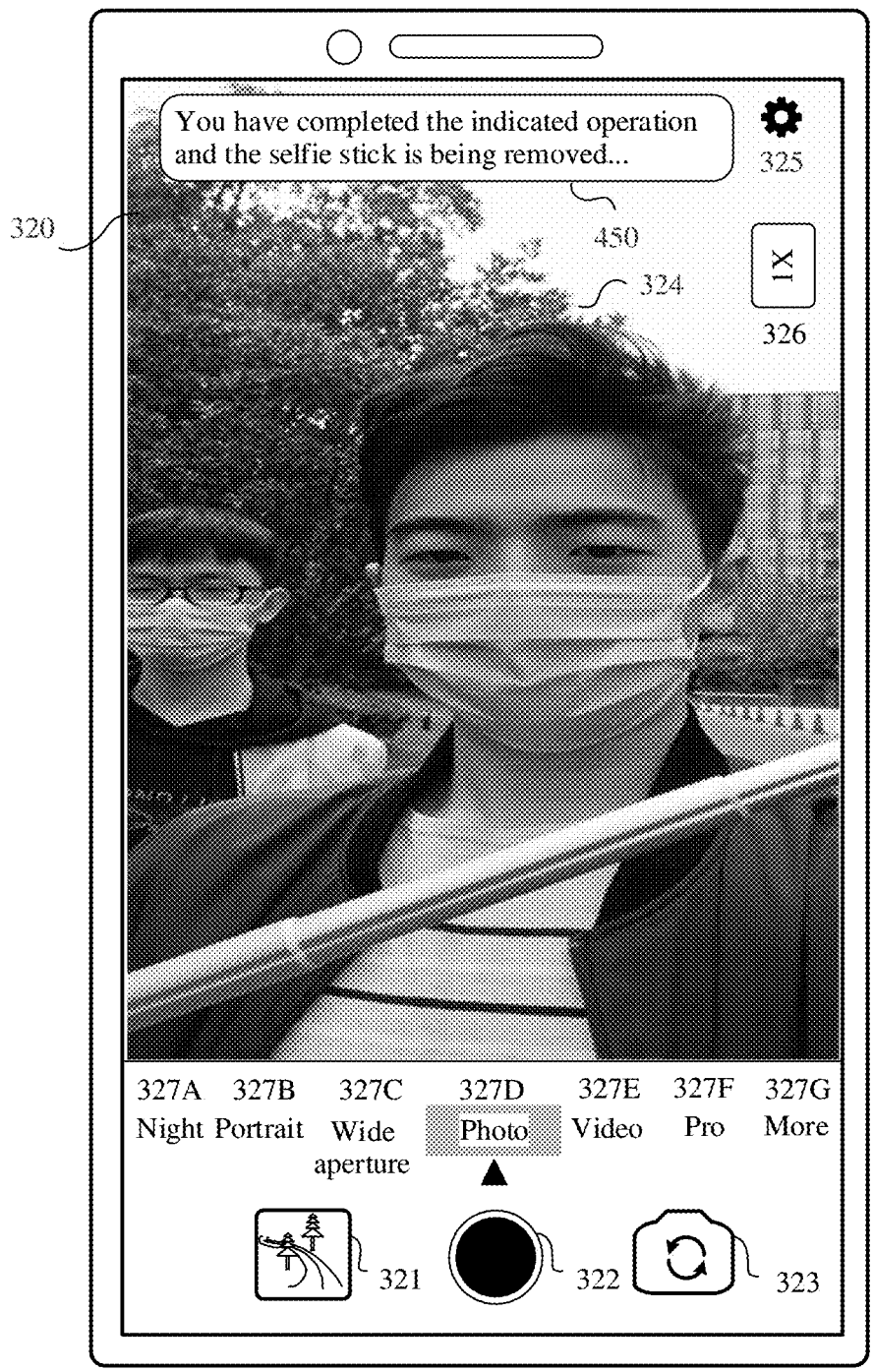

For example, as shown in FIG. 4E, after the terminal 100 obtains the content shielded by the specified image content in the preview picture, the terminal 100 may display an operation completion prompt 450. The operation completion prompt 450 may be a text prompt (for example, "You have completed the indicated operation and the selfie stick is being removed . . . ").

In some embodiments, before removing the specified image content from the preview picture, the terminal 100 needs to take a specific time to first obtain the content shielded by the specified image content in the preview picture. After triggering to start removing the specified image content from the preview picture, the terminal 100 may output a preprocessing countdown. The preprocessing countdown may be used to indicate remaining time for the terminal 100 to complete removing the specified image content from the preview picture. In this way, the user can feel a process of removing the specified image.

Figure 4F:
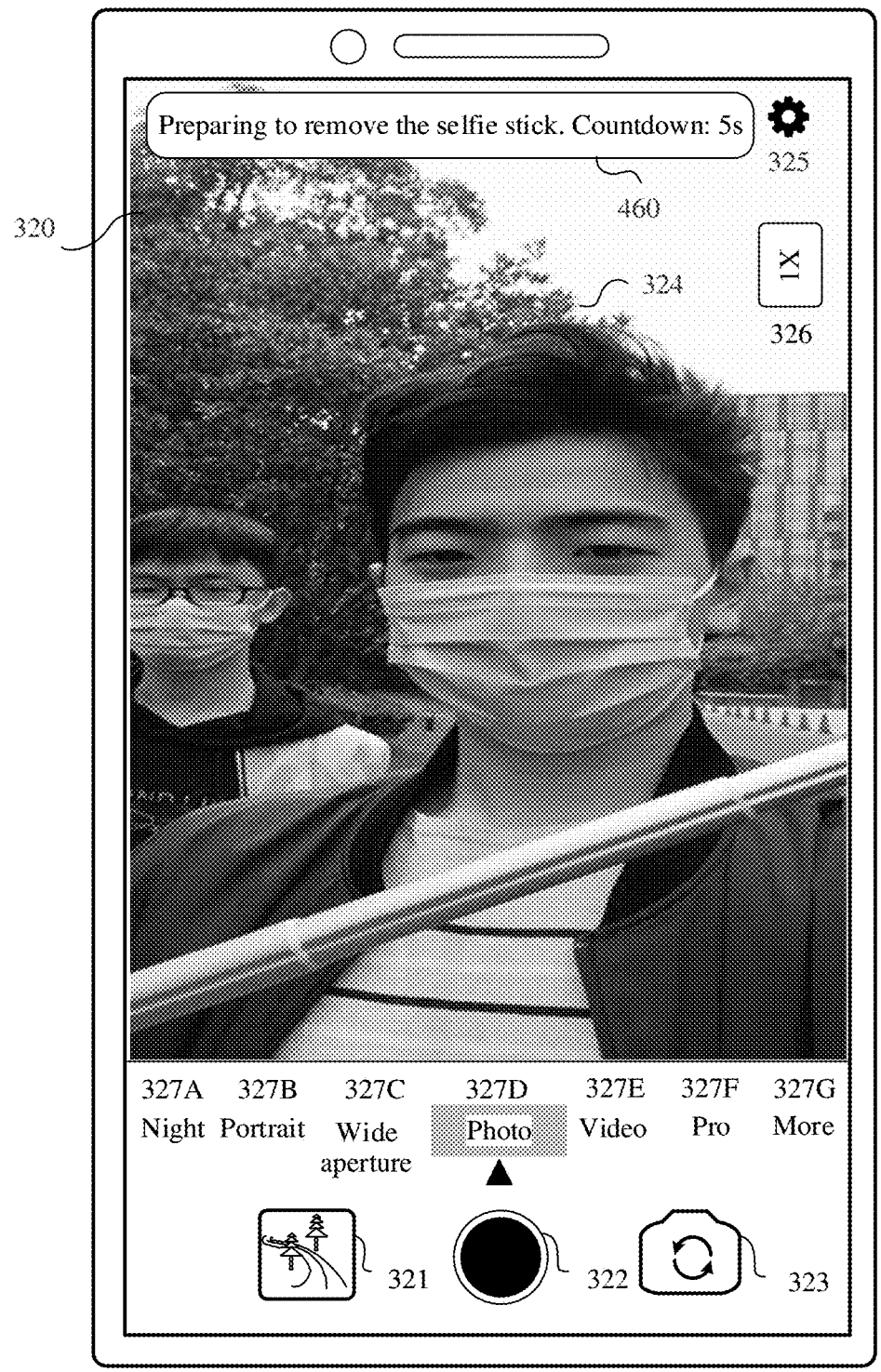

For example, as shown in FIG. 4F, after triggering to start removing the selfie stick from the preview picture, the terminal 100 may display a countdown prompt 460 in the Camera interface 320. The countdown prompt 460 may be a text prompt (for example, "Preparing to remove the selfie stick. Countdown: is").

Figure 4G:
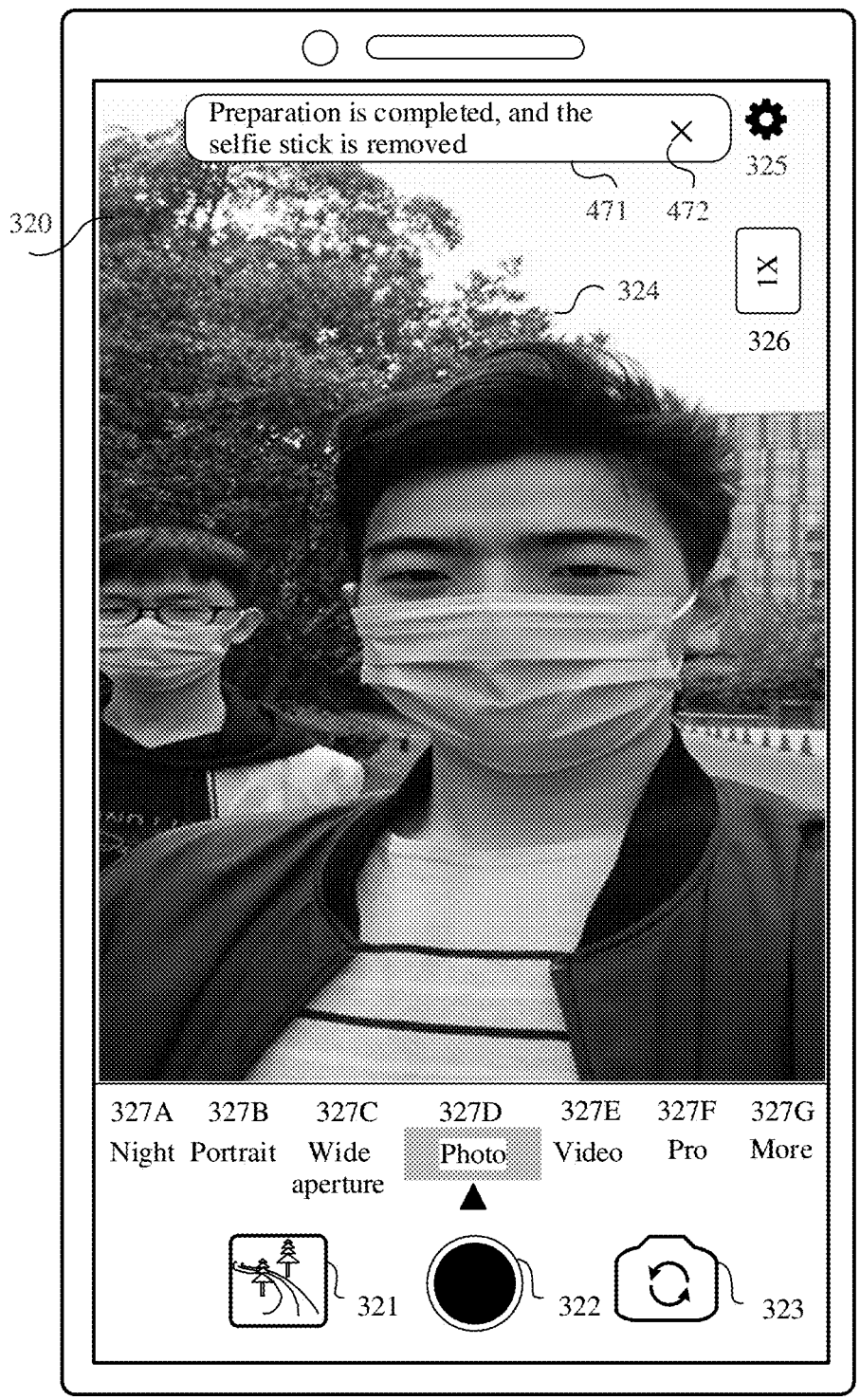

As shown in FIG. 4G, when the countdown ends, the terminal 100 may complete the removal of the selfie stick from the preview picture 324, and display a prompt box 471 and a preview picture 328 obtained after the selfie stick is removed. The prompt box 471 includes a text prompt (for example, "Preparation is completed, and the selfie stick is removed") and a removal disabling control 472. The removal disabling control 472 may be configured to cancel removal of the selfie stick in the preview picture 328.

In some embodiments, after removing the specified image content from the preview picture, the terminal 100 may display image content (including AR static effect image content and AR dynamic effect image content) of an augmented display (augmented reality, AR) effect in an area before the specified image content in the preview picture.

Specifically, the user may place the terminal 100 on the selfie stick, and the user may adjust a shooting angle of the terminal 100 by using the selfie stick. The specified image content to be removed by the terminal 100 may be the selfie stick that appears in a preview picture of Camera. The terminal 100 may detect whether a hand of the user appears around the selfie stick in the preview picture. When the terminal 100 detects that a hand of the user appears around the selfie stick in the preview picture, the terminal 100 may display, after removing the selfie stick from the preview picture, image content of an AR effect in an area in which the hand is in contact with the selfie stick in the preview picture. For example, the terminal 100 may display, by using an AR technology, flashlight image content in the area in which the hand is in contact with the selfie stick in the preview picture.

The terminal 100 may apply, based on different scenarios in the preview picture, different AR effects to an area in which a selfie stick is located in the preview picture after removing the selfie stick in the preview picture. For example, when the terminal 100 detects that a scenario in a preview picture is daytime, after removing a selfie stick held by the user in the preview picture, the terminal 100 may display, by using an AR technology, bouquet image content in an area in which the hand of the user is in contact with the selfie stick. When the terminal 100 detects that a scenario in a preview picture is nighttime, after removing a selfie stick held by the user in the preview picture, the terminal 100 may display, by using an AR technology, flashlight image content in an area in which the hand of the user is in contact with the selfie stick.

In a possible implementation, when the user holds a selfie stick with a hand, a case in which the terminal 100 cannot obtain a part that is of the hand and that is shielded by the selfie stick in the preview picture may occur. When the terminal 100 detects that the hand of the user appears around the selfie stick in the preview picture, the terminal 100 may restore the hand in the preview picture separately by using a hand restoration network after removing the selfie stick in the preview picture, and generate hand details in the part that is of the hand and that is shielded by the selfie stick.

In some embodiments, before removing the specified image content, the terminal 100 may detect whether light intensity in the preview picture is less than a preset threshold. If the light intensity in the preview picture is less than the preset threshold, the terminal 100 may output a light supplement prompt. The light supplement prompt prompts the user to turn on an illuminator, to increase exposure of the preview picture subsequently captured by the terminal 100. Optionally, when detecting that the light intensity in the preview picture is less than the preset threshold, the terminal 100 may alternatively automatically turn on the illuminator on the terminal 100, to enhance exposure of the preview picture subsequently captured by the terminal 100. When detecting that the light intensity in the preview picture is less than the preset threshold, the terminal 100 may alternatively adjust an automatic exposure (auto exposure, AE) policy for photographing by the terminal 100, to increase a contrast of the preview picture subsequently captured by the terminal 100. In this way, the terminal 100 can also improve an effect of removing specified image content in a scenario with relatively low light intensity (for example, at night).

In a possible implementation, before removing the specified image content in the preview picture, the terminal 100 may removes noise in the preview picture. Then, the terminal 100 removes the specified image content in the preview picture by using an image content removal procedure provided in a subsequent embodiment. For the image content removal procedure, refer to the subsequent embodiment. Details are not described herein again.

In some embodiments, one or more pieces of image content in a preview picture of a Camera interface may be removed by the terminal 100. The terminal 100 may receive a tapping operation for the preview picture in the Camera interface. In response to the tapping operation, the terminal 100 may identify specified image content selected by the user in the preview picture, and display a removal confirmation control. The removal confirmation control may be configured to trigger the terminal 100 to remove the specified image content from the preview picture. In this way, the user may select image content that the user wants to remove from the preview picture, and remove the image content.

Figure 5A:
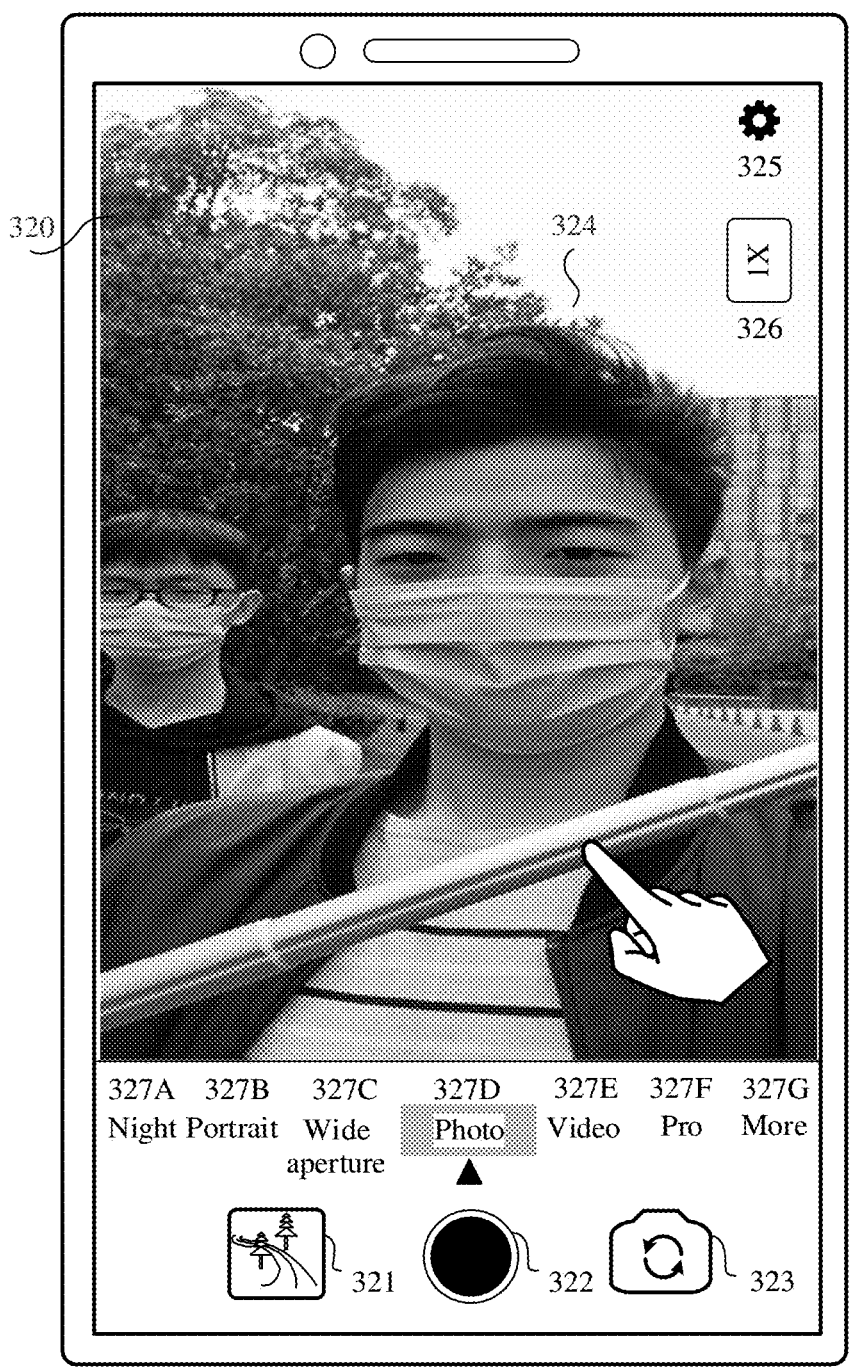
FIG. 5A to FIG. 5C are schematic diagrams of still another group of interfaces according to an embodiment of this application.

For example, as shown in FIG. 5A, the terminal 100 may receive a tapping operation (for example, tapping, double tapping, or touching and holding) performed by the user on the preview picture 324 in the Camera interface 320. In response to the tapping operation, the terminal 100 may identify, based on a position on which the tapping operation is performed in the preview picture 324, specified image content selected by the user as a selfie stick.

Figure 5B:
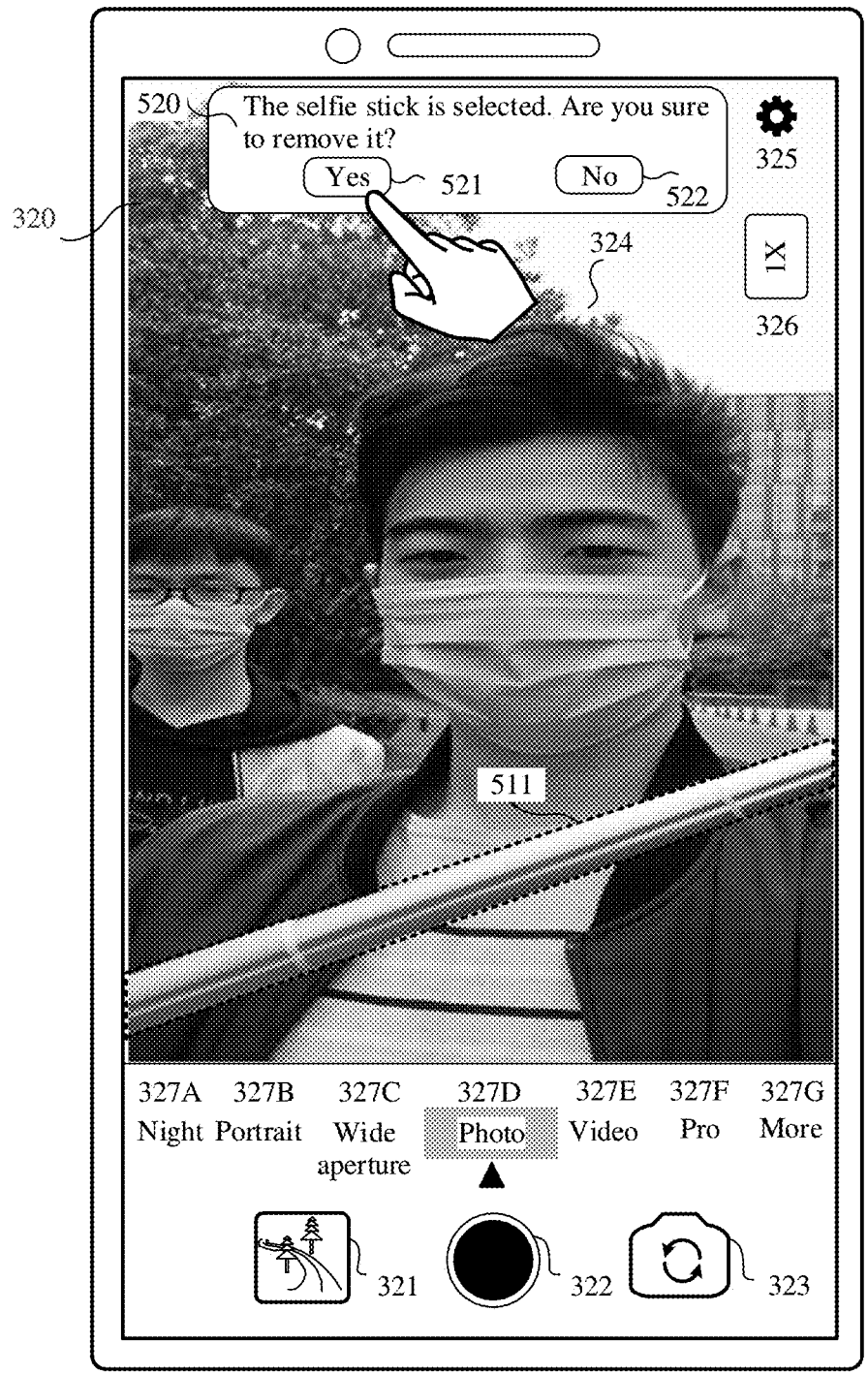

As shown in FIG. 5B, after identifying the specified image content selected by the user as the selfie stick, the terminal 100 may display a prompt box 520 and a mark box 511 around the selfie stick. The mark box 511 may be used to provide the user a prompt that the selfie stick in the mark box 511 is selected. The prompt box 520 includes a text prompt (for example, "The selfie stick is identified. Do you want to remove it?"), a removal confirmation control 521 and a removal refusal control 522. The removal confirmation control 521 may be configured to trigger the terminal 100 to remove the specified image content (for example, the selfie stick) from the preview picture. The removal refusal control 522 may trigger the terminal 100 to refuse to remove the specified image content (for example, the selfie stick) from the preview picture.

The terminal 100 may receive an input (for example, a tap) of the user for the removal confirmation control 521. In response to the input, the terminal boo may remove the selfie stick from the preview picture 324, and replace the preview picture 324 with the preview picture 328 shown in FIG. 5C.

Figure 5C:
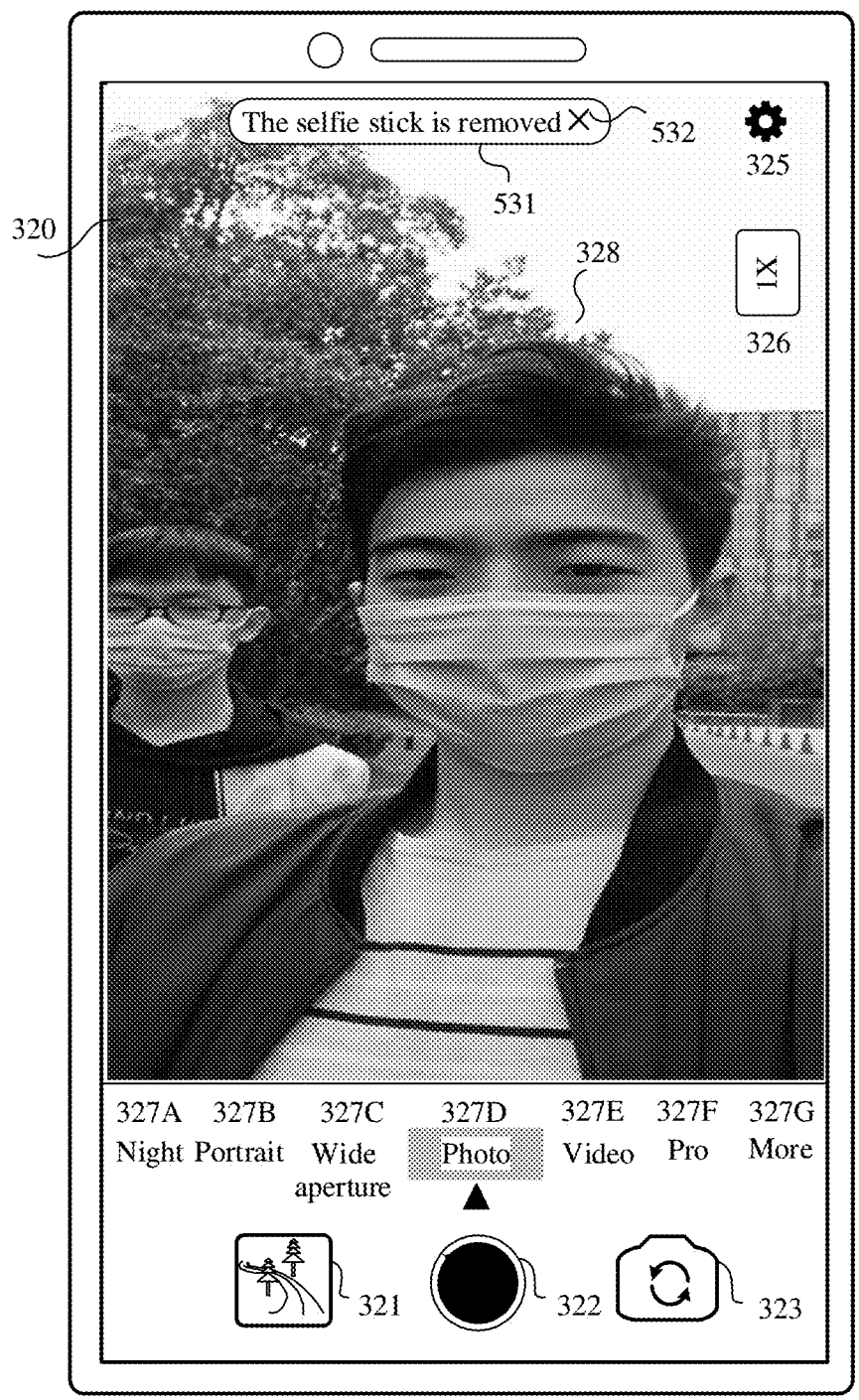

As shown in FIG. 5C, the preview picture 328 does not include the selfie stick. Optionally, after removing the selfie stick from the preview picture 324, the terminal 100 may further display a prompt box 531. The prompt box 531 includes a text prompt (for example, "The selfie stick is removed") and a removal disabling control 532. The removal disabling control 532 may be configured to trigger the terminal 100 to cancel removal of the specified image content in the preview picture.

In some embodiments, one or more pieces of image content in a preview picture of a Camera interface may be removed by the terminal 100. After identifying one or more pieces of removable image content in the preview picture, the terminal 100 may mark the one or more pieces of removable image content. The terminal 100 may receive an input of the user for selecting to-be-removed specified image content from the one or more pieces of removable image content. In response to the input, the terminal 100 may remove the specified image content from the preview picture. In this way, it can be convenient for the user to select image content that the user wants to remove from the preview picture, and remove the image content.

Figure 6A:
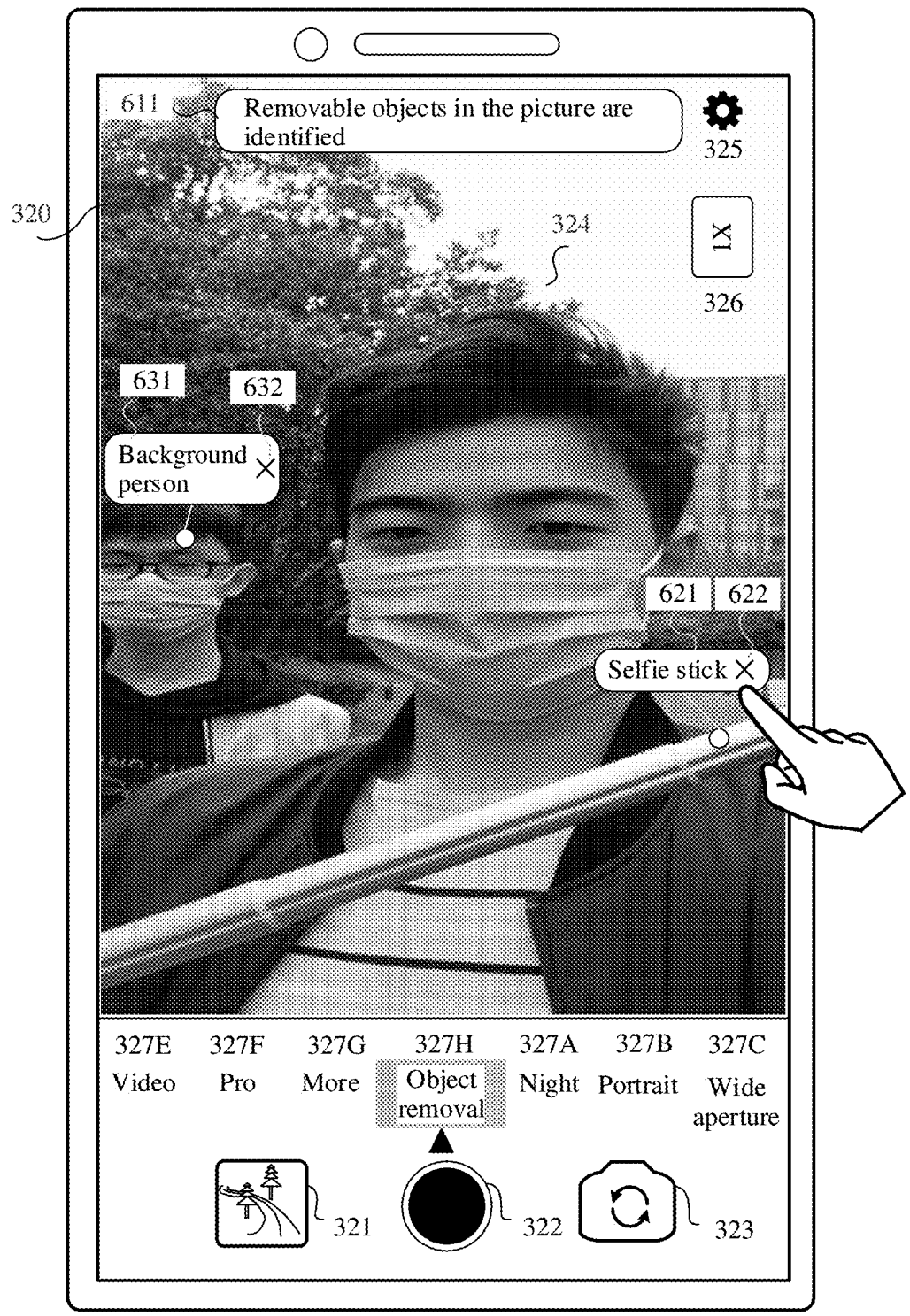
FIG. 6A to FIG. 6C are schematic diagrams of yet another group of interfaces according to an embodiment of this application.

For example, as shown in FIG. 6A, the terminal boo may receive an input (for example, a tap) of the user for selecting an object removal mode control 327H. In response to the input, the terminal boo may switch to an object removal shooting mode. In the object removal shooting mode, after identifying that one or more pieces of removable image content in the preview picture 324 include a background person and a selfie stick, the terminal 100 may display a label 631 around the background person in the preview picture, and display a label 621 around the selfie stick in the preview picture. The label 631 may include description text "Background person" and a removal control 632. The removal control 632 may be configured to trigger the terminal 100 to remove the background person from the preview picture 324. The label 621 may include description text "Selfie stick" and a removal control 622. The removal control 622 may be configured to trigger the terminal 100 to remove the selfie stick from the preview picture 324. Optionally, after identifying that the one or more pieces of removable image content in the preview picture 324 include the background person and the selfie stick, the terminal 100 may further display a prompt 611. The prompt 611 may provide the user with a prompt that the removable image content in the preview picture is identified. Text "Removable objects in the picture are identified" may be displayed on the prompt 611.

The terminal 100 may receive an input (for example, a tap) of the user for the removal control. In response to the input, the terminal 100 may remove image content corresponding to the removal control in the preview picture. Optionally, after removing the image content corresponding to the removal control, the terminal 100 may further display a cancellation control. The cancellation control may be configured to trigger the terminal 100 to cancel the removal of the image content.

Figure 6B:
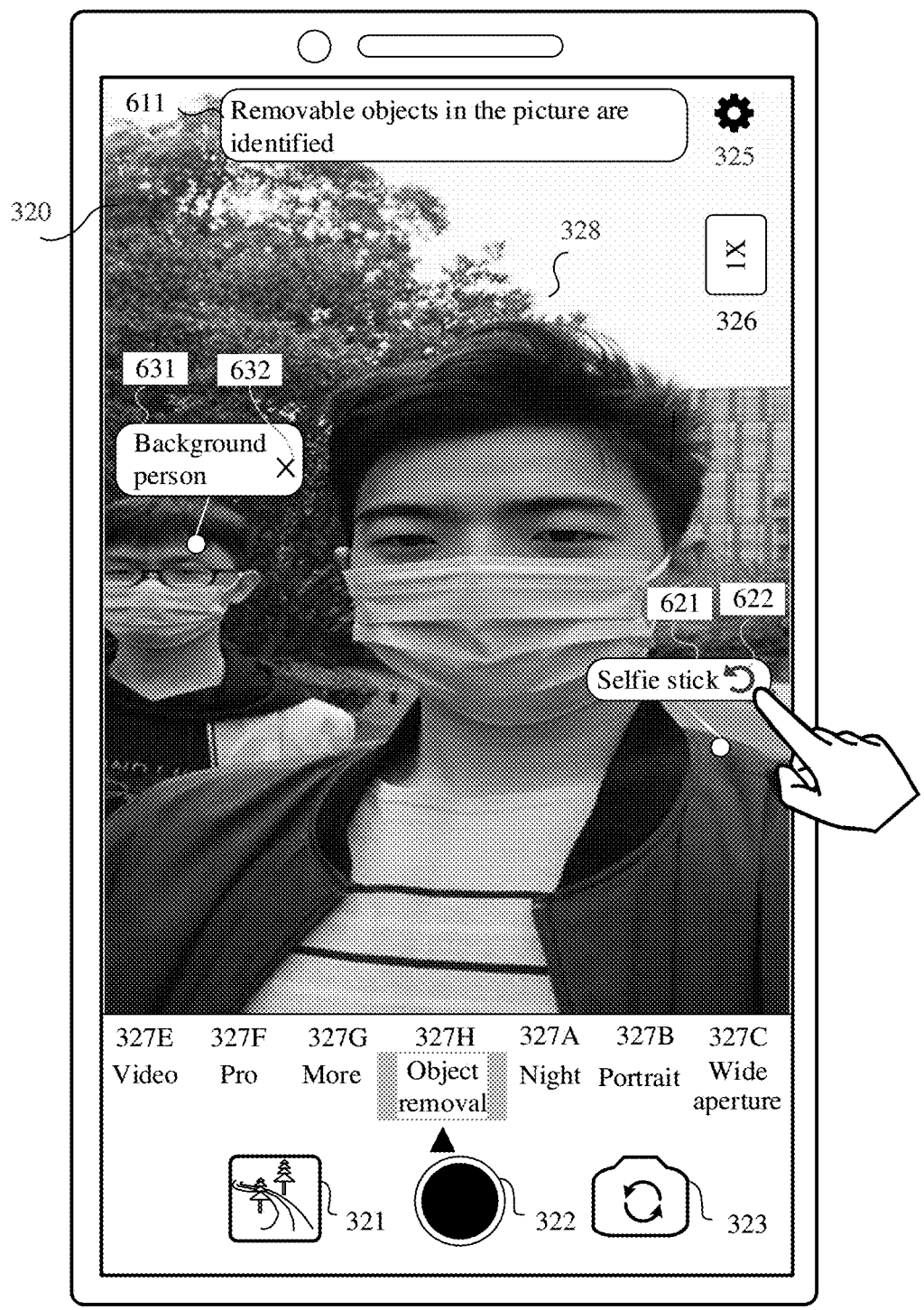

For example, as shown in FIG. 6B, the terminal 100 may receive a tap operation of the user for the removal control 622. In response to the tap operation, the terminal 100 may remove the selfie stick from the preview picture 324 and display the preview picture 328. The preview picture 328 does not include the selfie stick. Optionally, in response to the tap operation for the removal control 622, the terminal 100 may further replace the removal control 622 with a cancellation control 623 in the label 621 of the selfie stick. The cancellation control 623 may be configured to trigger the terminal 100 to cancel the removal of the selfie stick.

Figure 6C:
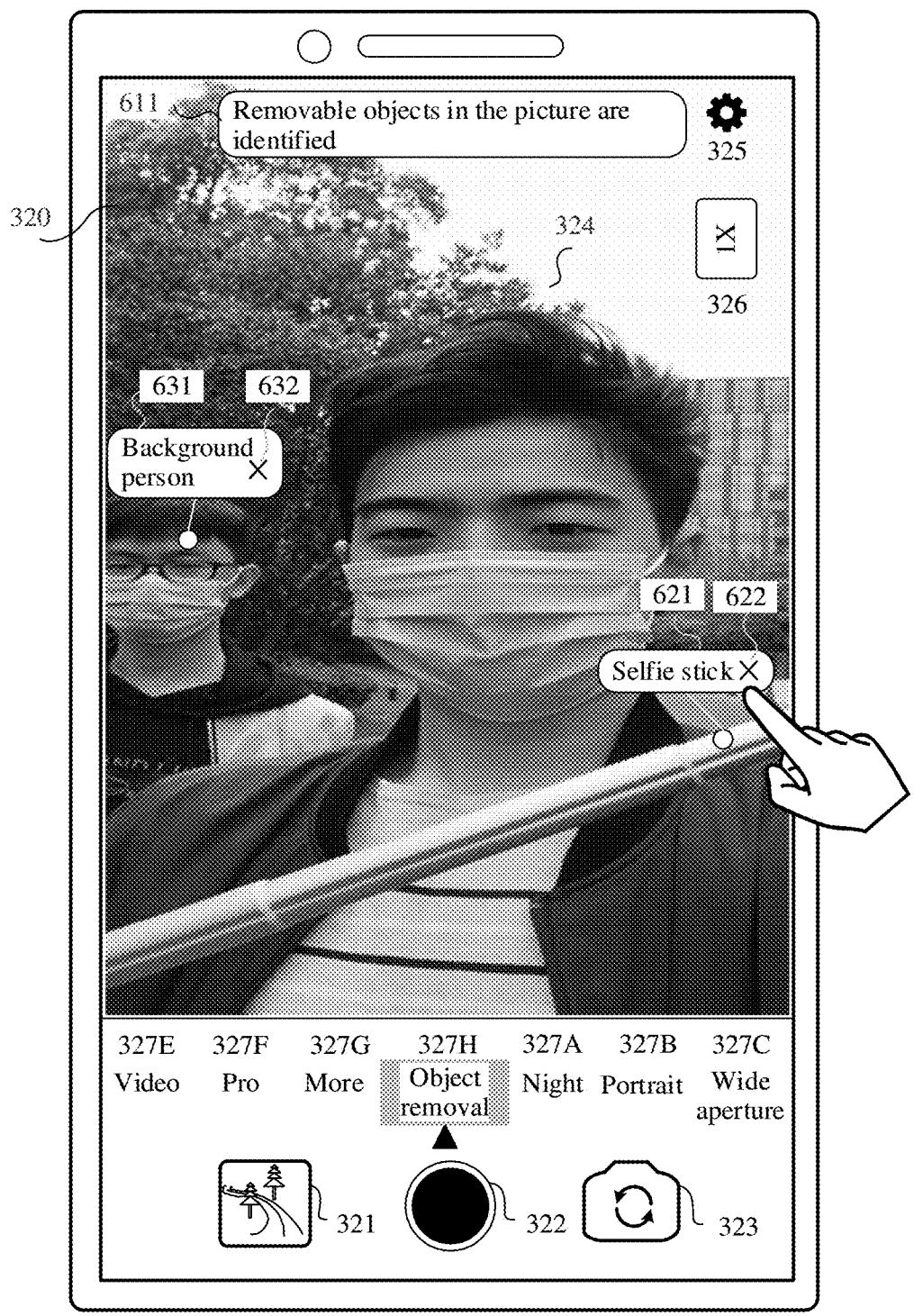

As shown in FIG. 6C, the terminal 100 may cancel the removal of the selfie stick in the preview picture 328 in response to a received input (for example, a tap) performed by the user on the cancellation control 623, display the preview picture 324, and replace the cancellation control 623 with the removal control 622. The preview picture 324 includes the selfie stick.

In this embodiment of this application, after the terminal 100 identifies one or more pieces of removable image content in the preview picture and marks the one or more pieces of removable image content, the terminal 100 may alternatively identify a gesture or a facial expression action of the user in the preview picture. The terminal 100 may determine image content corresponding to the gesture or the facial expression action of the user as the specified image content.

For example, the terminal 100 may identify two pieces of image content, for example, a selfie stick and a background person. The terminal 100 may label the three pieces of image content. The selfie stick may be labeled as 1, and the background person may be labeled as 2. When the terminal 100 recognizes that the user makes a gesture 1 (for example, stretching out one finger) or a facial expression action 1 (for example, continuously blinking two times), the terminal 100 may determine the selfie stick in the preview picture as the specified image content to be removed. When the terminal 100 recognizes that the user makes a gesture 2 (for example, stretching out two fingers) or a facial expression action 2 (for example, continuously blinking three times), the terminal 100 may determine the background person in the preview picture as the specified image content to be removed. The foregoing example is merely used to explain this application and shall not be construed as a limitation.

Optionally, after the terminal 100 identifies one or more pieces of removable image content in the preview picture and marks the one or more pieces of removable image content, the terminal 100 may alternatively receive a voice input of the user. In response to the voice input of the user, the terminal 100 may analyze semantics of the voice input by the user, and determine, based on the semantics, the specified image content to be removed.

For example, the terminal 100 may identify two pieces of image content, for example, a selfie stick and a background person. The terminal 100 may mark the selfie stick and the background person in the preview picture. When semantics of a user voice input received by the terminal 100 is "to remove the selfie stick", the terminal 100 may determine the selfie stick as the specified image content to be removed. The foregoing example is merely used to explain this application and shall not be construed as a limitation.

Optionally, after the terminal 100 identifies one or more pieces of removable image content in the preview picture and marks the one or more pieces of removable image content, the terminal 100 may alternatively receive, by using a device that has established a connection such as a Bluetooth connection, a selection input of the user for the image content. In response to the selection input, the terminal 100 may determine the specified image content to be removed.

For example, the terminal 100 is connected to a Bluetooth headset through Bluetooth. The terminal 100 may identify two pieces of image content in the preview picture, for example, a selfie stick and a background person. The terminal 100 may mark the selfie stick and the background person in the preview picture. When the user continuously taps the Bluetooth headset two times, the Bluetooth headset may send an instruction 1 to the terminal wo, and the terminal 100 may determine, based on the instruction 1, that the selfie stick is the specified image content to be removed. When the user continuously taps the Bluetooth headset three times, the Bluetooth headset may send an instruction 2 to the terminal wo, and the terminal 100 may determine, based on the instruction 2, that the background person is the specified image content to be removed. The example is merely used to explain this application and shall not be construed as a limitation.

In some embodiments, the user may enable, in Camera, a shooting mode (for example, a selfie stick mode) for removing specified image content (for example, a selfie stick). After the shooting mode for removing the specified image content is enabled, the terminal 100 may automatically identify the specified image content in the preview picture, and remove the specified image content from the preview picture. In this way, the user directly sets, in Camera, the selfie stick mode for removing the specified image content, so that the terminal 100 can automatically remove the specified image content from the preview picture. It is convenient for the user to quickly remove unwanted image content.

Figure 7A:
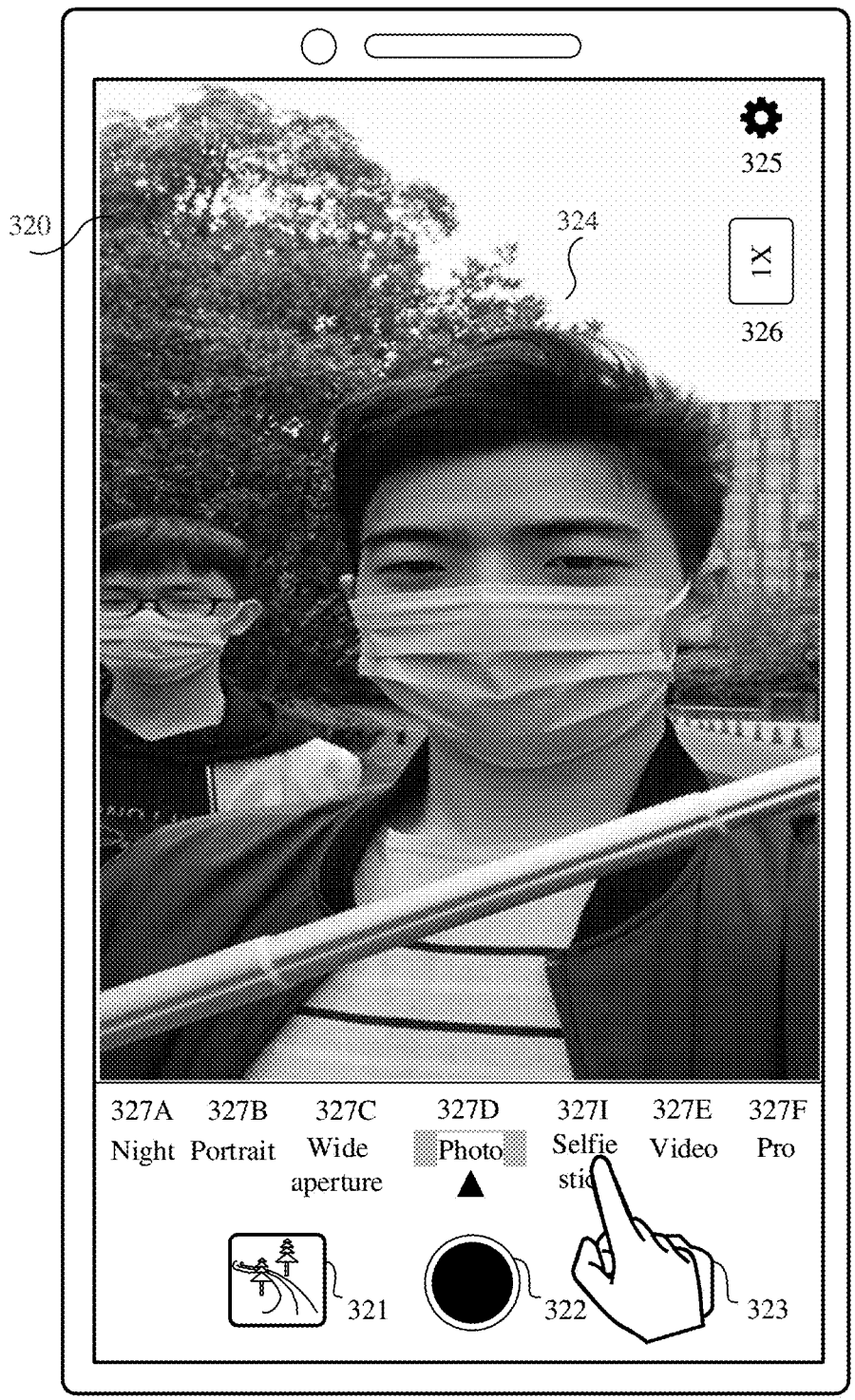
FIG. 7A to FIG. 7F are schematic diagrams of still yet another group of interfaces according to an embodiment of this application.
Figure 7B:
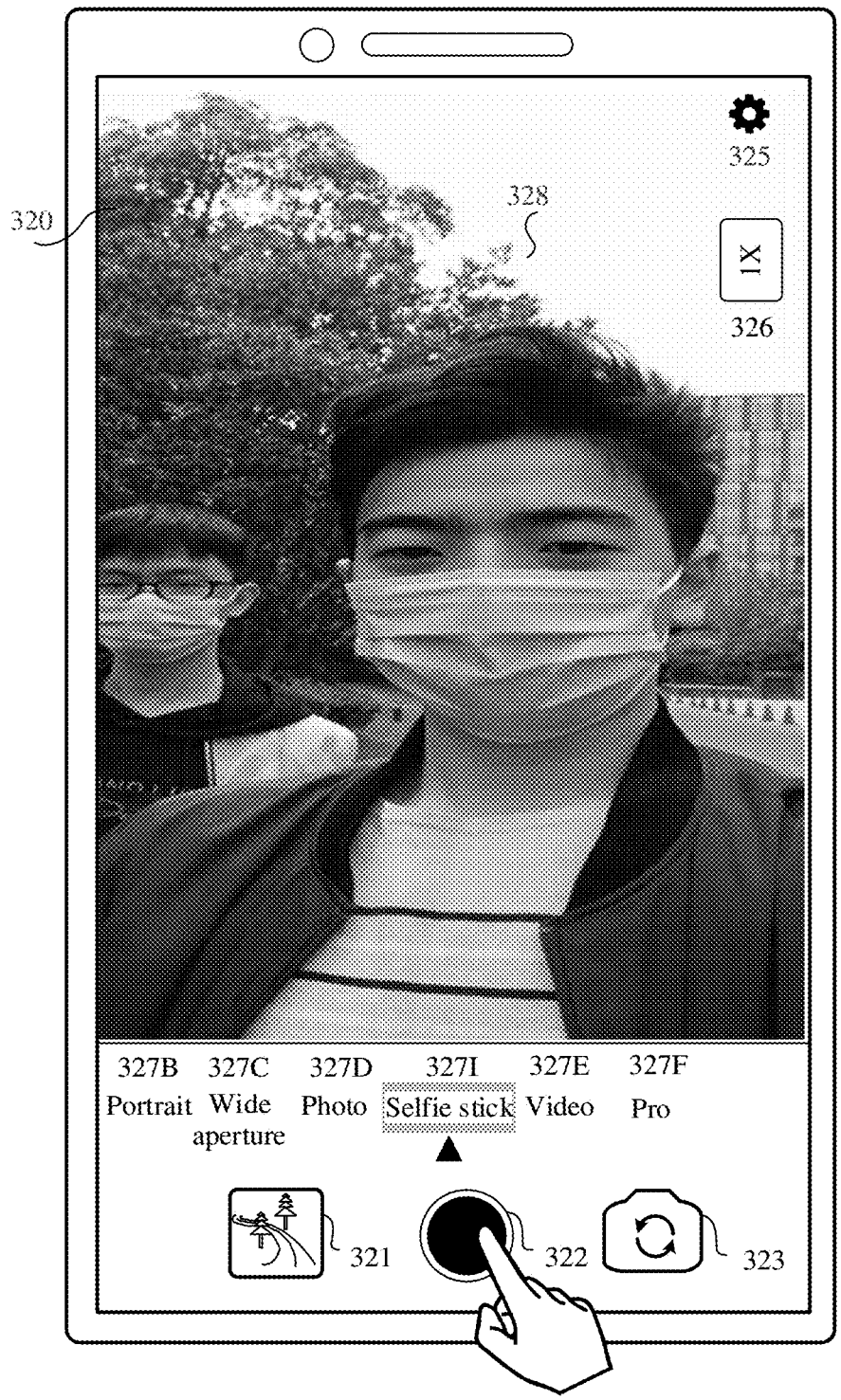

For example, as shown in FIG. 7A, the terminal boo may receive an input (for example, a tap) of the user for selecting a selfie stick mode control 327I. In response to the input, the terminal 100 may switch from a "photo mode" to a "selfie stick mode". In the selfie stick mode, the terminal 100 may automatically remove the selfie stick from the preview picture 324 after identifying the selfie stick in the preview picture 324. As shown in FIG. 7B, after the terminal 100 removes the selfie stick from the preview picture 324, the terminal 100 may display the preview picture 328. The preview picture 328 does not include the selfie stick. The terminal 100 may receive an input (for example, a tap) performed by the user on the shooting control 322. In response to the input, the terminal 100 may save the preview picture 328 as a picture.

In a possible implementation, the user may enable, in Camera, a shooting mode (for example, a selfie stick mode) for removing specified image content (for example, a selfie stick). After the shooting mode for removing the specified image content is enabled, and before the terminal 100 receives an input of the user for a shooting control, the terminal 100 does not remove the specified image content from the preview picture. The terminal 100 may obtain a target picture from the preview picture in response to the received input performed by the user on the shooting control, then remove the specified image content from the target picture, and locally save, in the terminal 100, a target picture obtained after the specified image content is removed.

Figure 7C:
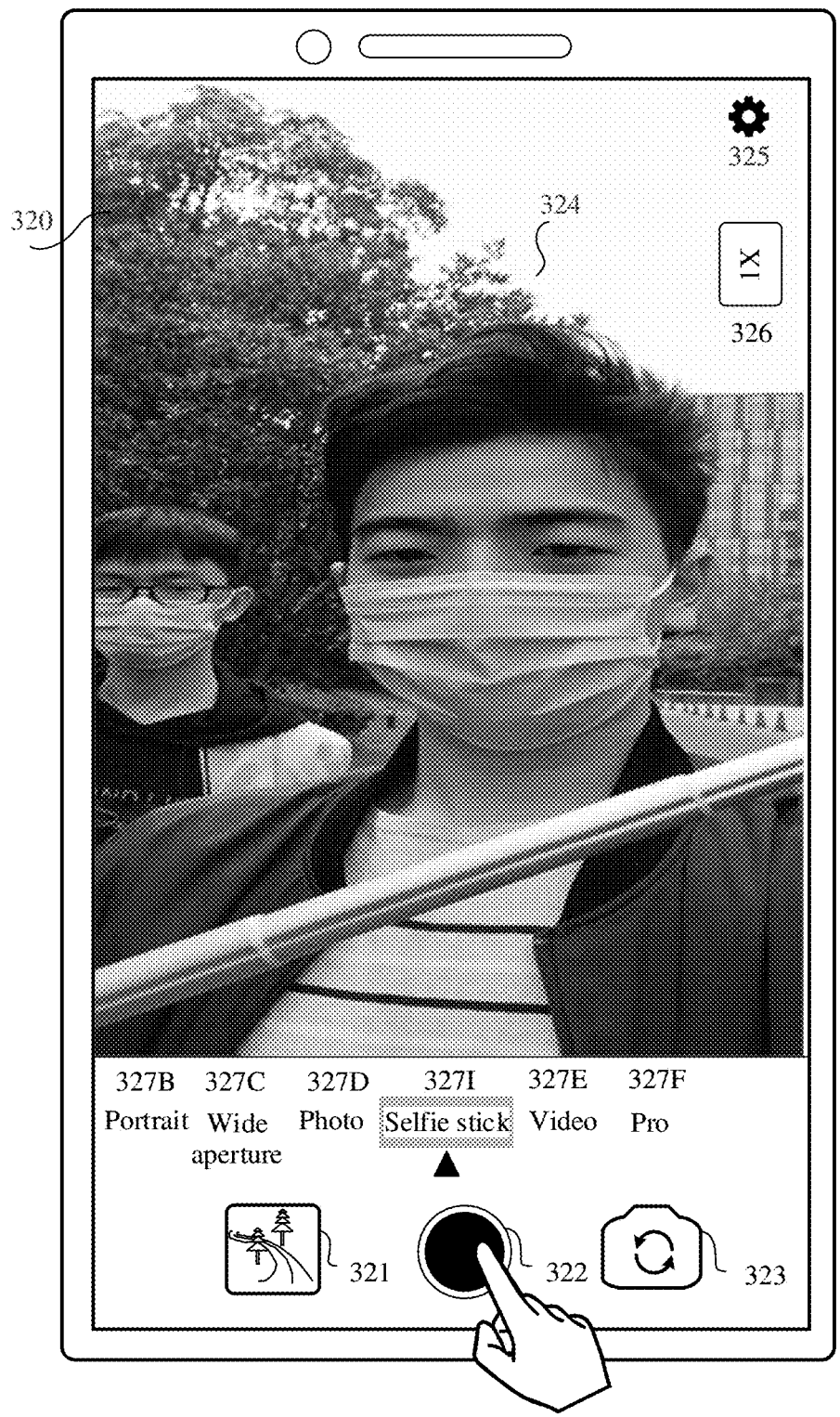

For example, as shown in FIG. 7C, in the selfie stick mode, the terminal 100 currently displays the preview picture 324. The terminal 100 may receive an input (for example, a tap) of the user for the shooting control 322. In response to the input, the terminal 100 may use the preview picture 324 as a target picture and remove the selfie stick from the target picture.

Figure 7D:
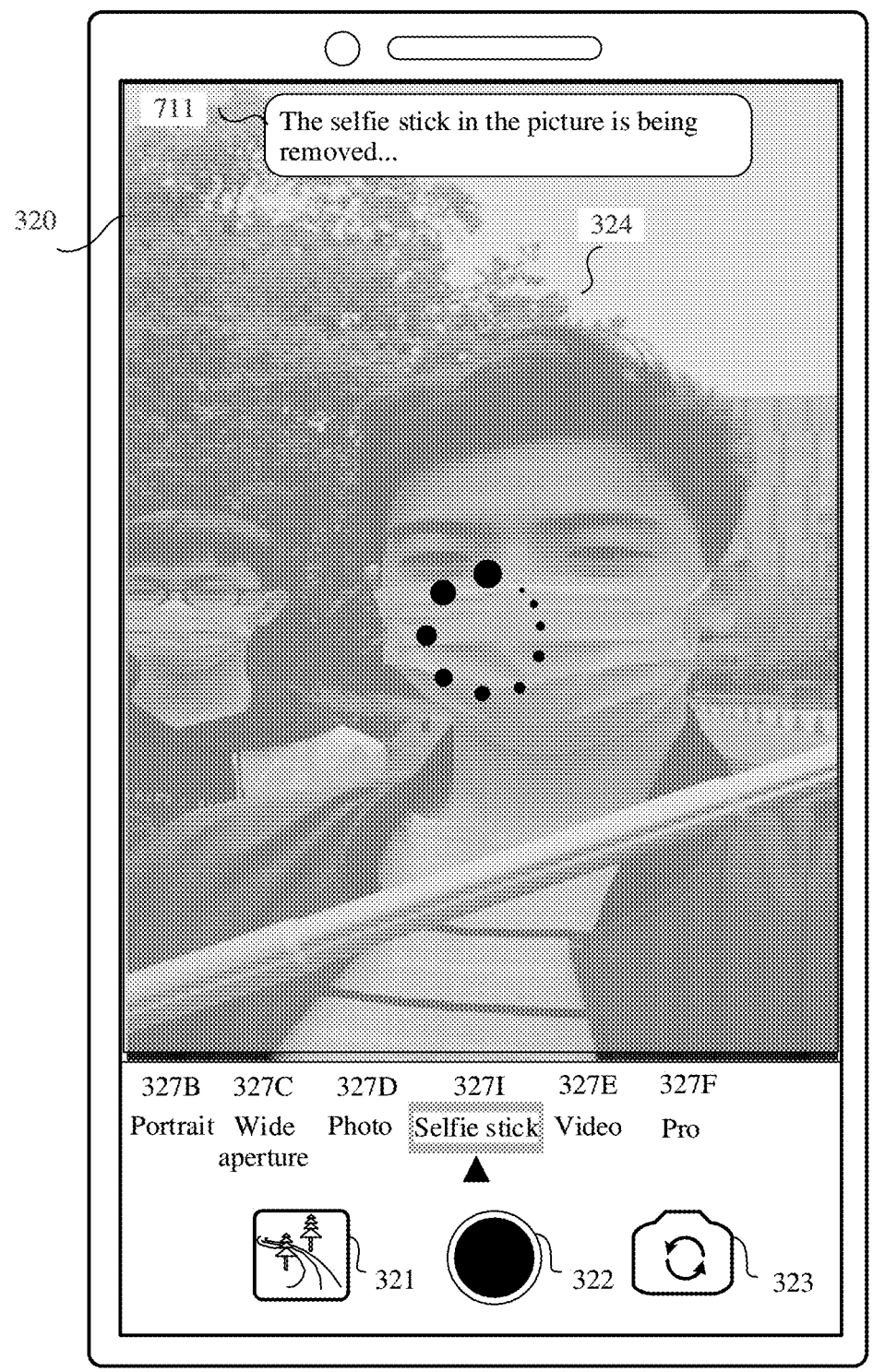

As shown in FIG. 7D, in a process in which the terminal 100 removes the selfie stick from the target picture, the terminal 100 may output a prompt 711. The prompt 711 may provide the user with a prompt that the selfie stick is being removed from the target picture. The prompt 711 may be a text prompt, for example, "The selfie stick in the picture is being removed . . . "

Figure 7E:
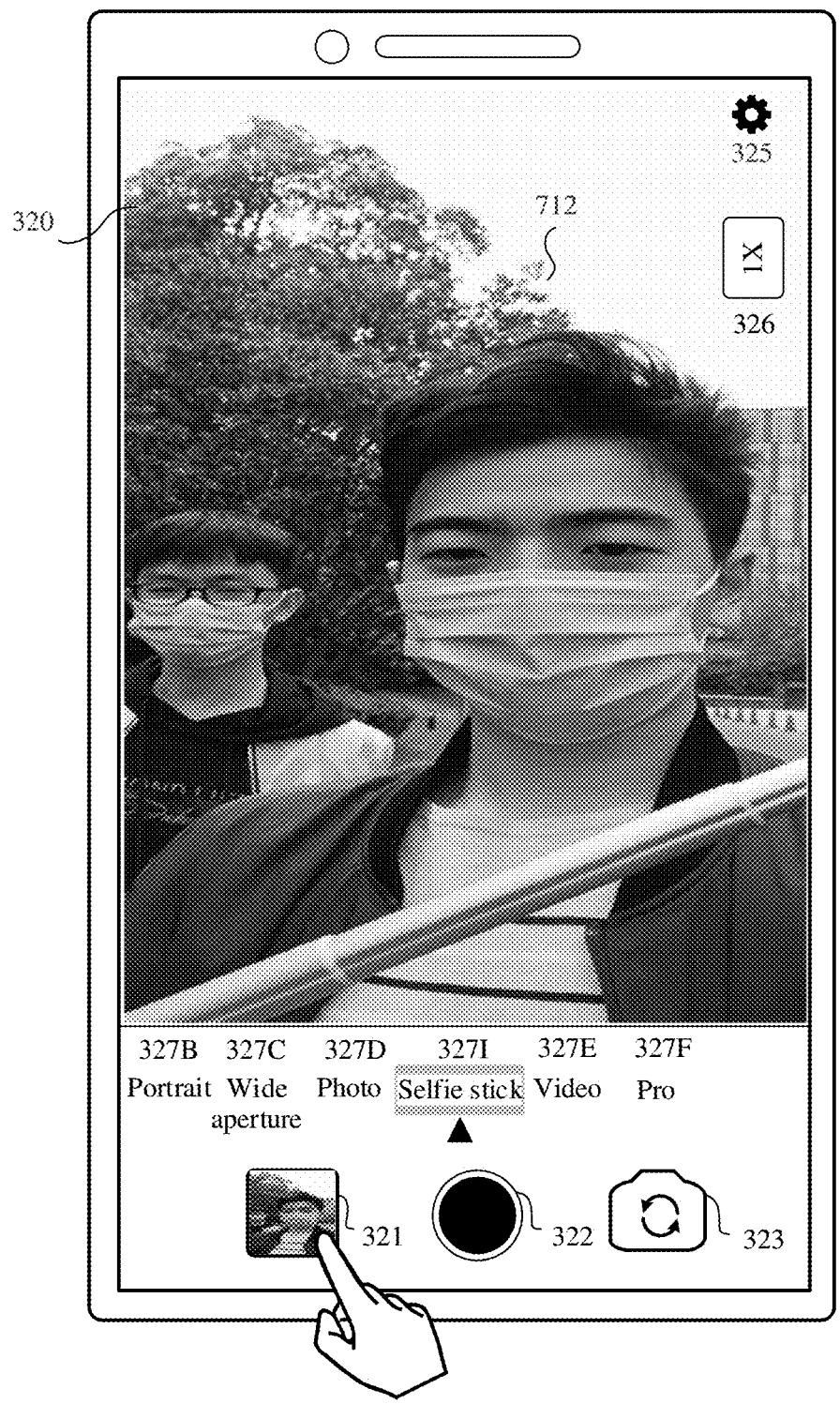

As shown in FIG. 7E, after the terminal 100 removes the selfie stick from the target picture, the terminal 100 may store, in Gallery, a target picture obtained after the selfie stick is removed, and display, on the redisplay control 321, a thumbnail corresponding to the target picture obtained after the selfie stick is removed. The terminal 100 may receive an input (for example, a tap) performed by the user on the redisplay control 321. In response to the input, the terminal 100 may display a picture browsing interface 730 shown in FIG. 7F.

Figure 7F:
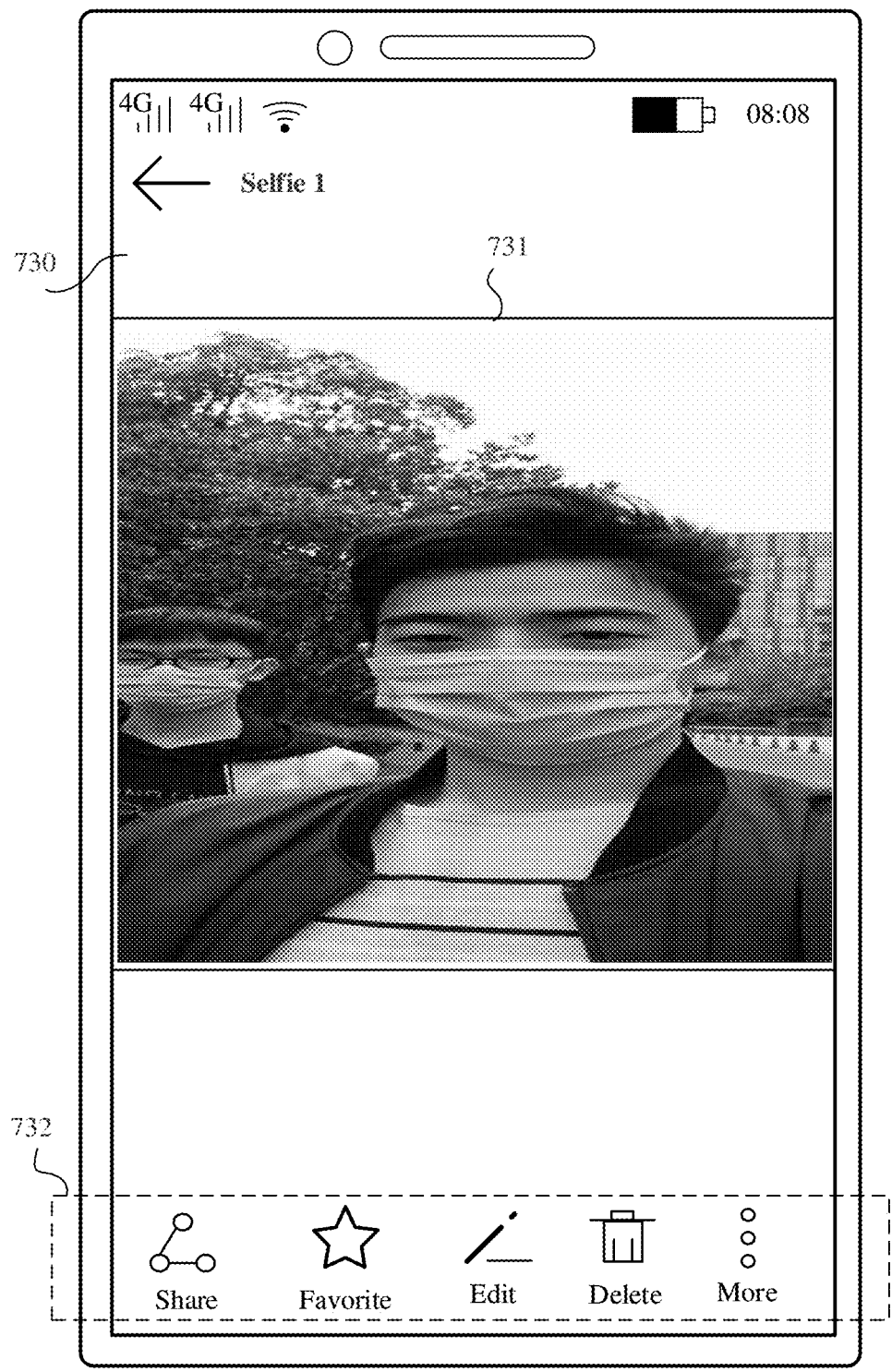

As shown in FIG. 7F, the picture browsing interface 730 includes a picture 731 and a menu 732. The picture 731 is the target picture obtained after the selfie stick is removed. The menu 732 may include a "Share" button, a "Favorite" button, an "Edit" button, a "Delete" button, and a "More" button. The "Share" button may be used to trigger sharing of the picture 731. The "Favorite" button may be used to trigger adding of the picture 731 to a picture favorites folder. The "Edit" button may be used to trigger editing functions such as rotation, cropping, filtering, and blurring, of the picture 731. The "Delete" button may be used to trigger deletion of the picture 731. The "More" button may be used to trigger enabling of more functions related to the picture 731.

In some embodiments, when a user uses the terminal 100 to perform video recording, the terminal 100 may identify whether specified image content (for example, a selfie stick) exists in a frame of picture of a recorded video. When identifying that the specified image content exists, the terminal 100 may remove the specified image content from the frame of picture of the recorded video, and display a frame of picture obtained after the specified image content is removed. In this way, image content that the user does not want in the recorded video can be removed in real time when the user performs the video recording. This improves a display effect of image content that the user wants in the recorded video, and improves user experience.

Figure 8A:
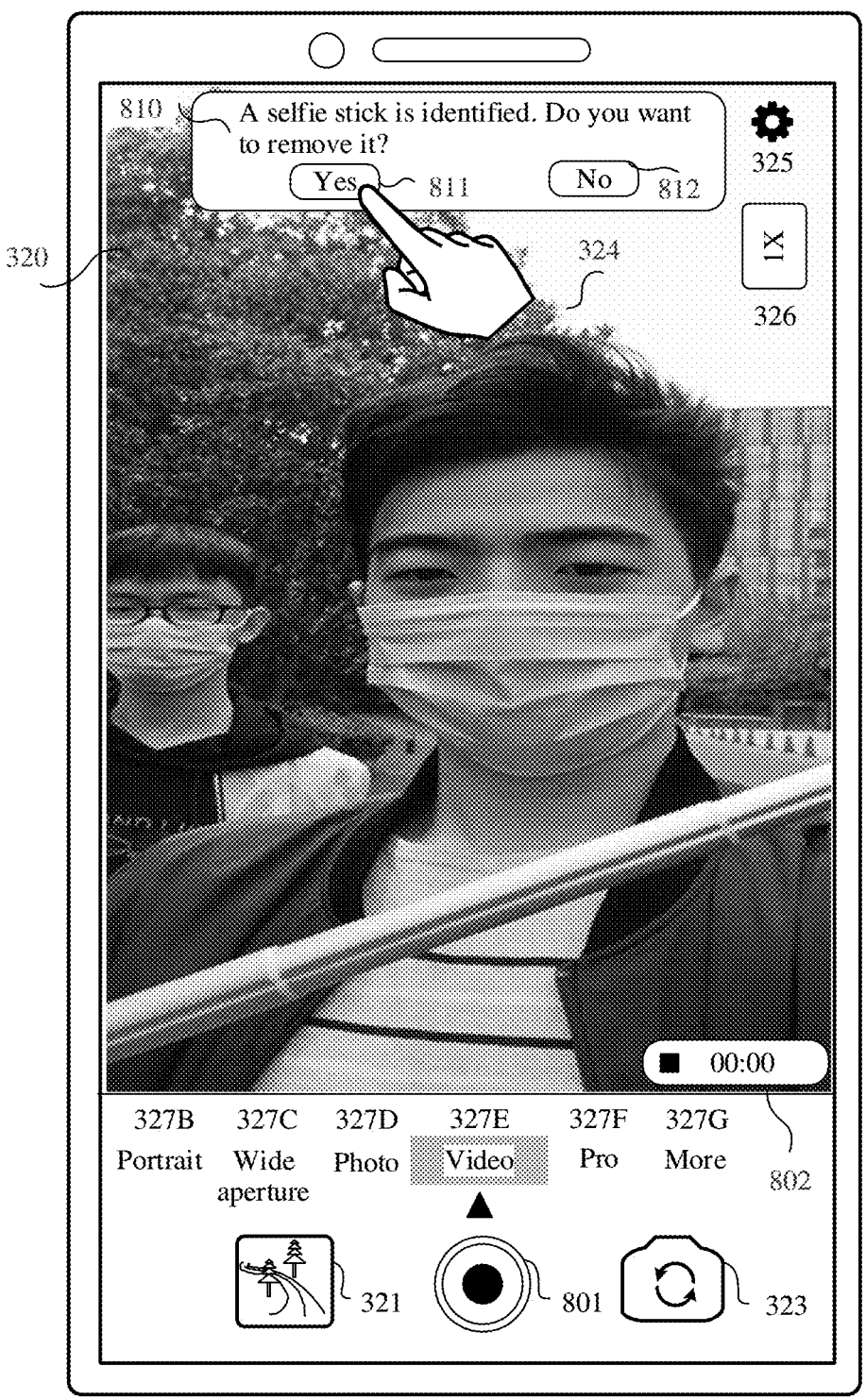
FIG. 8A to FIG. 8C are schematic diagrams of a further group of interfaces according to an embodiment of this application.

For example, as shown in FIG. 8A, the terminal 100 may display the Camera interface 320. The terminal 100 may receive an input (for example, a tap) of the user for selecting the "video mode" control 327E. In response to the input, the terminal 100 may switch from a "photo mode" to a "video mode", and replace the shooting control 322 with a video recording start control 801. The terminal 100 may further display video recording time information 802. In the video mode, the terminal 100 may identify a selfie stick in the preview picture 324 and output a prompt box 810. The prompt box 810 includes a text prompt (for example, "A selfie stick is identified. Do you want to remove it?"), a removal confirmation control 811 and a removal refusal control 812. The removal confirmation control 811 may be configured to trigger the terminal 100 to remove the specified image content from the preview picture. The removal refusal control 812 may trigger the terminal 100 to refuse to remove the specified image content from the preview picture.

The terminal 100 may receive an input (for example, a tap) of the user for the removal confirmation control 811. In response to the input, the terminal boo may remove the selfie stick from the preview picture 324, and replace the preview picture 324 with the preview picture 328 shown in FIG. 8B.

Figure 8B:
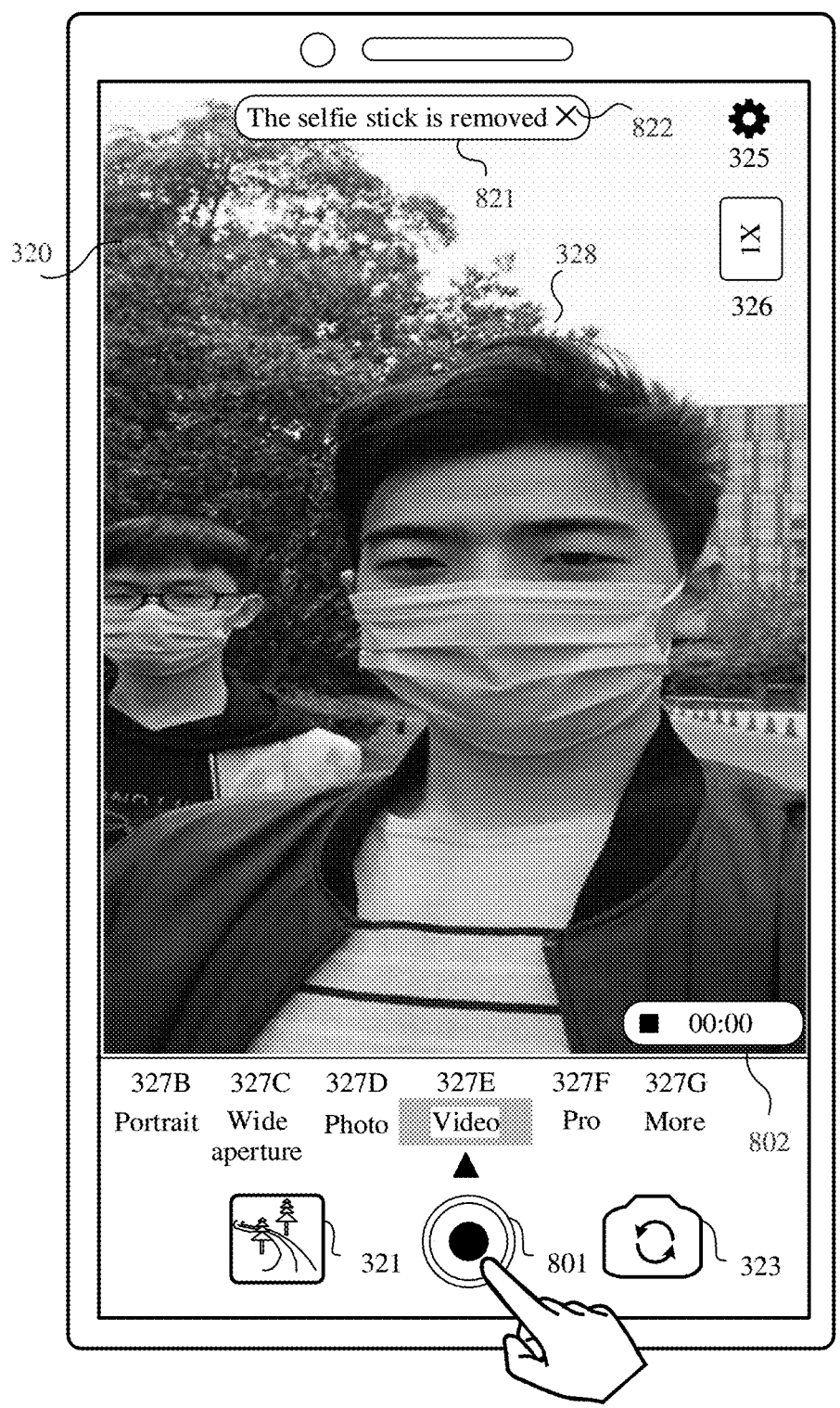

As shown in FIG. 8B, the preview picture 328 does not include the selfie stick. Optionally, after removing the selfie stick from the preview picture 324, the terminal 100 may further display a prompt box 821. The prompt box 821 includes a text prompt (for example, "The selfie stick is removed") and a removal disabling control 822. The removal disabling control 822 may be configured to trigger the terminal 100 to cancel removal of the specified image content in the preview picture.

The terminal 100 may receive an input (for example, a tap) performed by the user on the video recording start control 801. In response to the input, the terminal 100 may start video recording, and remove the specified image content from each frame of picture in a video recording process.

Figure 8C:
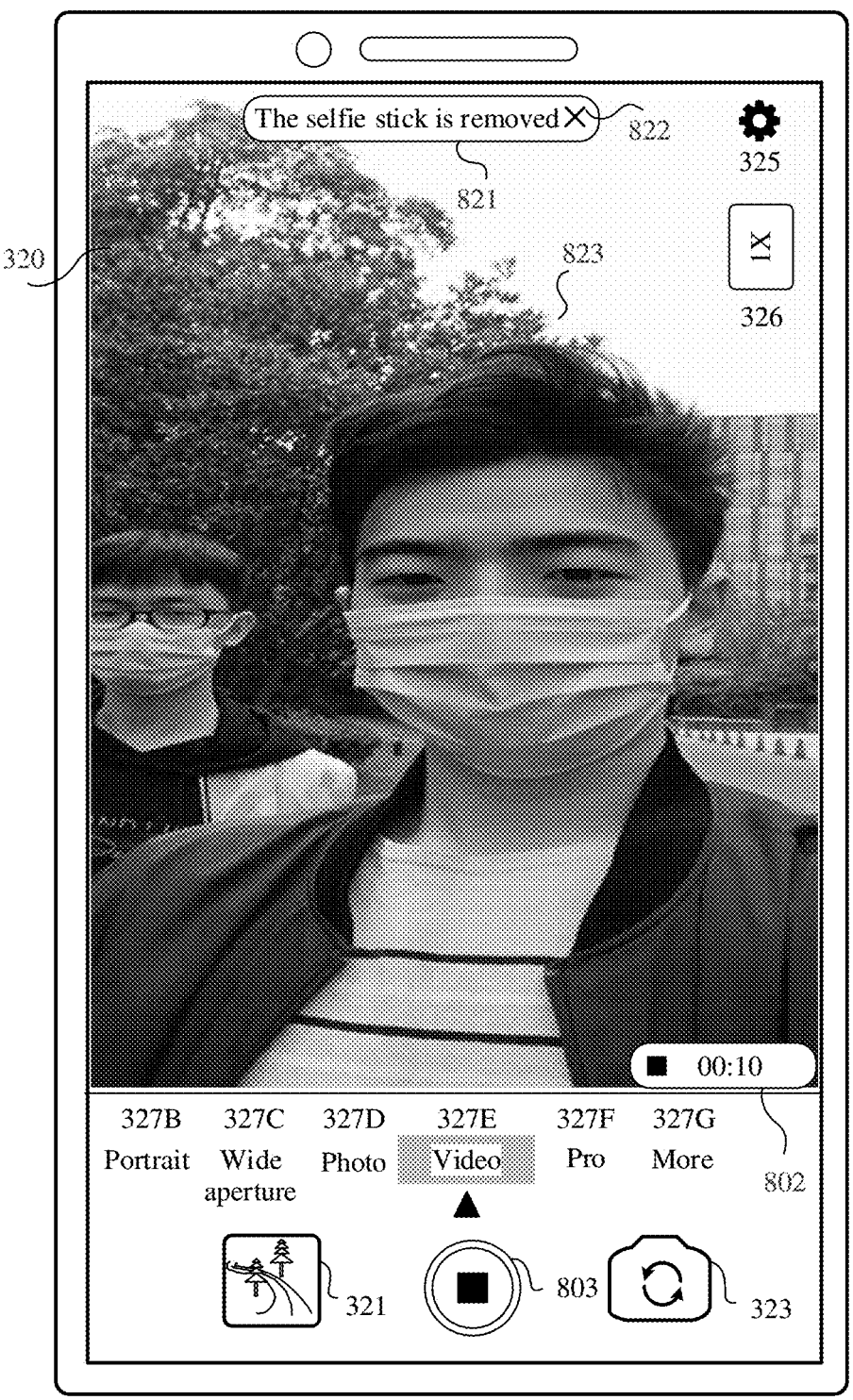

As shown in FIG. 8C, after starting video recording, the terminal 100 may replace the video recording start control 801 with a video recording end control 803. The video recording end control 803 may be configured to trigger the terminal 100 to end the video recording. After starting the video recording, the terminal 100 may remove the selfie stick from each frame of picture in the video recording process. For example, the selfie stick does not exist in a frame of picture 823 displayed by the terminal 100 at the loth second of the video recording.

The terminal 100 may receive an input (for example, a tap) performed by the user on the video recording end control 803. In response to the input, the terminal 100 may end the video recording, and store a recorded video obtained after the selfie stick is removed.

In some application scenarios, after shooting a picture or a video, the terminal 100 may locally store the shot picture or video. The user may view, in Gallery of the terminal 100, a picture or a video shot by the terminal 100 and a picture or a video obtained from another device or a network. The terminal 100 may remove specified image content from a stored picture or video. In this way, it can be convenient for the user to remove, at any time after completing shooting of a picture or a video, image content that the user does not want in the shot picture or video.

Figure 9A:
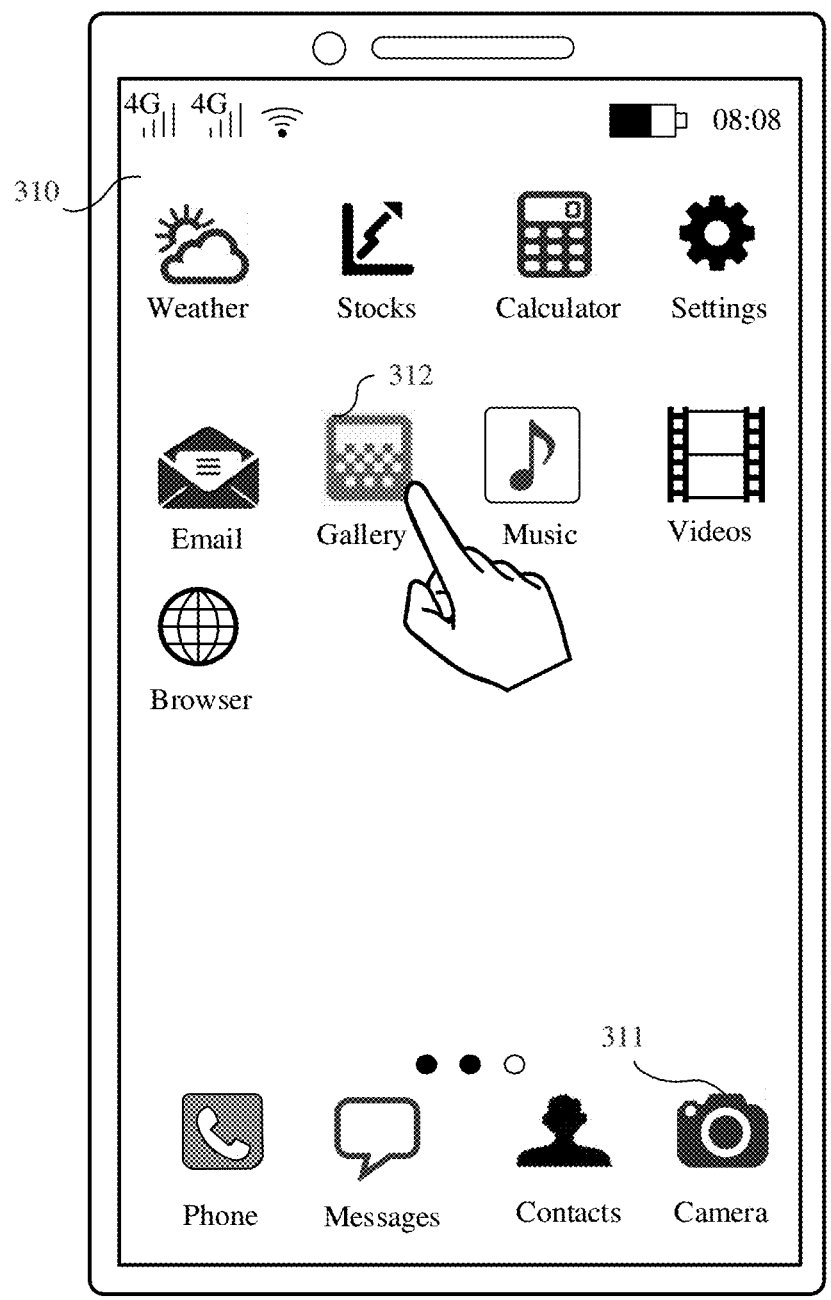
FIG. 9A to FIG. 9F are schematic diagrams of a still further group of interfaces according to an embodiment of this application.

For example, as shown in FIG. 9A, the terminal boo may display the interface 310 of the home screen. For text descriptions of the interface 310, refer to the embodiment shown in FIG. 3A. Details are not described herein again.

The terminal 100 may receive an input (for example, a tap) performed by the user on the Gallery icon 312. In response to the input, the terminal 100 may display a Gallery interface 910 shown in FIG. 9B.

Figure 9B:
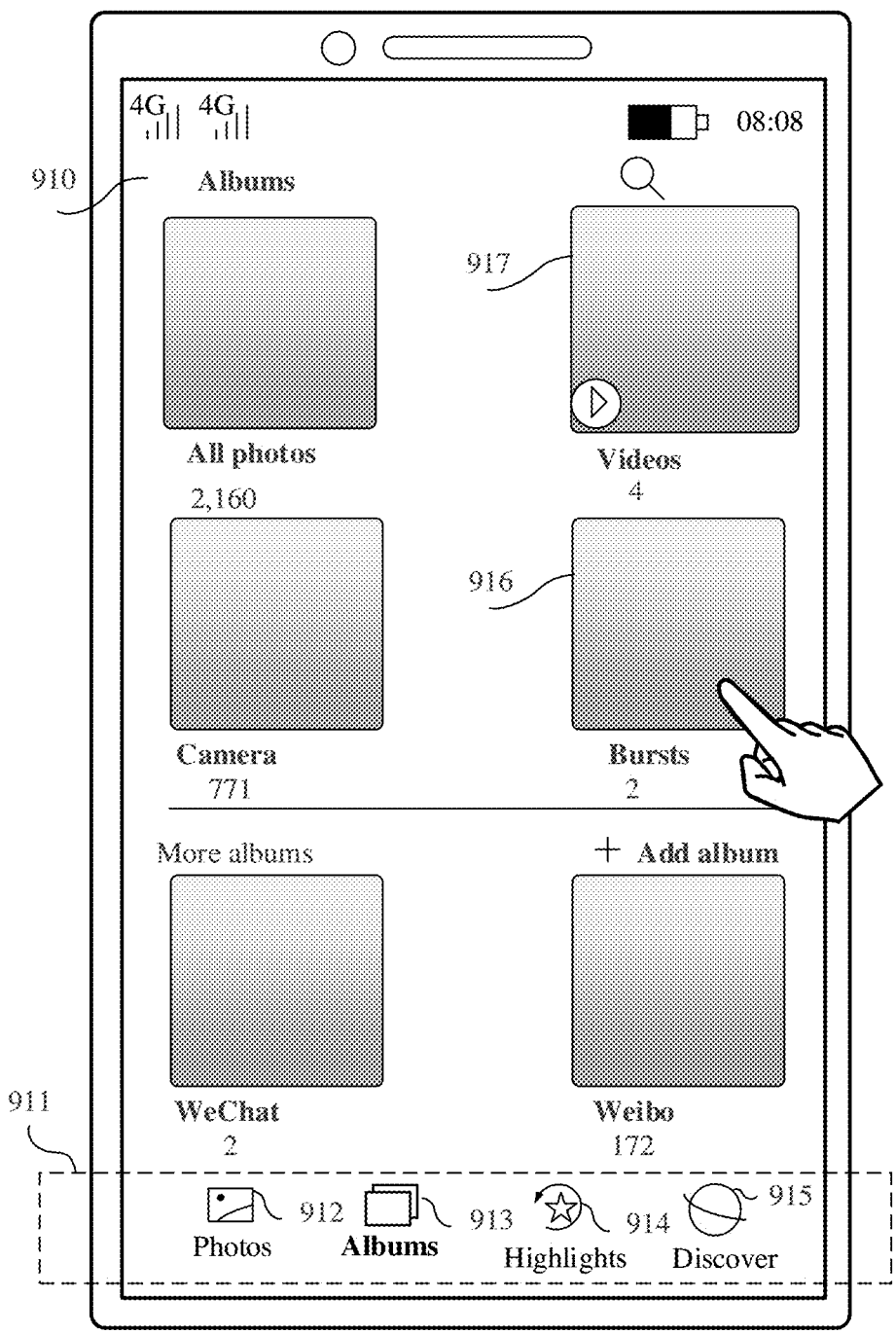

As shown in FIG. 9B, the Gallery interface 910 may display one or more albums (for example, an "All photos" album, a "Videos" album 917, a "Camera" album, a "Bursts" album 916, a "WeChat" album, and a "Weibo" album). The terminal 100 may display a Gallery menu 911 below the Gallery album interface 910. The Gallery menu 911 includes a "Photos" control 912, an "Albums" control 913, a "Highlights" control 914, and a "Discover" control 915. The "Photos" control 912 is configured to trigger the terminal 100 to display all local pictures in a form of picture thumbnails. The "Albums" control 913 is configured to trigger the terminal 100 to display an album to which a local picture belongs. As shown in FIG. 9B, the current "Albums" control 913 is in a selected state, and the terminal 100 displays the Gallery interface 910. The "Highlights" control 914 may be configured to trigger the terminal 100 to display a locally stored featured picture. The "Discover" control 915 may be configured to trigger the terminal 100 to display a classified album of a picture.

The terminal 100 may receive an input (for example, a tap) of the user for the "Bursts" album 916. In response to the input, the terminal 100 may display a "Bursts" album interface 920 shown in FIG. 9C.

Figure 9C:
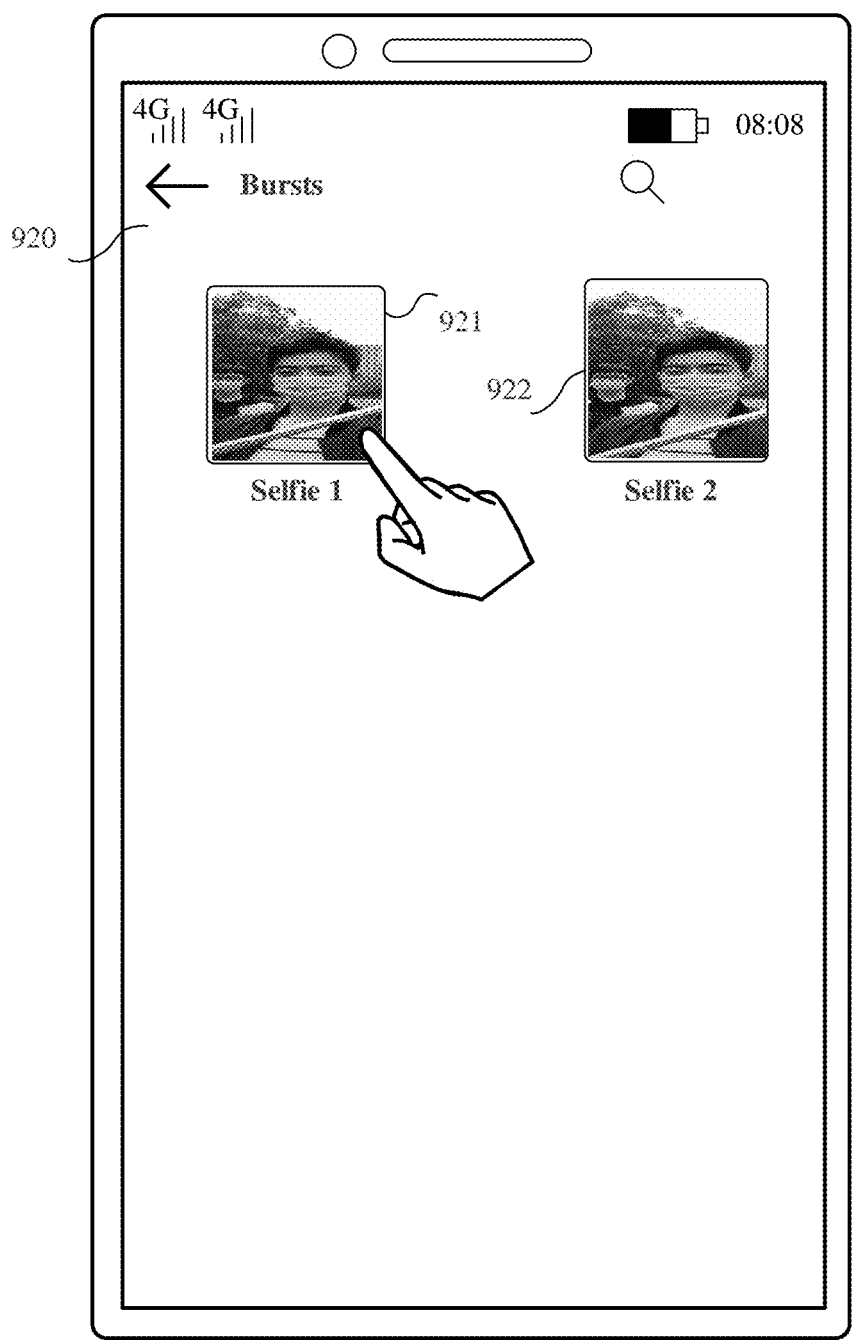

As shown in FIG. 9C, the "Bursts" album interface 920 may include thumbnails (for example, a thumbnail 921 and a thumbnail 922) of one or more pictures. In a possible implementation, a picture corresponding to the thumbnail 921 and a picture corresponding to the thumbnail 922 may be two pictures consecutively shot by the terminal 100.

The terminal 100 may receive an input (for example, a tap) performed by the user on the thumbnail 921. In response to the input, the terminal 100 may display a picture browsing interface 930 shown in FIG. 9D.

Figure 9D:
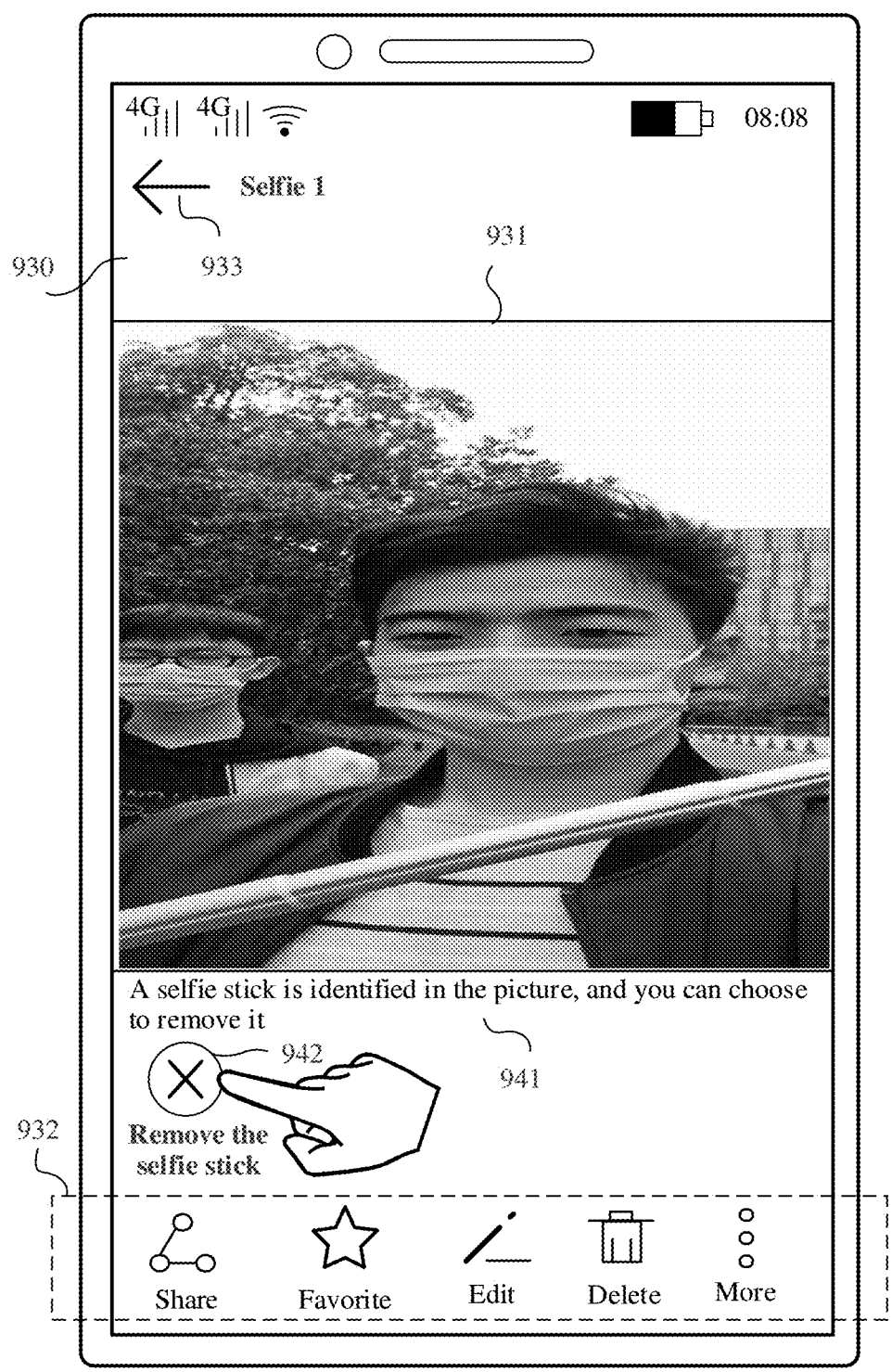

As shown in FIG. 9D, the picture browsing interface 930 may include a picture 931, a menu 932, and a back control 933. The picture 931 may be the picture corresponding to the thumbnail 921. The menu 932 may include a "Share" button, a "Favorite" button, an "Edit" button, a "Delete" button, and a "More" button. The "Share" button may be used to trigger the terminal 100 to share the picture 931. The "Favorite" button may be used to trigger the terminal 100 to add the picture 931 to a picture favorites folder. The "Edit" button may be used to trigger terminal 100 to perform editing functions such as rotation, cropping, filtering, and blurring, of the picture 931. The "Delete" button may be used to trigger deletion of the picture 931. The "More" button may be used to trigger enabling of more functions related to the picture 931.

The terminal 100 may identify whether specified image content (for example, a selfie stick) exists in a picture displayed in the picture browsing interface. If the specified image content exists in the picture, the terminal 100 may display an identification prompt and a removal control in the picture browsing interface. The identification prompt may provide the user with a prompt that what is currently identified is that the specified image content exists in the picture displayed in the picture browsing interface. The removal control may be configured to trigger the terminal 100 to remove the specified image content from the picture displayed in the picture browsing interface.

For example, as shown in FIG. 9D, when the terminal 100 identifies that the picture 931 displayed in the picture browsing interface 930 includes a selfie stick, the terminal 100 may display a prompt 941 and a removal control 942. The prompt 941 may be a text prompt, for example, "A selfie stick is identified in the picture, and you can choose to remove it". Text "Remove the selfie stick" may be displayed around the removal control 942.

The terminal 100 may receive an input (for example, a tap) performed by the user on the removal control. In response to the input, the terminal 100 may remove the specified image content (for example, the selfie stick) from the picture displayed in the picture browsing interface, and display a picture obtained after the specified image content is removed.

Figure 9E:
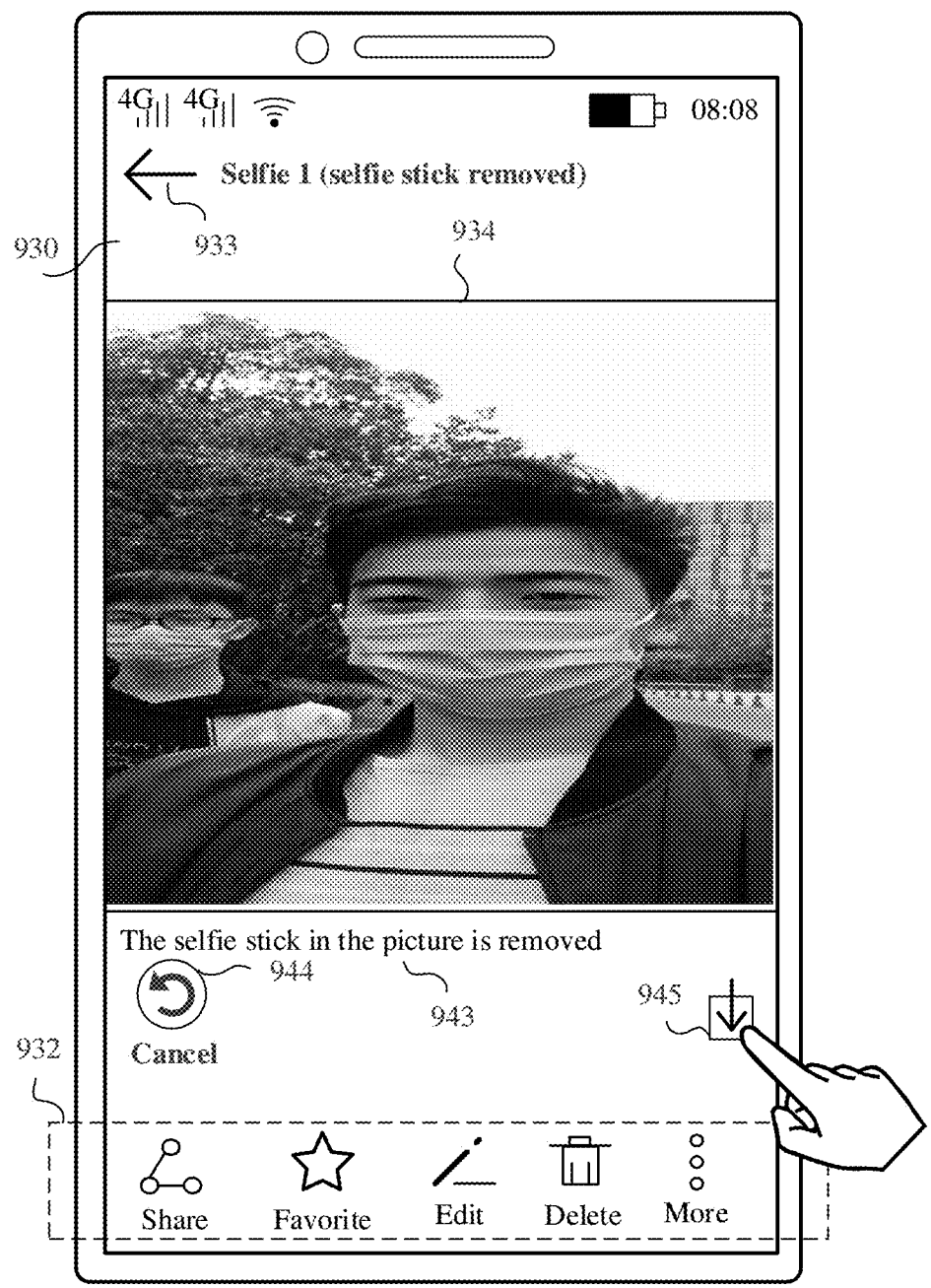

For example, when the terminal 100 responds to a received tap operation for the removal control 942 in FIG. 9D, the terminal 100 may remove the selfie stick in the picture 931 shown in FIG. 9D, and display a picture 934 shown in FIG. 9E. The picture 934 is a picture obtained after the selfie stick is removed from the picture 931. Optionally, as shown in FIG. 9E, the terminal 100 may further display a prompt 943, a cancellation control 944, and a saving control 945 after removing the selfie stick from the picture 931 shown in FIG. 9D. The prompt 943 may provide the user with a prompt that the specified image content in the picture displayed in the picture browsing interface is removed. For example, the prompt 943 may be a text prompt that "The selfie stick in the picture is removed". The cancellation control 944 may be configured to trigger the terminal 100 to cancel removal of the specified image content in the picture displayed in the picture browsing interface.

Figure 9F:
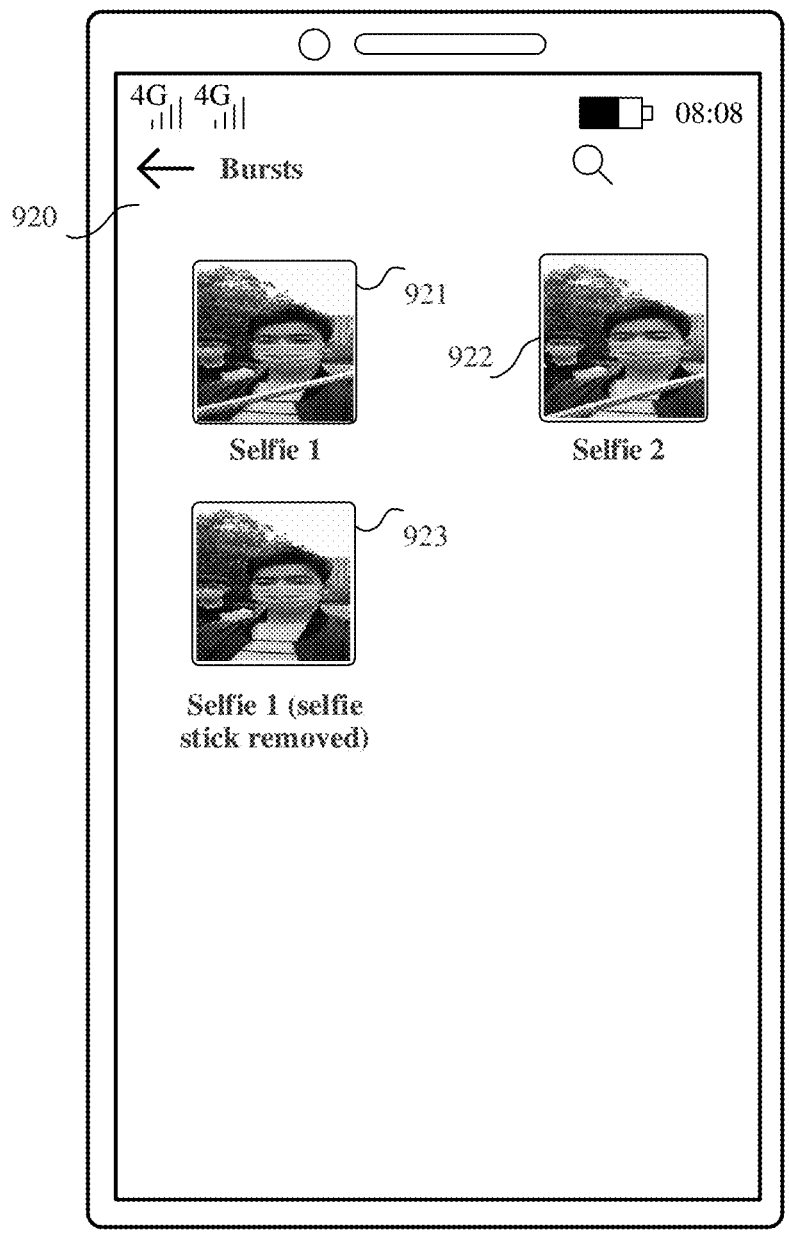

The terminal 100 may receive an input (for example, a tap) performed by the user on the saving control 945. In response to the input, the terminal 100 may locally save the picture obtained after the specified image content (for example, the selfie stick) is removed. As shown in FIG. 9F, the terminal 100 may display, in the "Bursts" album interface 920 in Gallery, a thumbnail 923 corresponding to the picture obtained after the specified image content is removed. The terminal 100 may mark the thumbnail 923. For example, the terminal 100 may display a text mark "Selfie 1 (selfie stick removed)" below the thumbnail 923.

In some embodiments, after displaying a picture browsing interface, the terminal 100 may identify one or more pieces of removable image content in a picture displayed in the picture browsing interface, and mark the one or more pieces of removable image content. The terminal 100 may receive an input of the user for selecting to-be-removed specified image content from the one or more pieces of removable image content. In response to the input, the terminal 100 may remove the specified image content from the picture. In this way, it can be convenient for the user to select image content that the user wants to remove from the picture displayed in the picture browsing interface, and remove the image content.

Figure 10A:
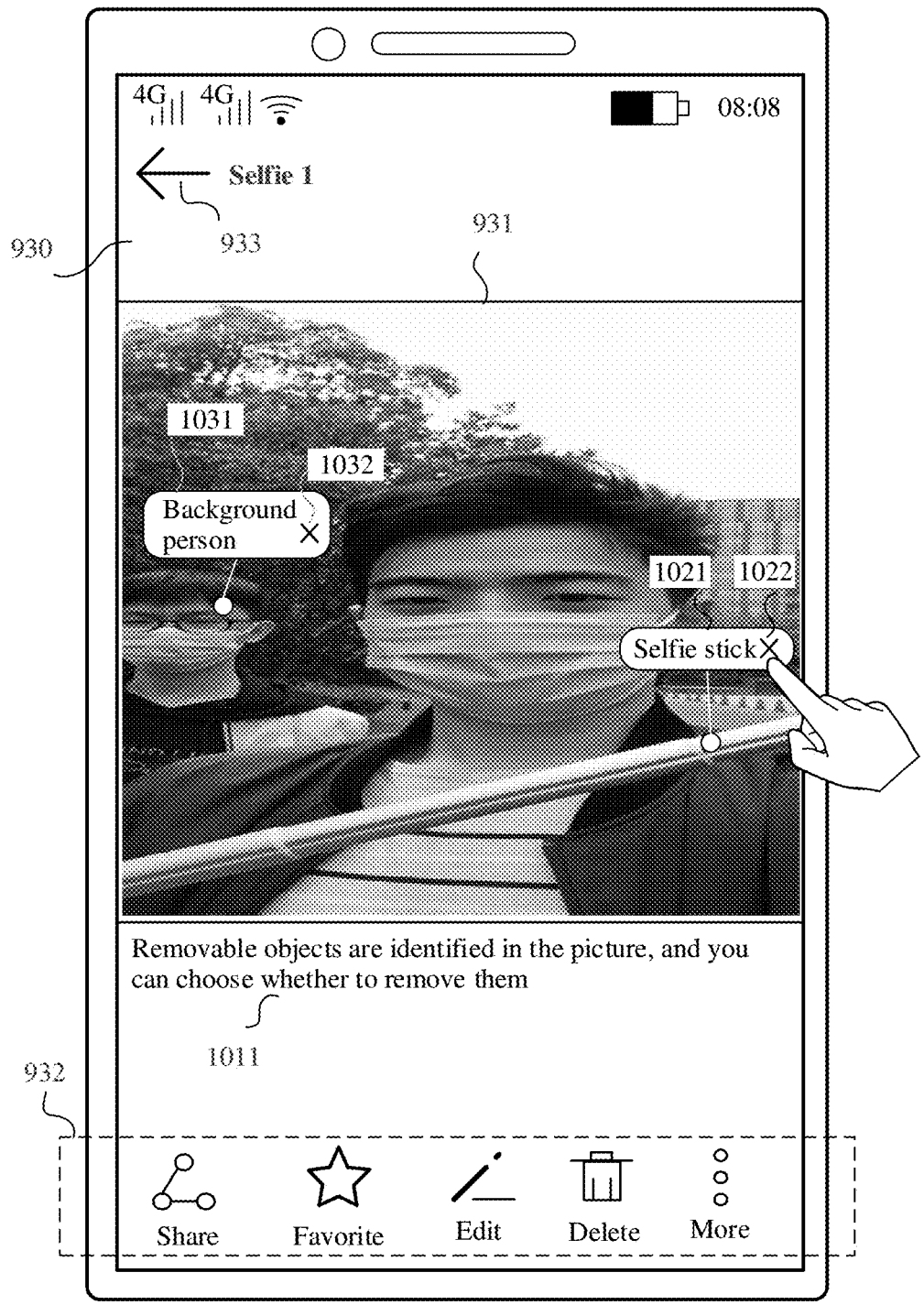
FIG. 10A to FIG. 10G are schematic diagrams of a yet further group of interfaces according to an embodiment of this application.

For example, as shown in FIG. 10A, after displaying the picture browsing interface 930, the terminal 100 may identify that one or more pieces of removable image content in the picture 931 include a background person and a selfie stick. The terminal 100 may display a label 1031 around the background person in the picture 931, and display a label 1021 around the selfie stick in the picture 931. The label 1031 may include description text "Background person" and a removal control 1032. The removal control 1032 may be configured to trigger the terminal 100 to remove the background person from the picture 931. The label 1021 may include description text "Selfie stick" and a removal control 1022. The removal control 1022 may be configured to trigger the terminal 100 to remove the selfie stick from the picture 931. Optionally, after identifying that the one or more pieces of removable image content in the picture 931 include the background person and the selfie stick, the terminal 100 may further display a prompt 1011. The prompt 1011 may provide the user with a prompt that the removable image content in the picture 931 is identified. Text "Removable objects are identified in the picture, and you can choose whether to remove them" may be displayed in the prompt 1011.

The terminal 100 may receive an input (for example, a tap) of the user for the removal control. In response to the input, the terminal 100 may remove image content corresponding to the removal control in the picture displayed in the picture browsing interface. Optionally, after removing the image content corresponding to the removal control, the terminal 100 may further display a cancellation control. The cancellation control may be configured to trigger the terminal 100 to cancel the removal of the image content.

Figure 10B:
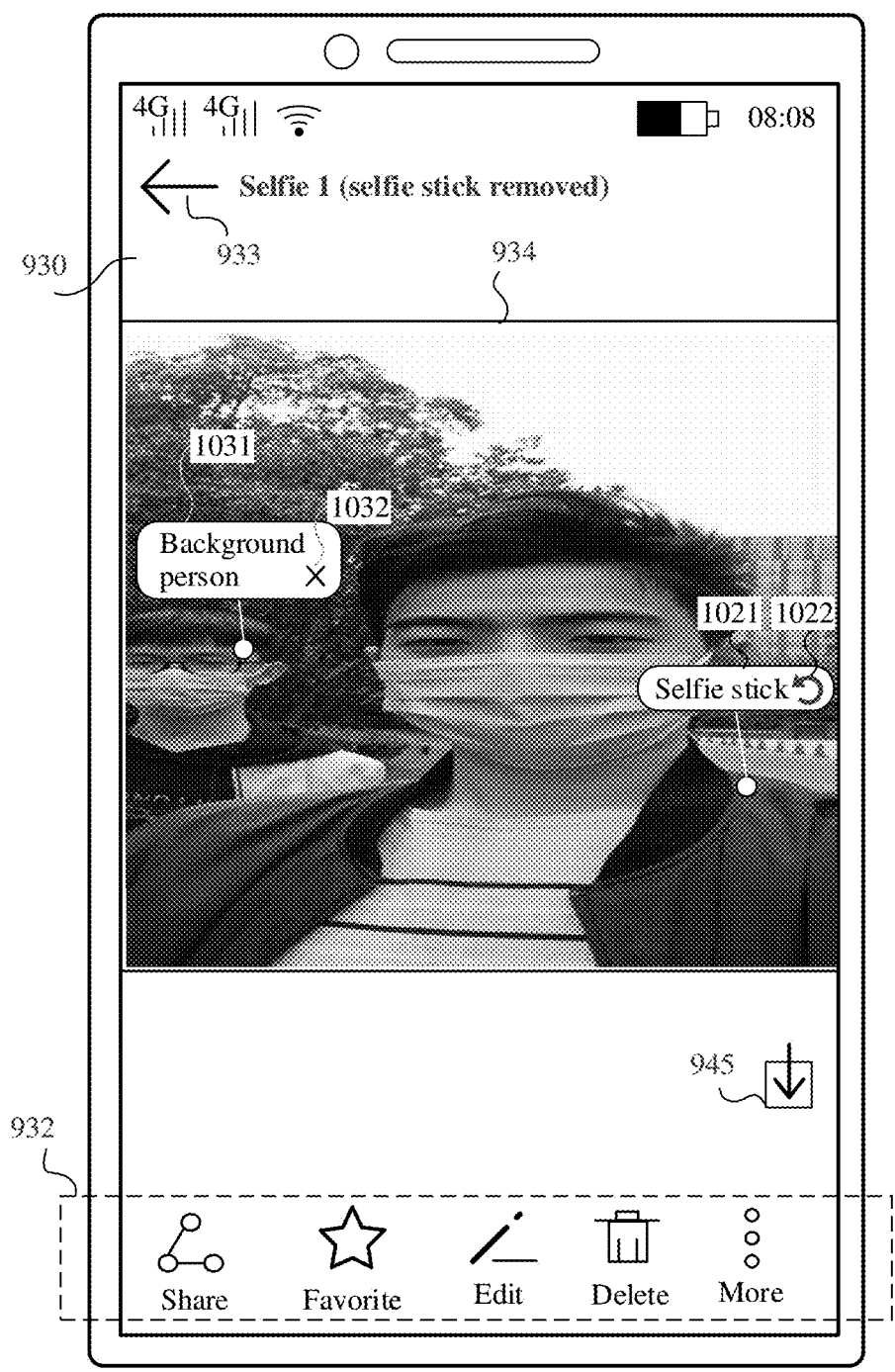

For example, as shown in FIG. 10B, the terminal 100 may remove the selfie stick in the picture 931 in response to a received tap operation of the user for the removal control 1022, and display the picture 934. The picture 934 does not include the selfie stick. Optionally, in response to the tap operation for the removal control 622, the terminal 100 may further replace the removal control 1022 with a cancellation control 1023 in the label 1021 of the selfie stick. The cancellation control 1023 may be configured to trigger the terminal 100 to cancel the removal of the selfie stick.

In some embodiments, after the terminal 100 enables an object removal function in Camera, the terminal 100 may identify one or more pieces of removable image content in a preview picture, and display a removal mode control corresponding to each of the one or more pieces of image content. The terminal 100 may receive an input of the user for the removal mode control corresponding to specified image content. In response to the input, the terminal 100 may remove the specified image content from the preview picture. Then, the terminal 100 may receive an input of the user for a shooting control. In response to the input, the terminal 100 may save, as a picture, a preview picture obtained after the specified image content is removed. The user may view, by using a redisplay control in a Camera interface, the picture obtained after the specified image content is removed, and the terminal 100 may mark other removable image content in the picture obtained after the specified image content is removed, for the user to choose to remove.

Figure 10C:
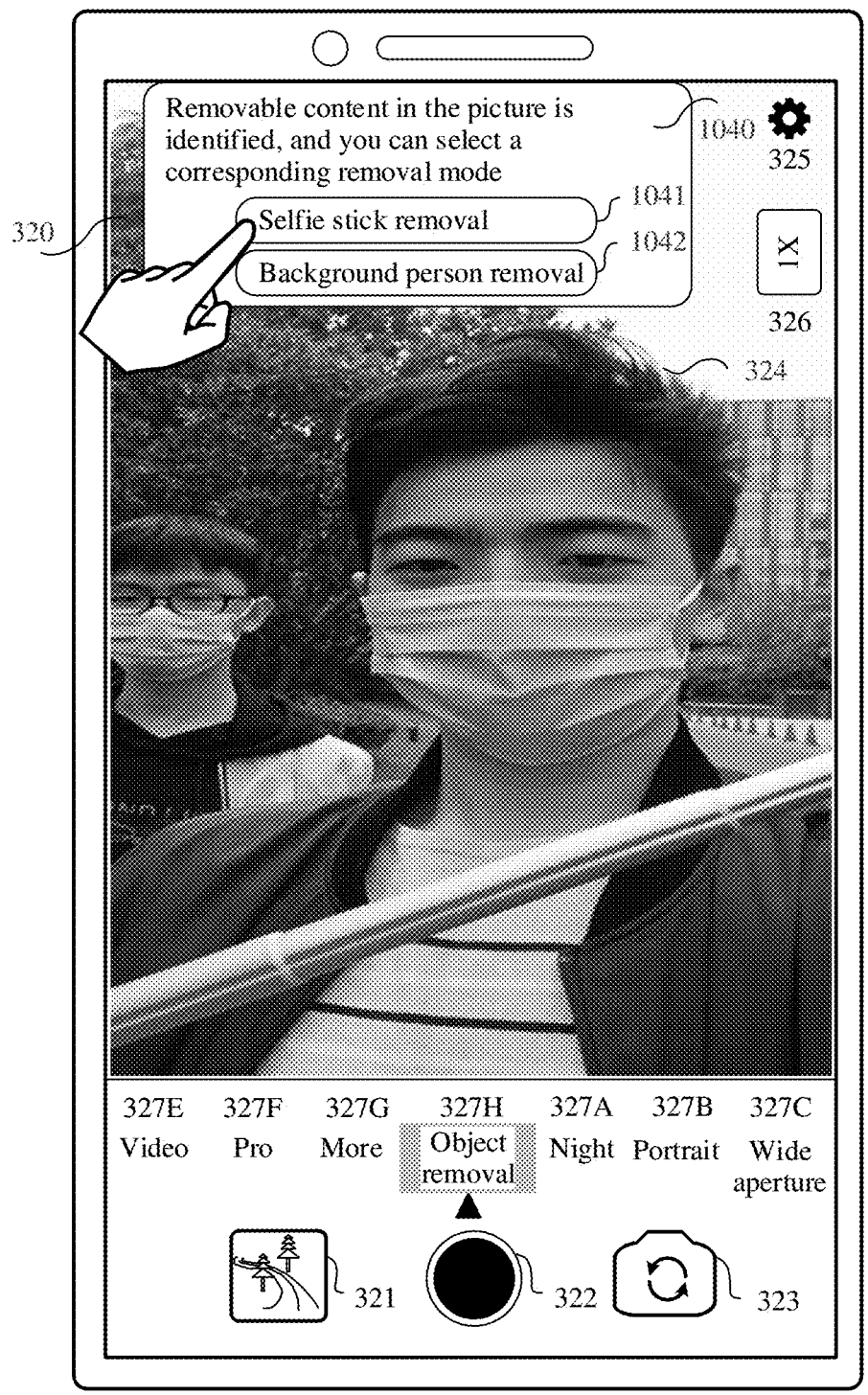

For example, as shown in FIG. 10C, the terminal 100 may have switched to an object removal shooting mode. In the object removal shooting mode, after the terminal 100 identifies that one or more pieces of removable image content in the preview picture 324 include a background person and a selfie stick, the terminal 100 may display a removal mode selection box 1040. The removal mode selection box 1040 includes a text prompt, a selfie stick removal control 1041, and a background person removal control 1042. For example, the text prompt may be "Removable content in the picture is identified, and you can select a corresponding removal mode".

The terminal 100 may receive an input (for example, a tap) of the user for the removal mode control. In response to the input, the terminal 100 may enter a removal mode corresponding to the removal mode control, and remove image content corresponding to the removal mode in the preview picture.

Figure 10D:
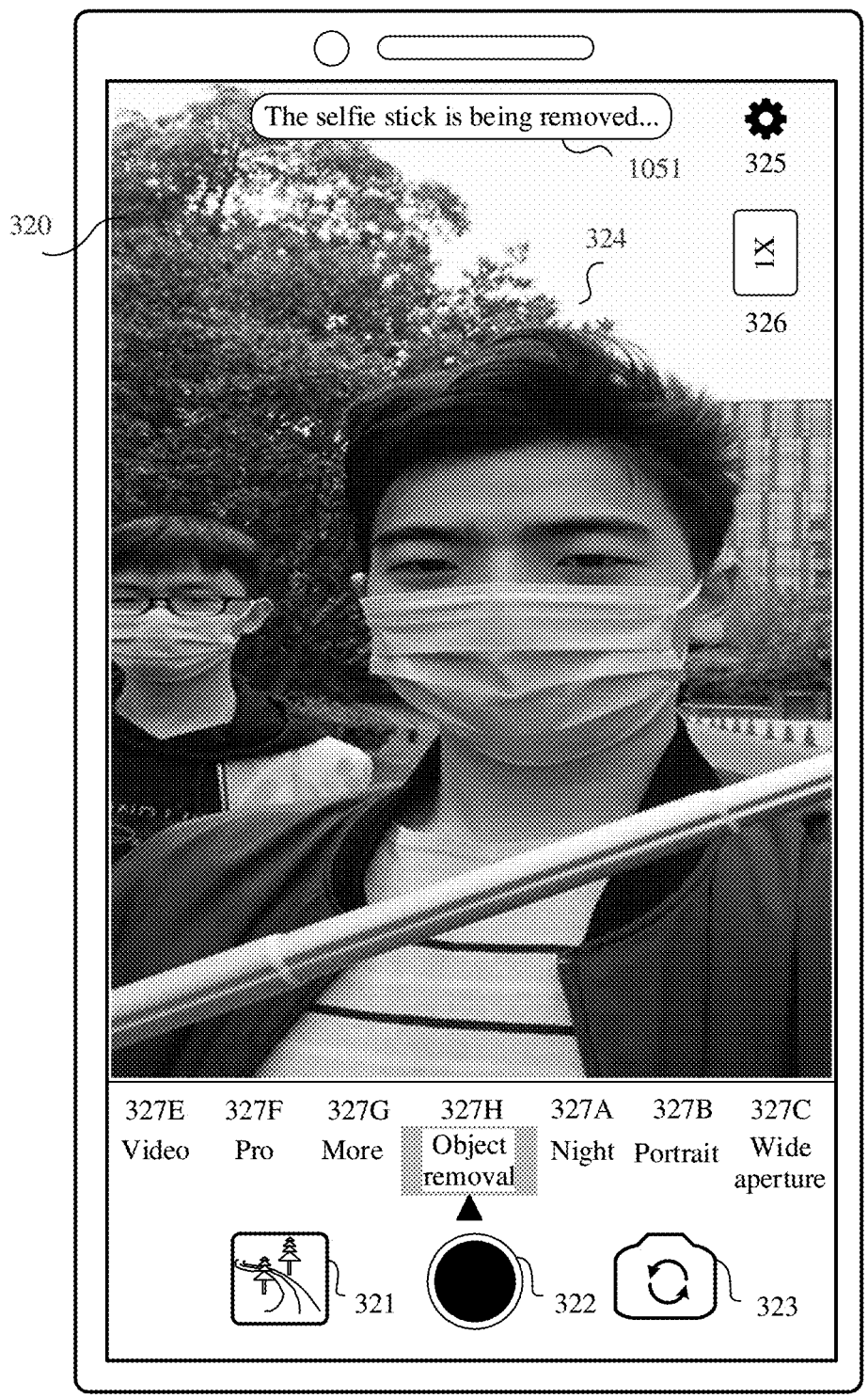

For example, as shown in FIG. 10D, after the terminal 100 receives the selfie stick removal control 1041 selected by the user, the terminal 100 may enter a selfie stick removal mode, and remove the selfie stick from the preview picture. The terminal 100 may display a prompt 1051 in a process of removing the selfie stick. The prompt 1051 may provide the user with a prompt that the terminal 100 is removing the selfie stick from the preview picture 324.

The terminal 100 may receive an input (for example, a tap) of the user for the removal confirmation control 521. In response to the input, the terminal boo may remove the selfie stick from the preview picture 324, and replace the preview picture 324 with the preview picture 328 shown in FIG. 10E.

Figure 10E:
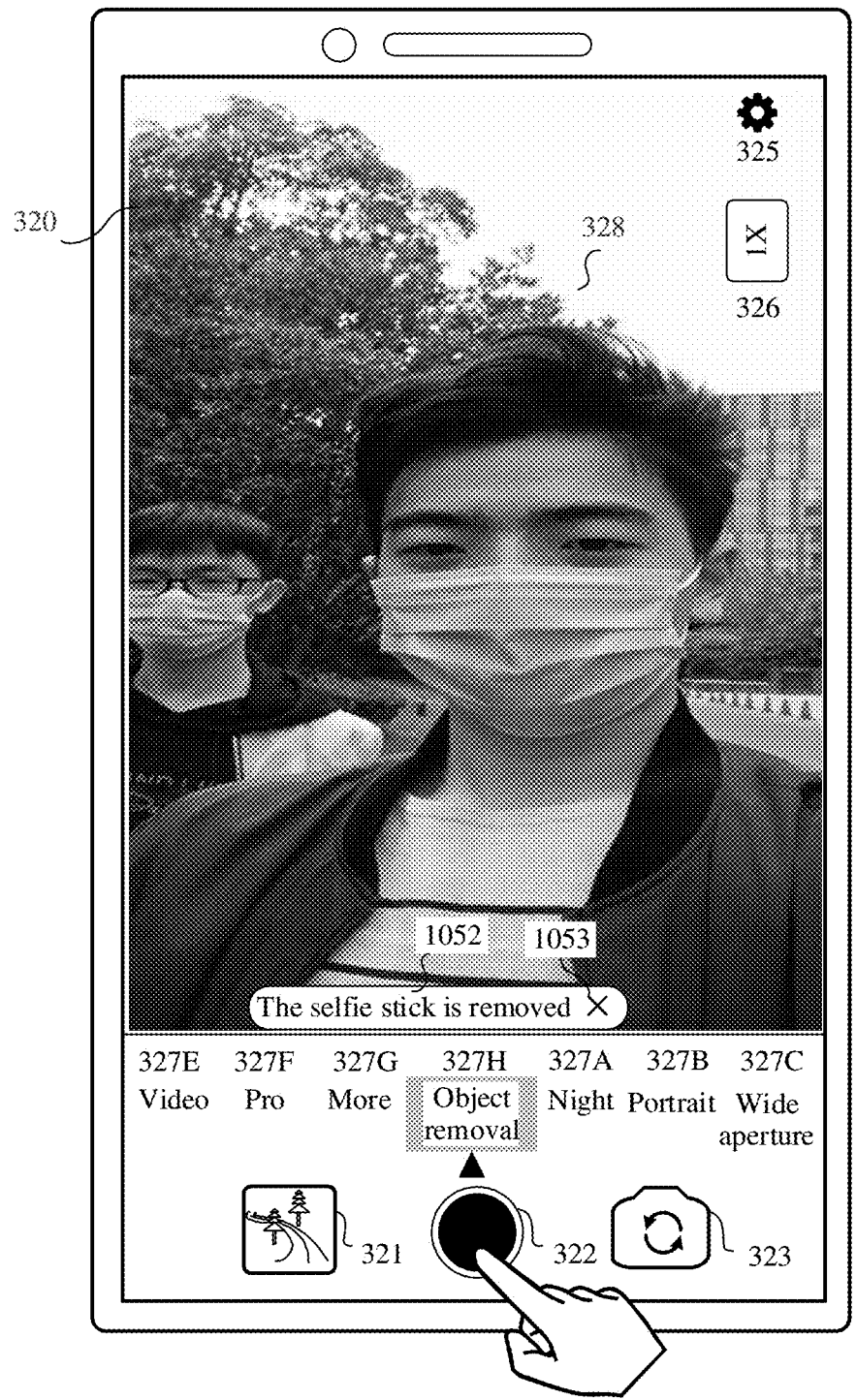

As shown in FIG. 10E, the preview picture 328 does not include the selfie stick. Optionally, after removing the selfie stick from the preview picture 324, the terminal 100 may further display a prompt box 1052. The prompt box 1053 includes a text prompt (for example, "The selfie stick is removed") and a removal disabling control 1053. The removal disabling control 1053 may be configured to trigger the terminal 100 to cancel removal of the specified image content in the preview picture.

Figure 10F:
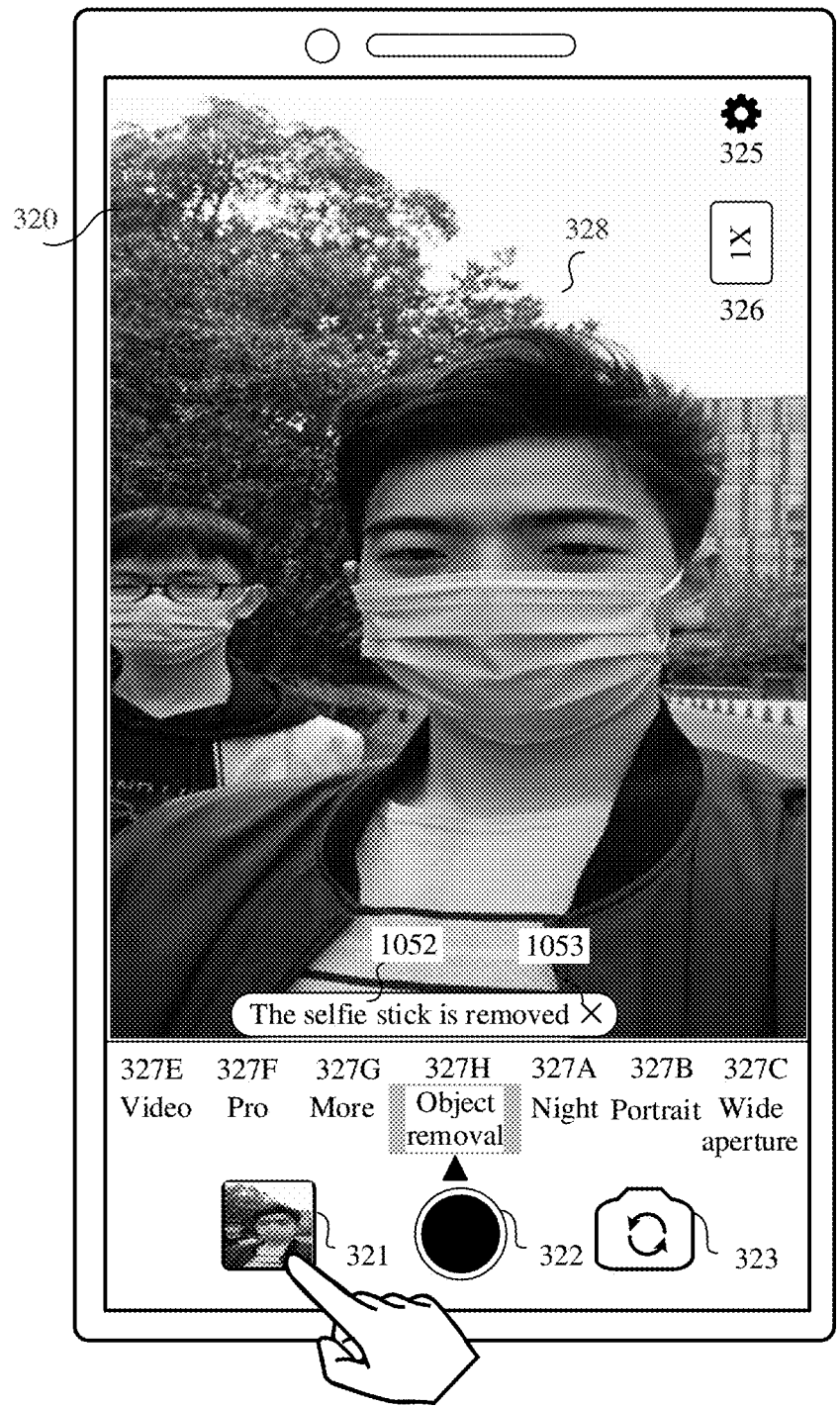

As shown in FIG. 10F, after the terminal 100 removes the selfie stick, the terminal 100 may receive an input (for example, a tap) of the user for the shooting control 322. In response to the input, the terminal 100 may save the preview picture 328 as a target picture and display a thumbnail of the target picture on the redisplay control 321. The terminal 100 may receive an input (for example, a tap) performed by the user on the redisplay control 321. In response to the input, the terminal 100 may display the picture browsing interface 730 shown in FIG. 10G.

Figure 10G:
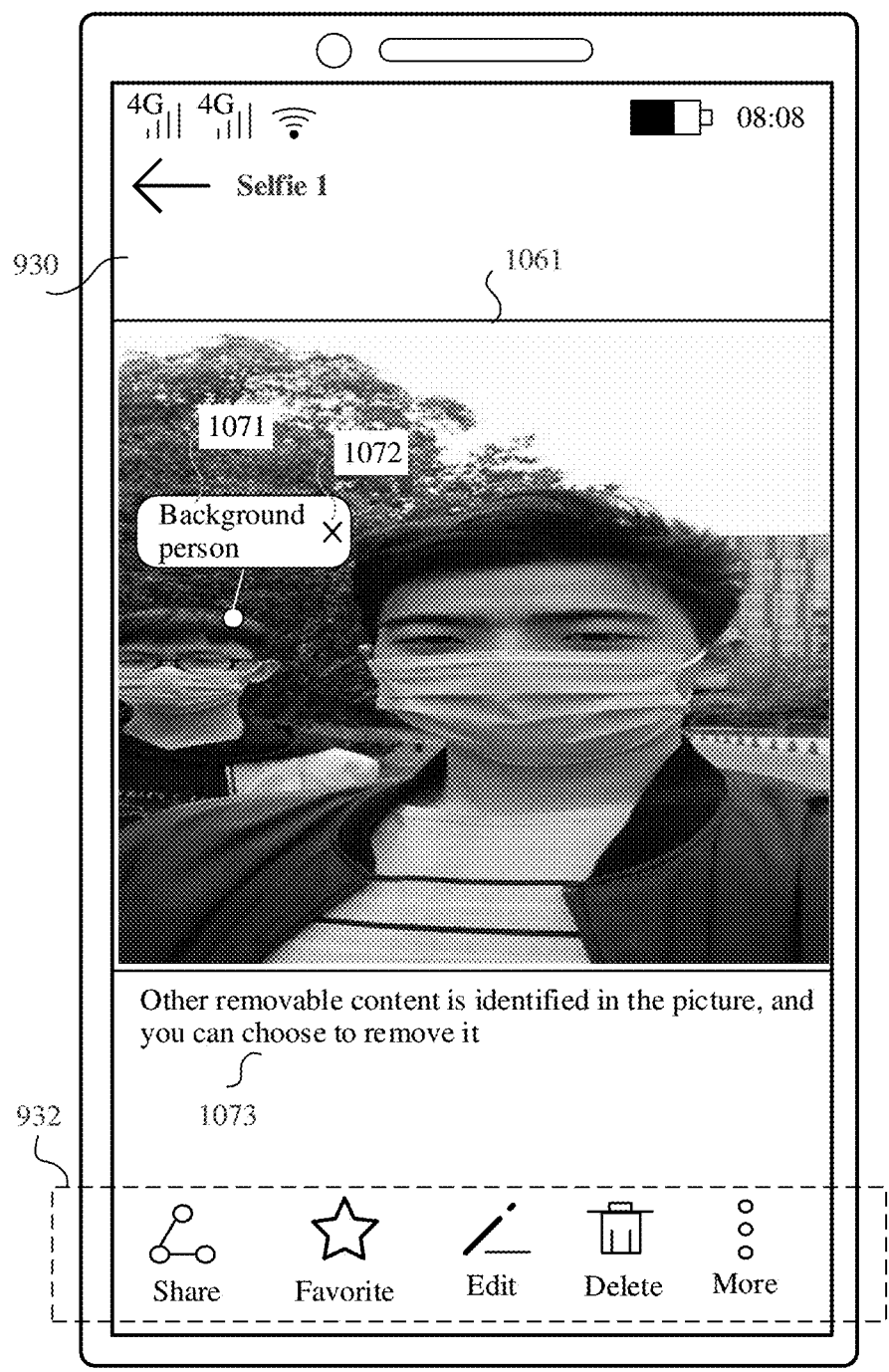

As shown in FIG. 10G, the picture browsing interface 930 includes a picture 1061 and the menu 932. The picture 1061 is the target picture obtained after the selfie stick is removed. The terminal 100 may use a frame of picture buffered in the foregoing selfie stick removal process as a reference picture, identify removable image content in the picture 1061, and mark the removable image content. For example, after identifying that the picture 1061 includes a removable background person, the terminal 100 may display a prompt 1073, and display a label 1071 at a position around the background person in the picture 1061. The prompt 1073 may provide the user with a prompt that the removable image content in the picture 1061 is identified. Text "Other removable content is identified in the picture, and you can choose to remove it" may be displayed in the prompt ion. The label 1071 may include description text "Background person" and a removal control 1072. The removal control 1072 may be configured to trigger the terminal 100 to remove the background person from the picture 1061.

In some embodiments, one or more pieces of image content in a picture displayed in a picture browsing interface may be removed by the terminal 100. The terminal 100 may receive a tapping operation for the picture displayed in the picture browsing interface. In response to the tapping operation, the terminal 100 may identify specified image content (for example, a selfie stick) selected by the user in the picture displayed in the picture browsing interface, and display a removal confirmation control. The removal confirmation control may be configured to trigger the terminal 100 to remove the specified image content from the picture displayed in the picture browsing interface. In this way, the user may select image content that the user wants to remove from the preview picture, and remove the image content.

Figure 11A:
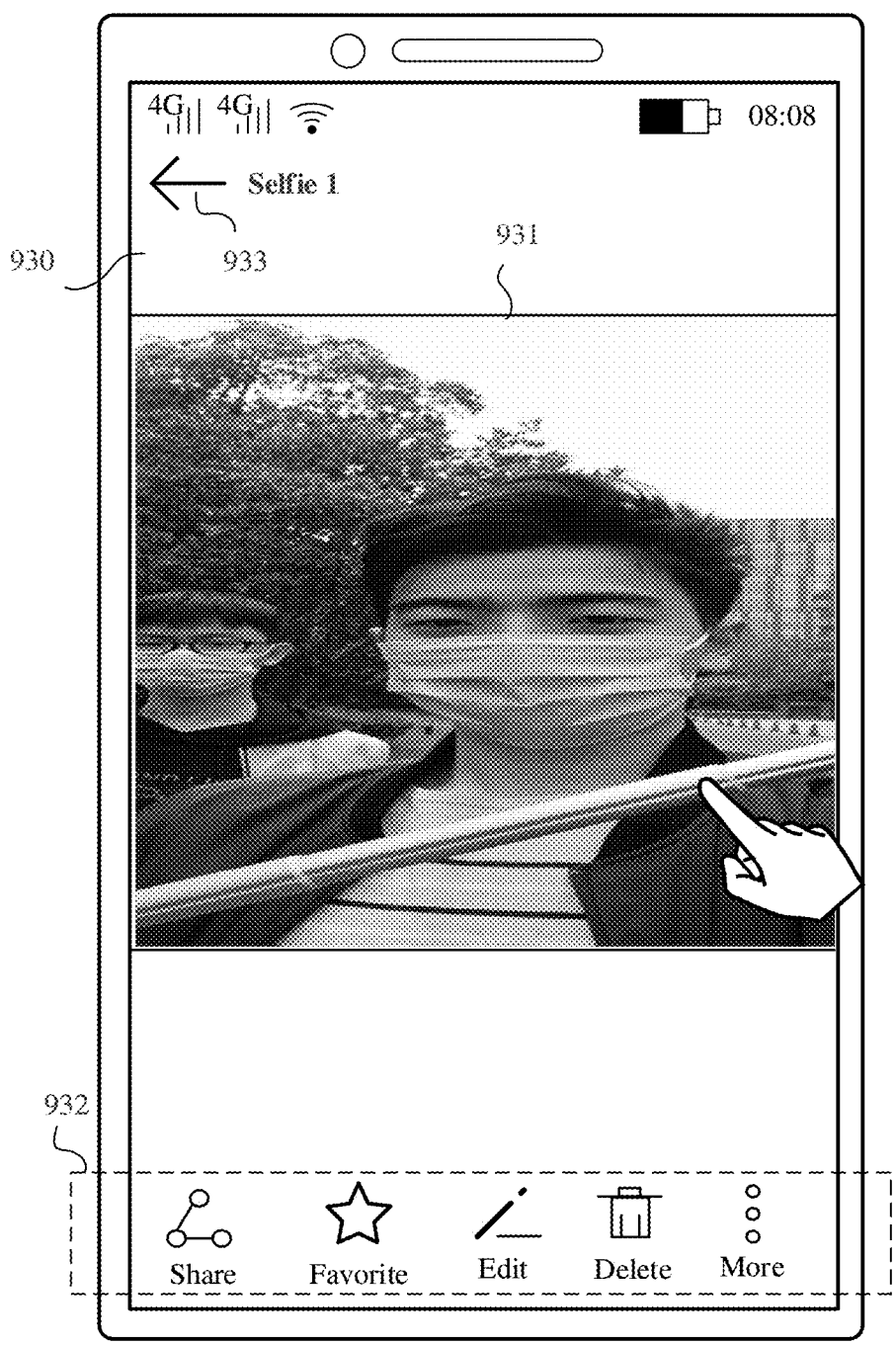
FIG. 11A to FIG. 11C are schematic diagrams of a still yet further group of interfaces according to an embodiment of this application.

For example, as shown in FIG. 11A, the terminal 100 may receive a tapping operation (for example, tapping, double tapping, or touching and holding) performed by the user on the picture 931 in the picture browsing interface 930. In response to the tapping operation, the terminal 100 may identify, based on a position on which the tapping operation is performed in the picture 931, specified image content selected by the user as a selfie stick.

Figure 11B:
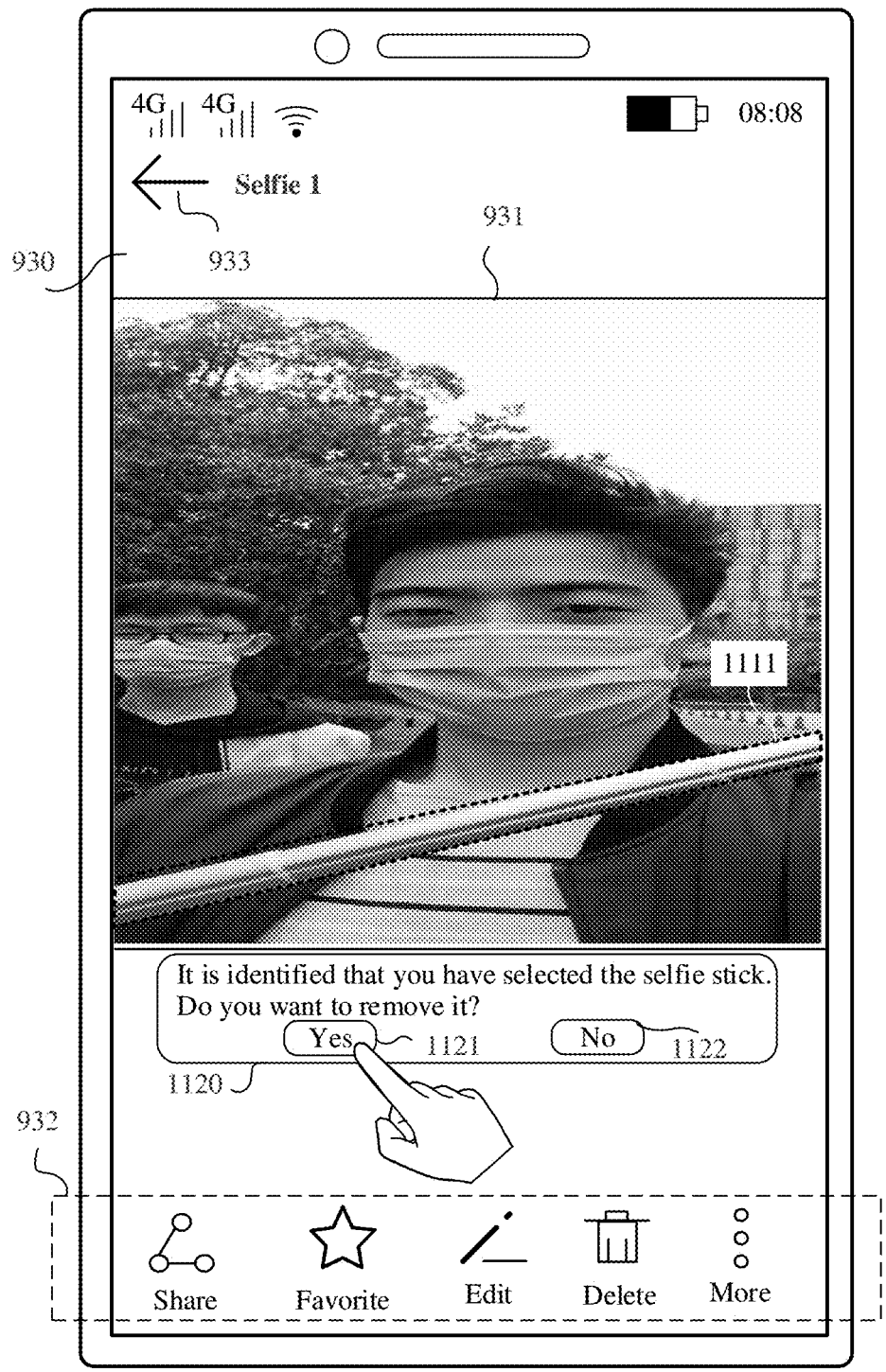

As shown in FIG. 11B, after identifying the specified image content selected by the user as the selfie stick, the terminal 100 may display a prompt box 1120 and a mark box 1111 around the selfie stick. The mark box 1111 may be used to provide the user a prompt that the selfie stick in the mark box 1111 is selected. The prompt box 1120 includes a text prompt (for example, "It is identified that you have selected the selfie stick. Do you want to remove it?"), a removal confirmation control 1121 and a removal refusal control 1122. The removal confirmation control 1121 may be configured to trigger the terminal 100 to remove the specified image content (for example, the selfie stick) from the picture 931. The removal refusal control 1122 may trigger the terminal 100 to refuse to remove the specified image content (for example, the selfie stick) from the preview picture.

The terminal 100 may receive an input (for example, a tap) of the user for the removal confirmation control 1121. In response to the input, the terminal boo may remove the selfie stick from the picture 931, and replace the picture 931 with the picture 934 shown in FIG. 11C.

Figure 11C:
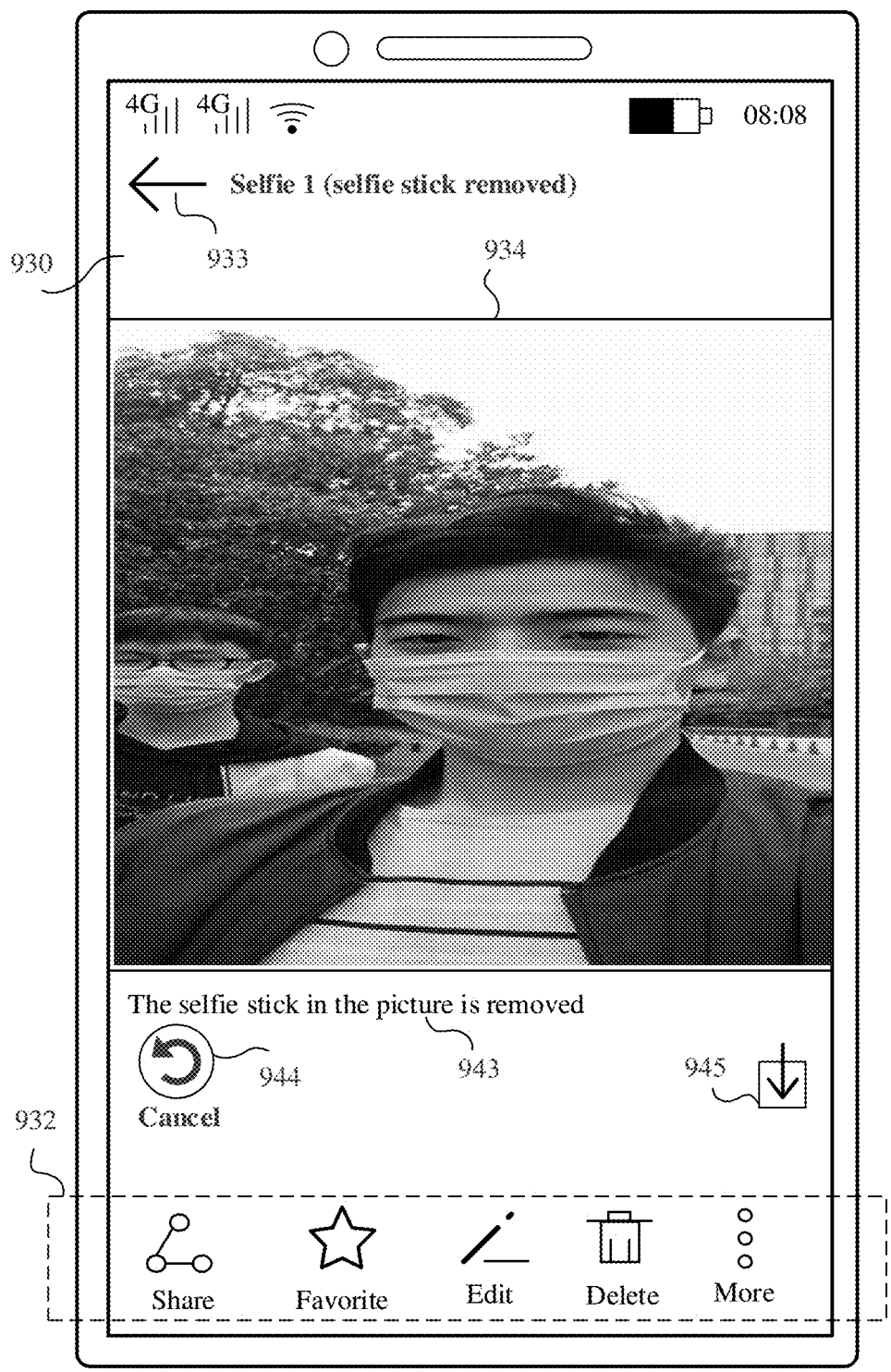

As shown in FIG. 11C, the picture 934 is a picture obtained after the selfie stick is removed from the picture 931. Optionally, the terminal 100 may further display the prompt 943, the cancellation control 944, and the saving control 945 after removing the selfie stick from the picture 931. For text descriptions of the prompt 943, the cancellation control 944, and the saving control 945, refer to the embodiment shown in FIG. 9E. Details are not described herein again.

In some embodiments, the terminal 100 may locally store a video, and the video may be shot by the terminal 100, or sent by another device, or downloaded from a network. A picture of the video has specified image content, which affects overall viewing of the video. Therefore, the terminal 100 may remove the specified image content from the stored picture or video. In this way, it can be convenient for the user to remove, at any time after completing shooting of a video, image content that the user does not want in the shot video.

Figure 12A:
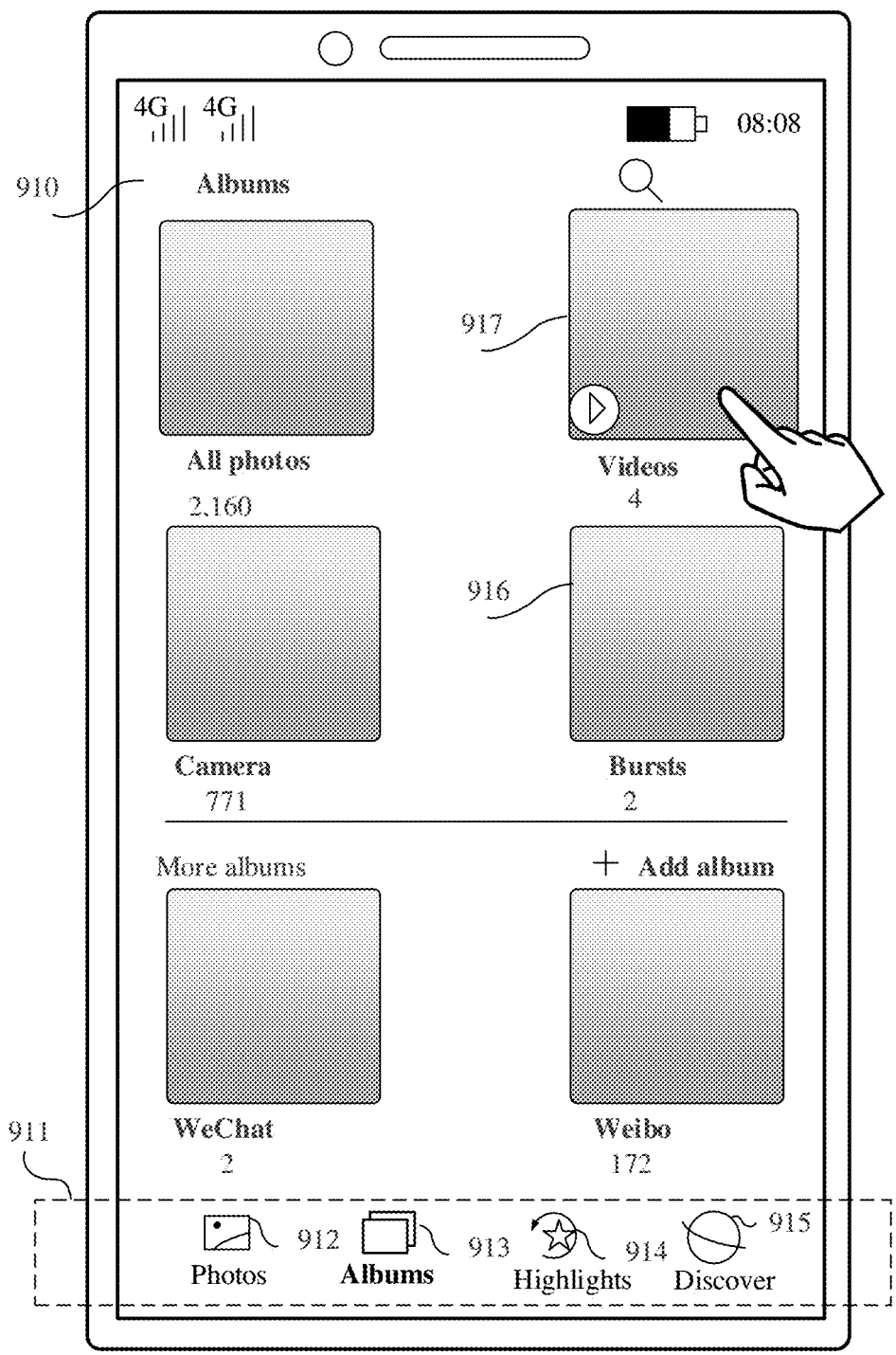
FIG. 12A to FIG. 12D are schematic diagrams of even yet another group of interfaces according to an embodiment of this application.

For example, as shown in FIG. 12A, the terminal 100 may display the Gallery interface 910. For text descriptions of the Gallery album interface 910, refer to the embodiment shown in FIG. 9B. Details are not described herein again.

The terminal 100 may receive an input (for example, a tap) of the user for the "Videos" album 917. In response to the input, the terminal 100 may display a "Videos" album interface 1210 shown in FIG. 12B.

Figure 12B:
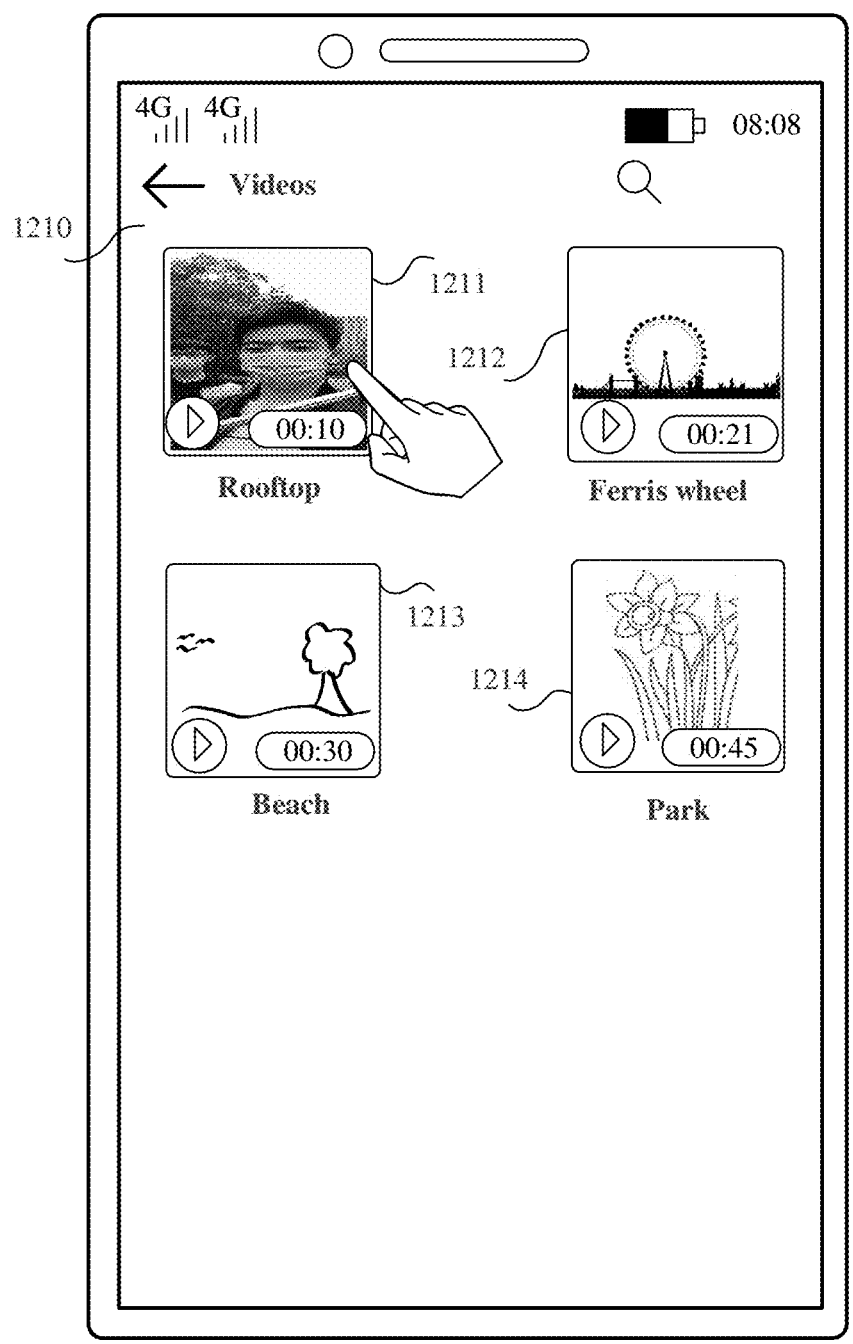

As shown in FIG. 12B, the "Videos" album interface 1210 includes thumbnails corresponding to one or more videos, for example, a thumbnail 1211, a thumbnail 1212, a thumbnail 1213, and a thumbnail 1214. Each thumbnail in the "Videos" album interface 1210 may further display a time length of a video corresponding to the thumbnail. For example, a time length of a video corresponding to the thumbnail 1211 is 10S, a time length of a video corresponding to the thumbnail 1212 is 15s, a time length of a video corresponding to the thumbnail 1213 is 30s, and a time length of a video corresponding to the thumbnail 1214 is 45s. The foregoing example is merely used to explain this application and shall not be construed as a limitation.

The terminal 100 may receive an input (for example, a tap) performed by the user on the thumbnail 1211. In response to the input, the terminal 100 may display a video browsing interface 1220 shown in FIG. 12C.

Figure 12C:
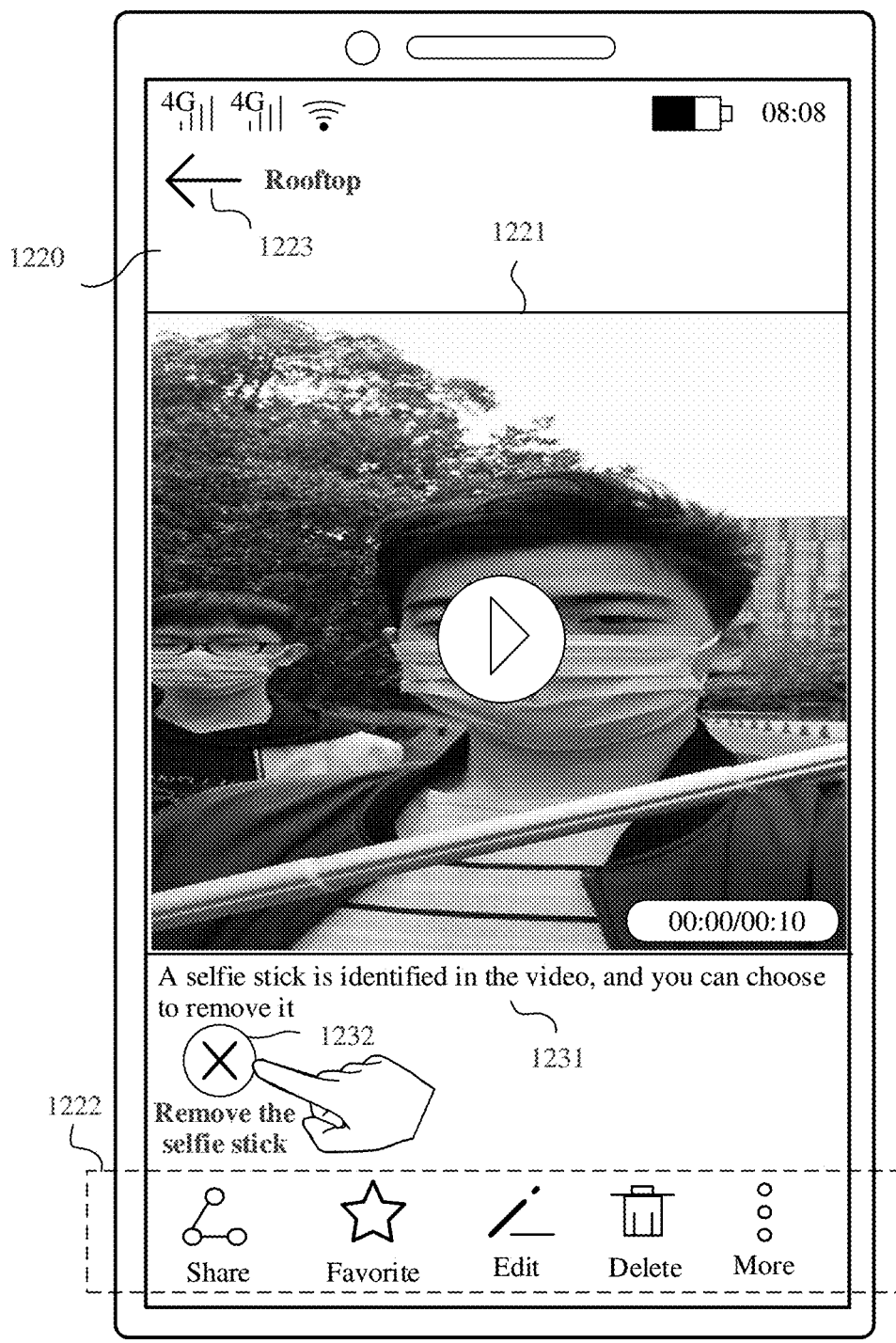

As shown in FIG. 12C, the video browsing interface 1220 may include a video 1221, a menu 1222, and a back control 1223. The video 1221 is the video corresponding to the thumbnail 1211. The menu 1222 may include a "Share" button, a "Favorite" button, an "Edit" button, a "Delete" button, and a "More" button. The "Share" button may be used to trigger the terminal 100 to share the video 1221. The "Favorite" button may be used to trigger the terminal 100 to add the video 1221 to a video favorites folder. The "Edit" button may be used to trigger terminal 100 to perform editing functions such as rotation, cropping, filtering, and blurring, of the video 1221. The "Delete" button may be used to trigger deletion of the video 1221. The "More" button may be used to trigger enabling of more functions related to the video 1221.

The terminal 100 may identify whether specified image content (for example, a selfie stick) exists in a frame of picture of the video displayed in the video browsing interface. If the specified image content exists in the picture, the terminal 100 may display an identification prompt and a removal control in the video browsing interface. The identification prompt may provide the user with a prompt that what is currently identified is that the specified image content exists in the frame of picture of the video displayed in the video browsing interface. The removal control may be configured to trigger the terminal 100 to remove the specified image content from the video displayed in the video browsing interface.

For example, as shown in FIG. 12C, when the terminal 100 identifies that the video 1221 in the video browsing interface 1220 includes a selfie stick, the terminal 100 may display a prompt 1231 and a removal control 1232. The prompt 1231 may be a text prompt, for example, "A selfie stick is identified in the video, and you can choose to remove it". Text "Remove the selfie stick" may be displayed around the removal control 1232.

The terminal 100 may receive an input (for example, a tap) performed by the user on the removal control. In response to the input, the terminal 100 may remove the specified image content (for example, the selfie stick) from the picture displayed in the picture browsing interface, and display a picture obtained after the specified image content is removed.

Figure 12D:
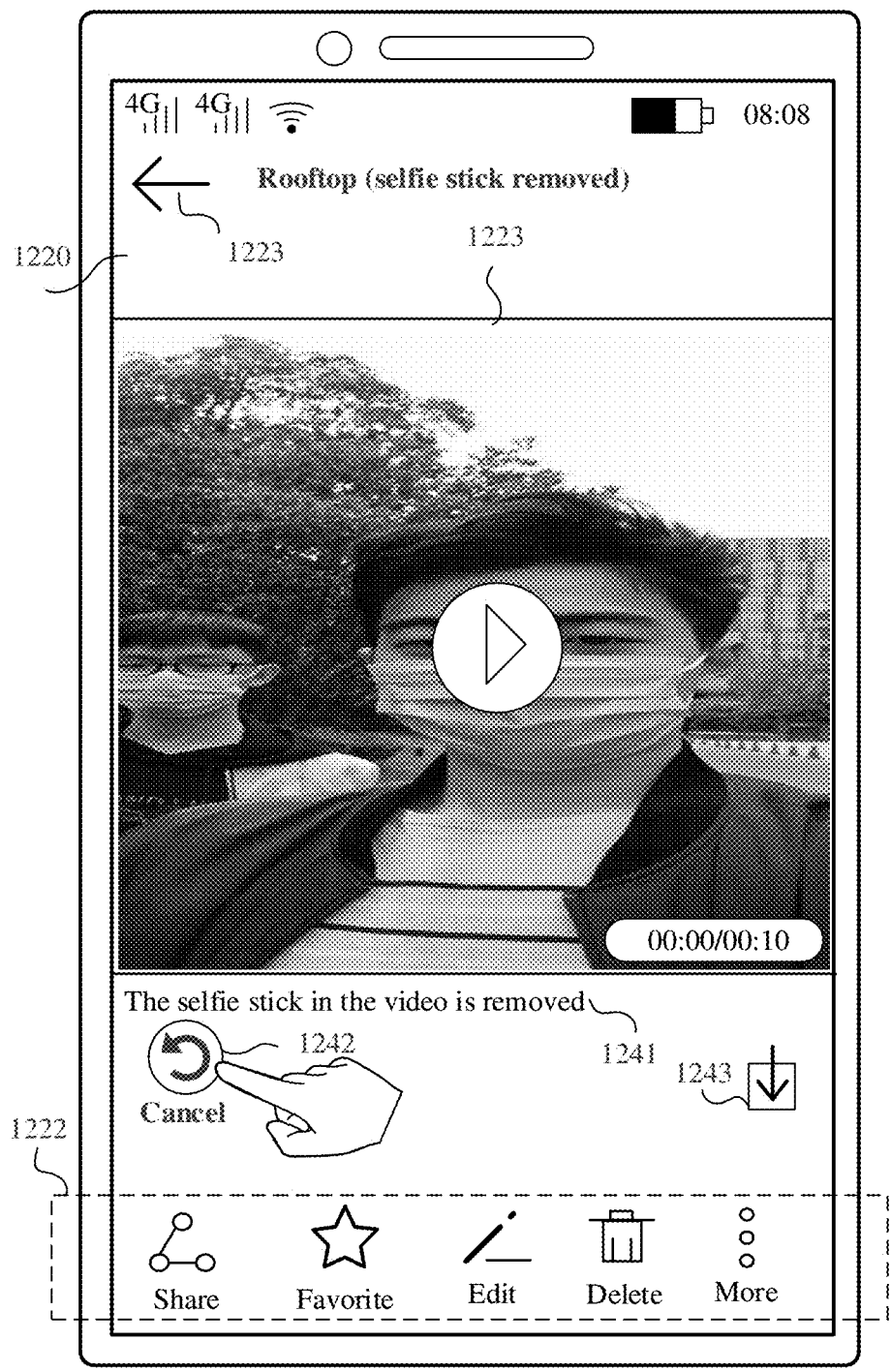

For example, when the terminal 100 responds to a received tap operation for the removal control 1232 in FIG. 12C, the terminal 100 may remove the selfie stick in the video 1231 shown in FIG. 12C, and display a video 1223 shown in FIG. 12D. The video 1223 is a video obtained after the selfie stick is removed from the video 1221. Optionally, as shown in FIG. 12D, the terminal 100 may further display a prompt 1241, a cancellation control 1242, and a saving control 1243 after removing the selfie stick from the video 1221 shown in FIG. 12C. The prompt 1241 may provide the user with a prompt that the specified image content in the picture displayed in the picture browsing interface is removed. For example, the prompt 1241 may be a text prompt that "The selfie stick in the picture is removed". The cancellation control 1242 may be configured to trigger the terminal 100 to cancel removal of the specified image content in the picture displayed in the picture browsing interface. The saving control 1243 may be configured to trigger the terminal 100 to save the video 1223.

The following describes a process of removing specified image content from a picture by the terminal 100 in embodiments of this application.

Figure 13:
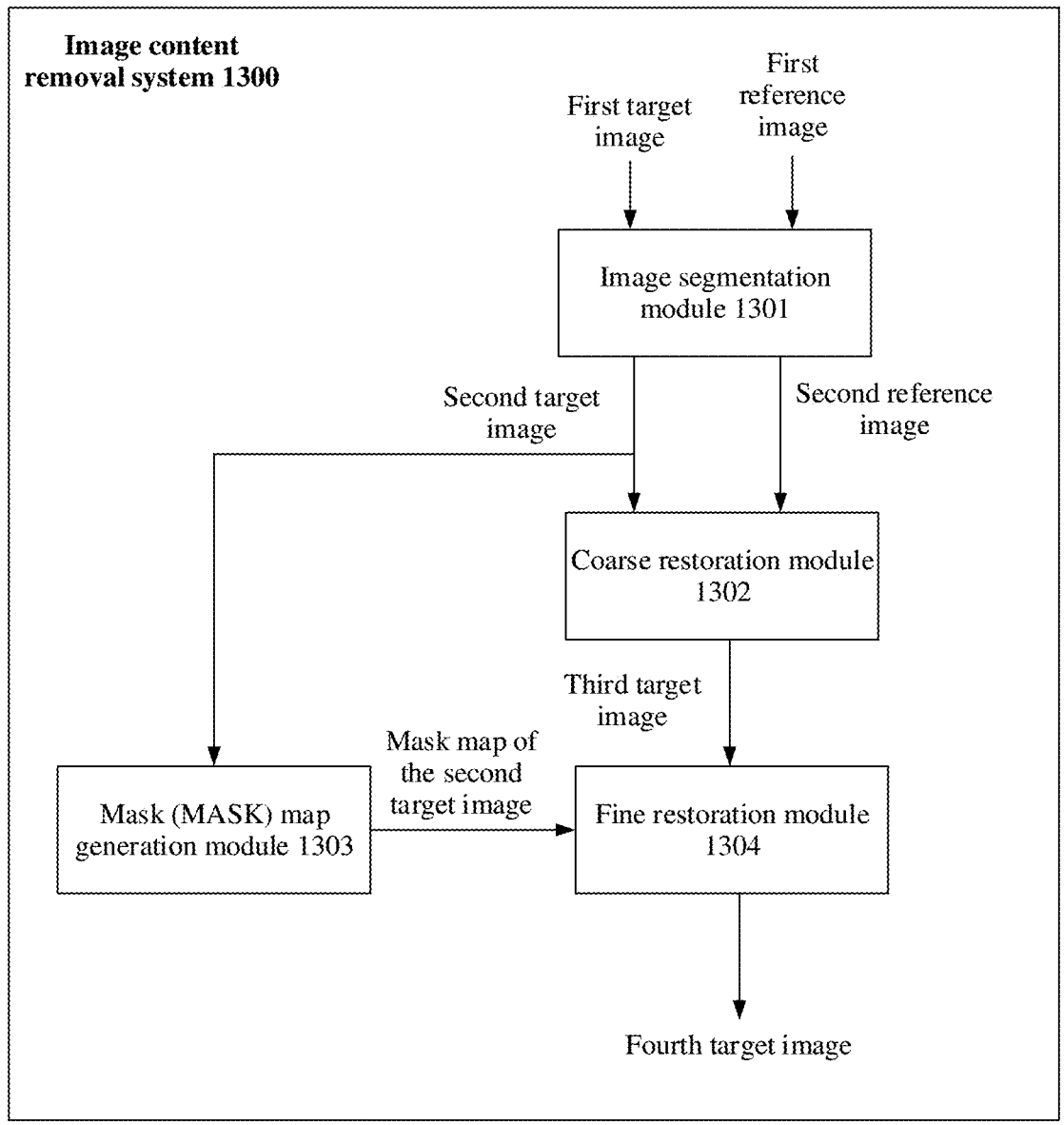
FIG. 13 is a schematic diagram of an architecture of an image content removal system according to an embodiment of this application.

FIG. 13 is a schematic diagram of an architecture of an image content removal system 1300 according to an embodiment of this application. The image content removal system 1300 may be used on the foregoing terminal 100.

As shown in FIG. 13, the image content removal system 1300 may include an image segmentation module 1301, a coarse restoration module 1302, a mask map generation module 1303, and a fine restoration module 1304.

The image segmentation module 1301 may be configured to segment a first area in which specified image content (for example, a selfie stick) is located from a first target image, to obtain a second target image. The segmentation module 1301 may be further configured to segment a second area in which specified image content (for example, a selfie stick) is located from a first reference image, to obtain a second reference image.

The coarse restoration module 1302 may be configured to: find, from the second reference image based on the second reference image, content that has a similar feature with content around the first area, and fill the first area of the second target image to generate a third target image. The feature includes a texture, a color, a shape, and the like.

The mask (mask) image generation module 1303 may be configured to generate a mask map of the second target image based on the second target image.

Specifically, the mask map generation module 1303 may be configured to convert a display color of the first area in the second target image into white, and convert a display color of an area other than the first area in the second target image into black.

The fine restoration module 1304 may be configured to generate a texture in the first area in the third target image through optimization based on the mask map of the second target image and the third target image, to obtain a fourth target image.

Figure 14A:
FIG. 14A is a schematic diagram of a first target image according to an embodiment of this application.
Figure 14B:
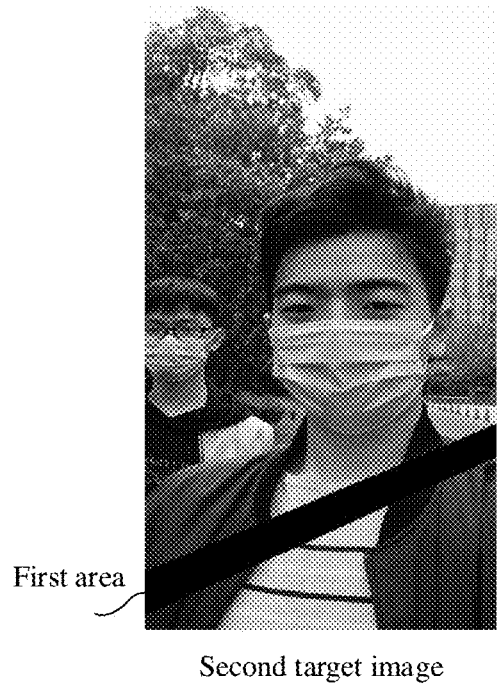
FIG. 14B is a schematic diagram of a second target image according to an embodiment of this application.
Figure 14C:
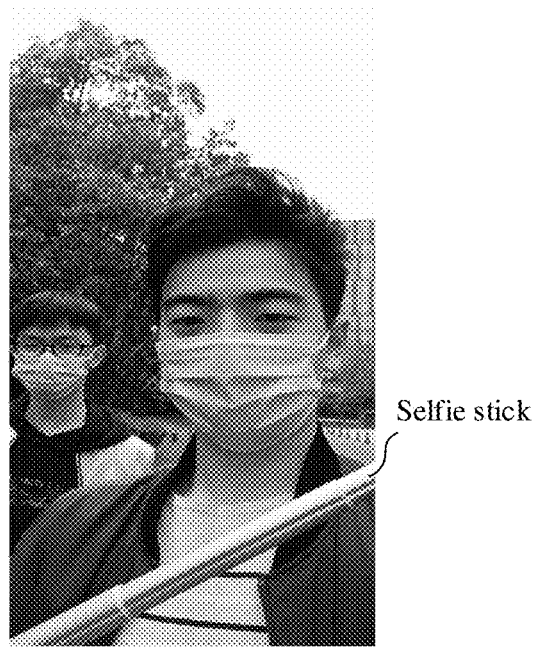
FIG. 14C is a schematic diagram of a first reference image according to an embodiment of this application.
Figure 14D:
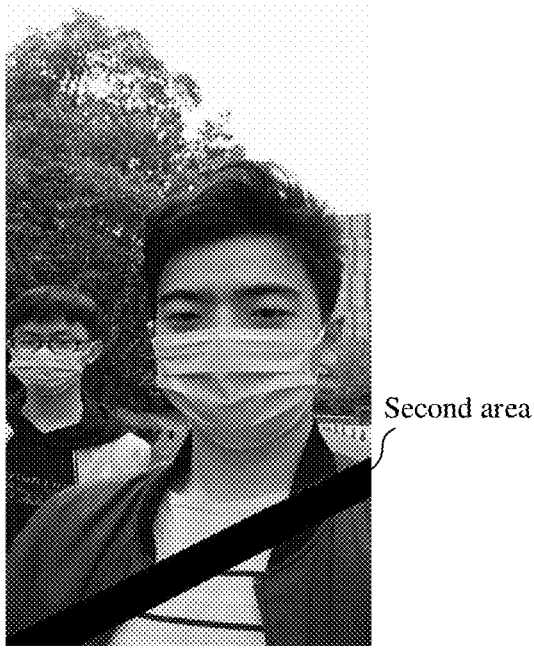
FIG. 14D is a schematic diagram of a second reference image according to an embodiment of this application.
Figure 14E:
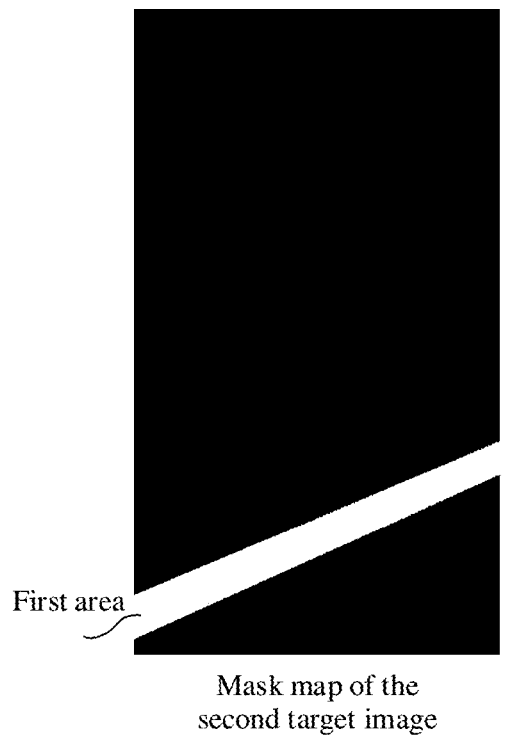
FIG. 14E is a mask map of a second target image according to an embodiment of this application.
Figure 14F:
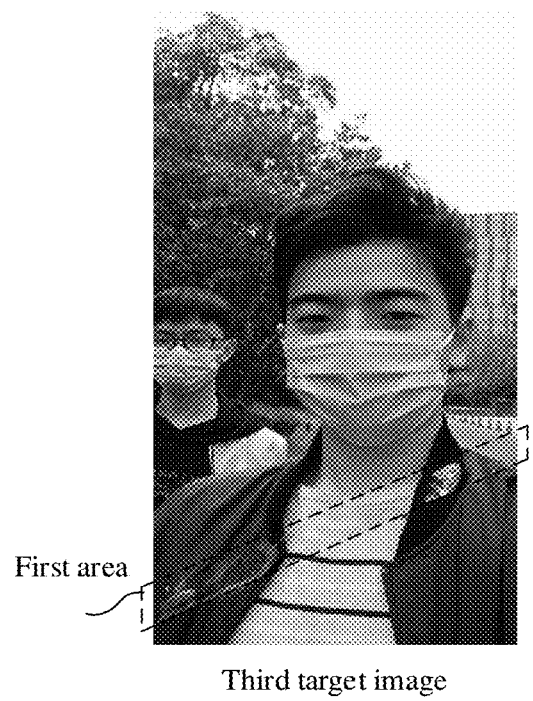
FIG. 14F is a schematic diagram of a third target image according to an embodiment of this application.
Figure 14G:
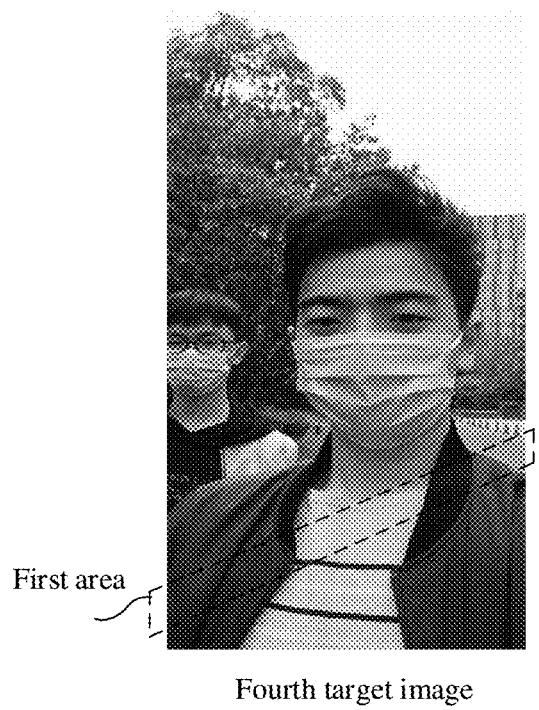
FIG. 14G is a schematic diagram of a fourth target image according to an embodiment of this application.

For example, as shown in FIG. 14A, a first target image includes a selfie stick. As shown in FIG. 14B, the selfie stick in a first area in a second target image is segmented off, and the first area may be filled with black. As shown in FIG. 14C, a first reference image includes a selfie stick. As shown in FIG. 14D, the selfie stick in a second area in a second reference image is segmented off, and the second area may be filled with black. As shown in FIG. 14E, the first area in a mask map of the second target image may be filled with white, and an area other than the first area in the mask map of the second target image may be filled with black. As shown in FIG. 14F, the first area in a third target image is filled with content that is determined from the second reference image and that has a similar feature with content around the first area. As shown in FIG. 14G, textures, edges, and details in the first area of a fourth target image are optimized.

The specified image content may be defaulted by a system of the terminal 100, or may be selected and input by a user. The specified image content may include one or more pieces of image content such as a selfie stick, a background person, and glasses.

The first target image may be a target frame picture captured by a camera of the terminal 100, and the first reference image may be an adjacent frame picture of the target frame picture. For example, the first target image may be the preview picture 324 shown in FIG. 3B, the preview picture 324 shown in FIG. 8A, or each frame of picture captured by the camera in the video recording process of the terminal 100 in FIG. 8B and FIG. 8C. For another example, the first target image may be the preview picture 324 captured by the camera of the terminal 100 when the terminal 100 receives an input of the user for the shooting control 322 in FIG. 7C.

In some embodiments, the first target image may alternatively be a picture stored in Gallery of the terminal 100, and the first reference image may be a burst picture of the stored picture. For example, the first target image is a picture corresponding to the thumbnail 921 shown in FIG. 9C, or a picture corresponding to the thumbnail 922 shown in FIG. 9C.

In some embodiments, the first target image may alternatively be any frame of picture in a video recording process of the terminal 100, and the first reference image may be an adjacent frame picture of the any frame of picture in the video recording process. For example, the first target image may be any frame of picture captured by the camera of the terminal 100 in the video recording process shown in FIG. 8B and FIG. 8C.

In some embodiments, the first target image may alternatively be any frame of picture in a video stored in the terminal 100, and the first reference image may be an adjacent frame picture of the any frame of picture in the video. For example, the first target image may be any frame of picture in the video 1221 shown in FIG. 12C.

Specifically, the image segmentation module 1301 may perform feature matching with the first target image based on pre-obtained feature information of the specified image content (for example, the selfie stick), determine, from the first target image, an area in which the specified image content is located in the first target image, and segment the area in which the specified image content is located from the first target image, to obtain the second target image. The image segmentation module 1301 may perform feature matching with the first reference image based on the pre-obtained feature information of the specified image content, determine, from the first reference image, an area in which the specified image content is located in the first reference image, and segment the area in which the specified image content is located from the first target image, to obtain the second reference image.

In a possible implementation, the image segmentation module 1301 may further identify, based on RGB information of the first target image and a trained segmentation neural network, a first area in which the specified image content (for example, the selfie stick) is located in the first target image, and segment the first area from the first target image, to obtain the second target image. The image segmentation module 1301 may further identify, based on RGB information of the first reference image and the trained segmentation neural network, a second area in which the specified image content (for example, the selfie stick) is located in the first reference image, and segment the second area from the first reference image, to obtain the second reference image.

In a possible implementation, the image segmentation module 1301 may further identify, based on RGB information, depth field information, and confidence level information of the first target image and a trained segmentation neural network, a first area in which the specified image content (for example, the selfie stick) is located in the first target image, and segment the area in which the specified image content is located from the first target image, to obtain the second target image. The image segmentation module 1301 may further identify, based on RGB information, depth field information, and confidence level information of the first reference image and the trained segmentation neural network, a second area in which the specified image content (for example, the selfie stick) is located in the first reference image, and segment the second area from the first reference image, to obtain the second reference image.

In a possible implementation, the image segmentation module 1301 may further identify, based on RGB information and thermal imaging information of the first target image and a trained segmentation neural network, a first area in which the specified image content (for example, the selfie stick) is located in the first target image, and segment the area in which the specified image content is located from the first target image, to obtain the second target image. The image segmentation module 1301 may further identify, based on RGB information and thermal imaging information of the first reference image and the trained segmentation neural network, a second area in which the specified image content (for example, the selfie stick) is located in the first reference image, and segment the second area from the first reference image, to obtain the second reference image.

When training the segmentation neural network, a training device may expand training data by adjusting an image contrast or the like, to increase richness of the training data, so that the segmentation neural network can better segment specified image content in an input picture when a photographing environment of the input picture changes sharply. A type of the segmentation neural network may be a convolutional neural network, for example, an SSD network or a faster-RCNN network.

In this embodiment of this application, the image content removal system 1300 may be used on the terminal 100.

In a possible implementation, the image content removal system 1300 may be used on a server. The terminal 100 may send a first target image and a first reference image to the server. The server may remove specified image content (for example, a selfie stick) from the first target image based on the first target image and the first reference image to obtain a fourth target image, and send the fourth target image to the terminal 100.

In a possible implementation, the image content removal system 1300 may be used on a server and the terminal 100. Some function modules of the image content removal system 1300 may be on the server, and the remaining function modules may be on the terminal 100. For example, the terminal 100 may include the image segmentation module 1301, and the server may include the coarse restoration module 1302, the mask map generation module 1303, and the fine restoration module 1304. After obtaining a first target image and a first reference image, the terminal 100 may segment, by using the image segmentation module 1301, a first area in which specified image content is located in the first target image to obtain a second target image, and segment a second area in which the specified image content is located in the first reference image to obtain a second reference image. Then, the terminal 100 sends the second target image and the second reference image to the server. The server may perform processing based on the second target image and the second reference image by using the coarse restoration module 1302, the mask map generation module 1303, and the fine restoration module 1304, to obtain a fourth target image, and send the fourth target image to the terminal 100. The examples are merely used to explain this application and shall not be construed as a limitation. In specific implementation, the function modules included in the image content removal system 1300 may alternatively be distributed on the server and the terminal 100 in another manner. Details are not described herein again.

The following describes an optical flow coarse restoration process in embodiments of this application.

Figure 15:
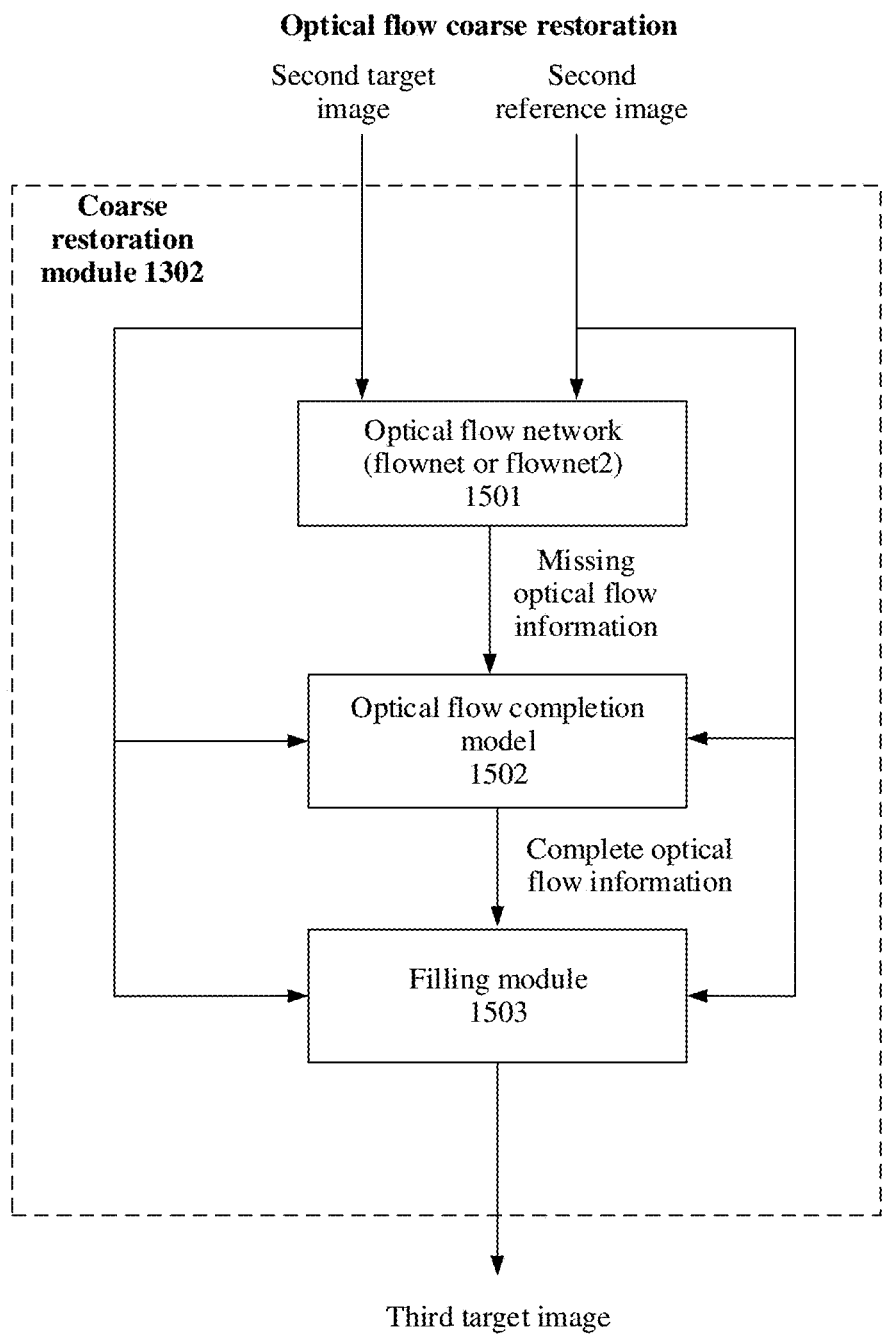
FIG. 15 is a schematic flowchart of optical flow coarse restoration according to an embodiment of this application.

FIG. 15 is a schematic diagram of a structure of a coarse restoration module 1302 according to an embodiment of this application.

As shown in FIG. 15, the coarse restoration module 1302 may include an optical flow network 1501, an optical flow completion model 1502, and a filling module 1503.

The optical flow network 1501 may be configured to calculate missing optical flow (optical flow) information between a second target image and a second reference image. The optical flow may be used to indicate an instantaneous speed of pixel motion of a moving object in the two images on an observation imaging plane.

The optical flow completion model 1502 may be configured to complete missing optical flow information between the second target image and the second target image based on the second reference image, to obtain complete optical flow information between the second target image and the second reference image.

The filling module 1503 may be configured to: determine, based on the complete optical flow information, to-be-filled pixel information that is of the second reference image and that needs to be filled in the first area of the second target image, and fill, with the to-be-filled pixel information, a pixel of the first area of the second target image, to obtain a third target image.

In this embodiment of this application, the optical flow network 1501 may be an optical flow network such as a flownet or a flownet2.

The following describes a multi-frame feature coarse restoration process in embodiments of this application.

Figure 16:
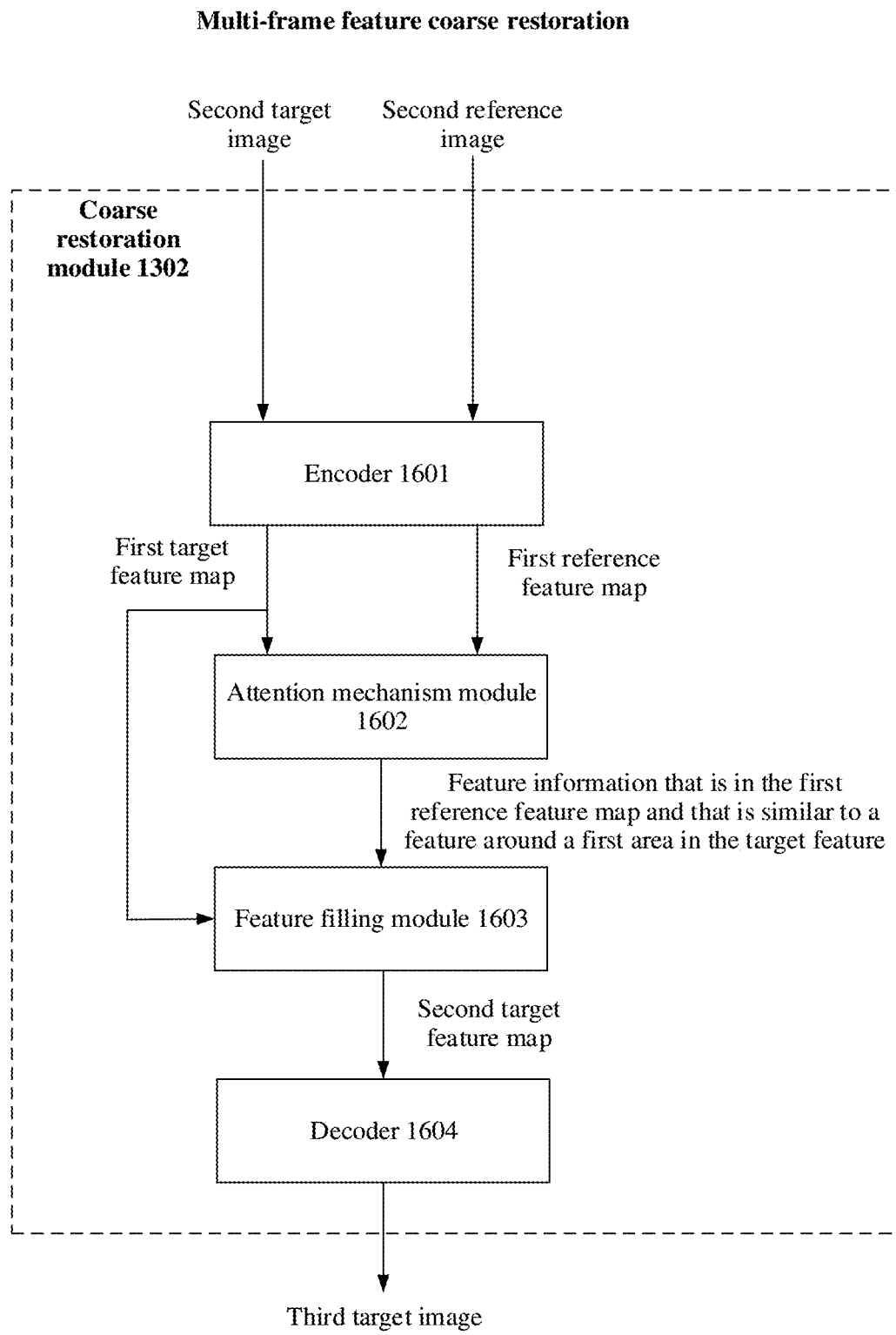
FIG. 16 is a schematic flowchart of multi-frame feature coarse restoration according to an embodiment of this application.

FIG. 16 is a schematic diagram of a structure of another coarse restoration module 1302 according to an embodiment of this application.

As shown in FIG. 16, the coarse restoration module 1302 may include an encoder 1601, an attention mechanism module 1602, a feature filling module 1603, and a decoder 1604.

Figure 17A:
FIG. 17A is a schematic diagram of a first target feature map according to an embodiment of this application.
Figure 17B:
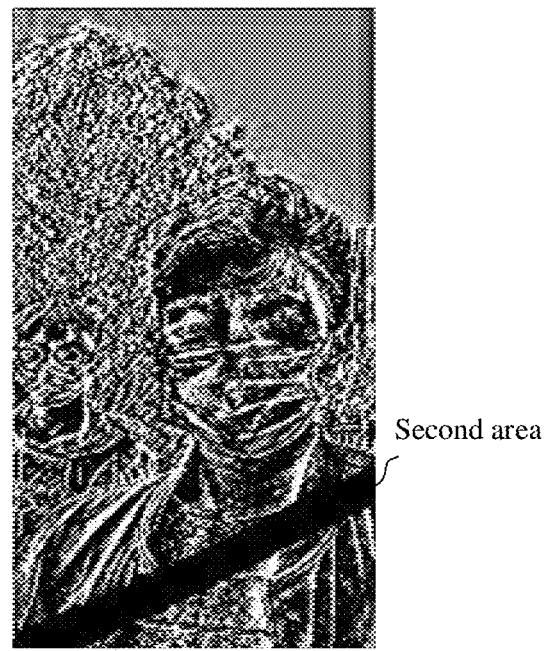
FIG. 17B is a schematic diagram of a first reference feature map according to an embodiment of this application.

The encoder 1601 may be configured to encode a second target image into a first target feature map, and encode a second reference image into a first reference feature map. For example, for the first target feature map, refer to FIG. 17A, and for the second target feature map, refer to FIG. 17B. The examples are merely used to explain this application and shall not be construed as a limitation.

The attention mechanism module 1602 may be configured to find, from the first reference feature map based on the first target feature map and the first reference feature map, feature information similar to a feature around a first area in the first target feature map. The feature information includes a texture, a color, a shape, and the like.

The feature filling module 1603 may be configured to fill the first area of the first target feature map with the feature information that is in the first reference feature map and that is similar to the feature around the first area in the first target feature map, to obtain a second target feature map.

The decoder 1604 may be configured to decode the second target feature map into a third target image.

The following describes a single-frame feature coarse restoration process in embodiments of this application.

Figure 18:
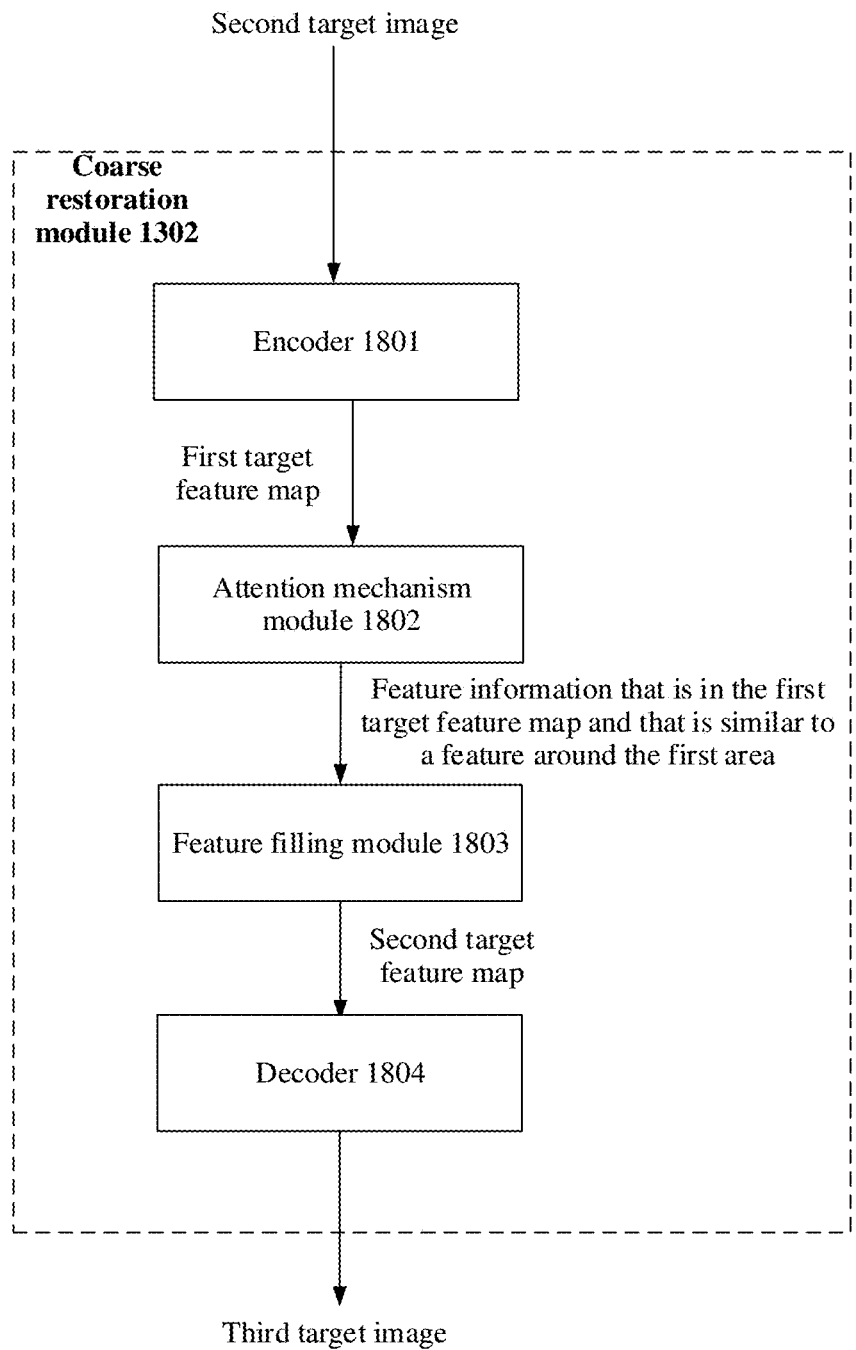
FIG. 18 is a schematic flowchart of single-frame feature coarse restoration according to an embodiment of this application.

FIG. 18 is a schematic diagram of a structure of another coarse restoration module 1302 according to an embodiment of this application.

As shown in FIG. 18, the coarse restoration module 1302 may include an encoder 1801, an attention mechanism module 1802, a feature filling module 1803, and a decoder 1804.

The encoder 1801 may be configured to encode a second target image into a first target feature map. For example, for the first target feature map, refer to FIG. 17A. The example is merely used to explain this application and shall not be construed as a limitation.

The attention mechanism module 1802 may be configured to find, from the first target feature map, feature information similar to a feature around a first area. The feature information includes a texture, a color, a shape, and the like.

The feature filling module 1803 may be configured to fill the first area of the first target feature map with the feature information that is in the first target feature map and that is similar to a feature around the first area, to obtain a second target feature map.

The decoder 1604 may be configured to decode the second target feature map into a third target image.

In this embodiment of this application, when the first target image is a target frame picture captured by a camera of the terminal 100, and the first reference image is an adjacent frame picture of the target frame picture, the image content removal system 1300 may further include a motion detection module 1305.

Figure 19:
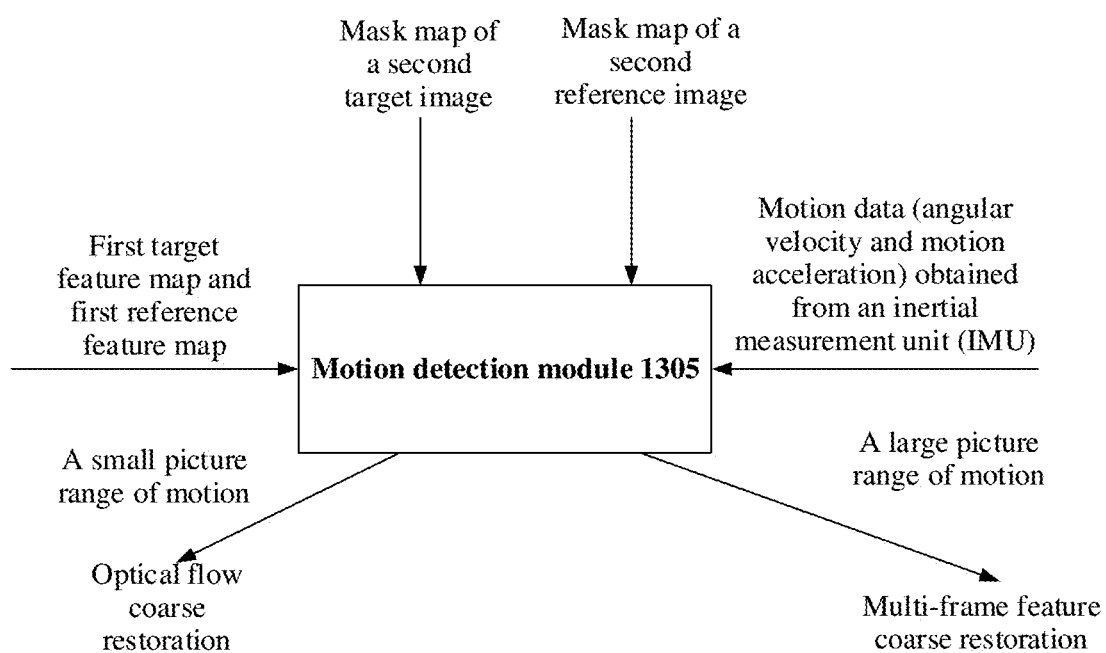
FIG. 19 is a schematic diagram of a coarse restoration procedure selection method according to an embodiment of this application.

As shown in FIG. 19, the motion detection module 1305 may be configured to determine, based on motion data obtained from an inertial measurement unit (inertial measurement unit, IMU) of the terminal 100, whether a picture shot by the terminal 100 experiences a large range of motion. If the picture shot by the terminal 100 experiences a large range of motion, the coarse restoration module 1302 may perform multi-frame coarse restoration on the second target image based on the second target image and the second reference image by using the structure shown in FIG. 16. If the picture shot by the terminal 100 does not experience a large range of motion, the coarse restoration module 1302 may perform optical flow coarse restoration on the second target image based on the second target image and the second reference image by using the structure shown in FIG. 15. The motion data includes angular velocity data and acceleration data of the terminal 100. For example, when an angular velocity in any one of angular velocities in three directions of the terminal 100 is greater than a specified angular velocity value, or an acceleration in any one of accelerations in three directions of the terminal 100 is greater than a specified acceleration value, the motion detection module 1305 may determine that a picture shot by the terminal 100 experiences a large range of motion. When the motion data is in another case, the motion detection module 1305 may determine that the picture shot by the terminal 100 experiences a small range of motion.

In a possible implementation, the motion detection module 1305 may be configured to determine, based on an intersection over union (intersection over union, IoU) between a mask map of the second target image and a mask map of the second reference image, whether a picture shot by the terminal 100 experiences a large range of motion. If the picture shot by the terminal 100 experiences a large range of motion, the coarse restoration module 1302 may perform multi-frame coarse restoration on the second target image based on the second target image and the second reference image by using the structure shown in FIG. 16. If the picture shot by the terminal 100 does not experience a large range of motion, the coarse restoration module 1302 may perform optical flow coarse restoration on the second target image based on the second target image and the second reference image by using the structure shown in FIG. 15. For example, when the intersection over union between the mask map of the second target image and the mask map of the second reference image is less than a specified intersection over union value, the motion detection module 1305 may determine that the picture shot by the terminal 100 experiences a large range of motion. When the intersection over union between the mask map of the second target image and the mask map of the second reference image is greater than or equal to the specified intersection over union value, the motion detection module 1305 may determine that the picture shot by the terminal 100 experiences a small range of motion.

In a possible implementation, the motion detection module 1305 may be configured to determine, based on a similarity between a first target feature map and a first reference feature map, whether a picture shot by the terminal 100 experiences a large range of motion. If the picture shot by the terminal 100 experiences a large range of motion, the coarse restoration module 1302 may perform multi-frame coarse restoration on the second target image based on the second target image and the second reference image by using the structure shown in FIG. 16. If the picture shot by the terminal 100 does not experience a large range of motion, the coarse restoration module 1302 may perform optical flow coarse restoration on the second target image based on the second target image and the second reference image by using the structure shown in FIG. 15. For example, when the similarity between the first target feature map and the first reference feature map is less than a specified similarity value, the motion detection module 1305 may determine that the picture shot by the terminal 100 experiences a large range of motion. When the similarity between the first target feature map and the first reference feature map is greater than or equal to the specified similarity value, the motion detection module 1305 may determine that the picture shot by the terminal 100 experiences a small range of motion.

In some embodiments, the motion detection module 1305 may be further determine, based on motion data obtained from the IMU of the terminal 100, an intersection over union between a mask map of the second target image and a mask map of the second reference image, and a similarity between a first target feature map and a first reference feature map, whether a picture shot by the terminal 100 experiences a large range of motion. If the picture shot by the terminal 100 experiences a large range of motion, the coarse restoration module 1302 may perform multi-frame coarse restoration on the second target image based on the second target image and the second reference image by using the structure shown in FIG. 16. If the picture shot by the terminal 100 does not experience a large range of motion, the coarse restoration module 1302 may perform optical flow coarse restoration on the second target image based on the second target image and the second reference image by using the structure shown in FIG. 15.

The following describes an image content removal method according to in an embodiment of this application.

Figure 20:
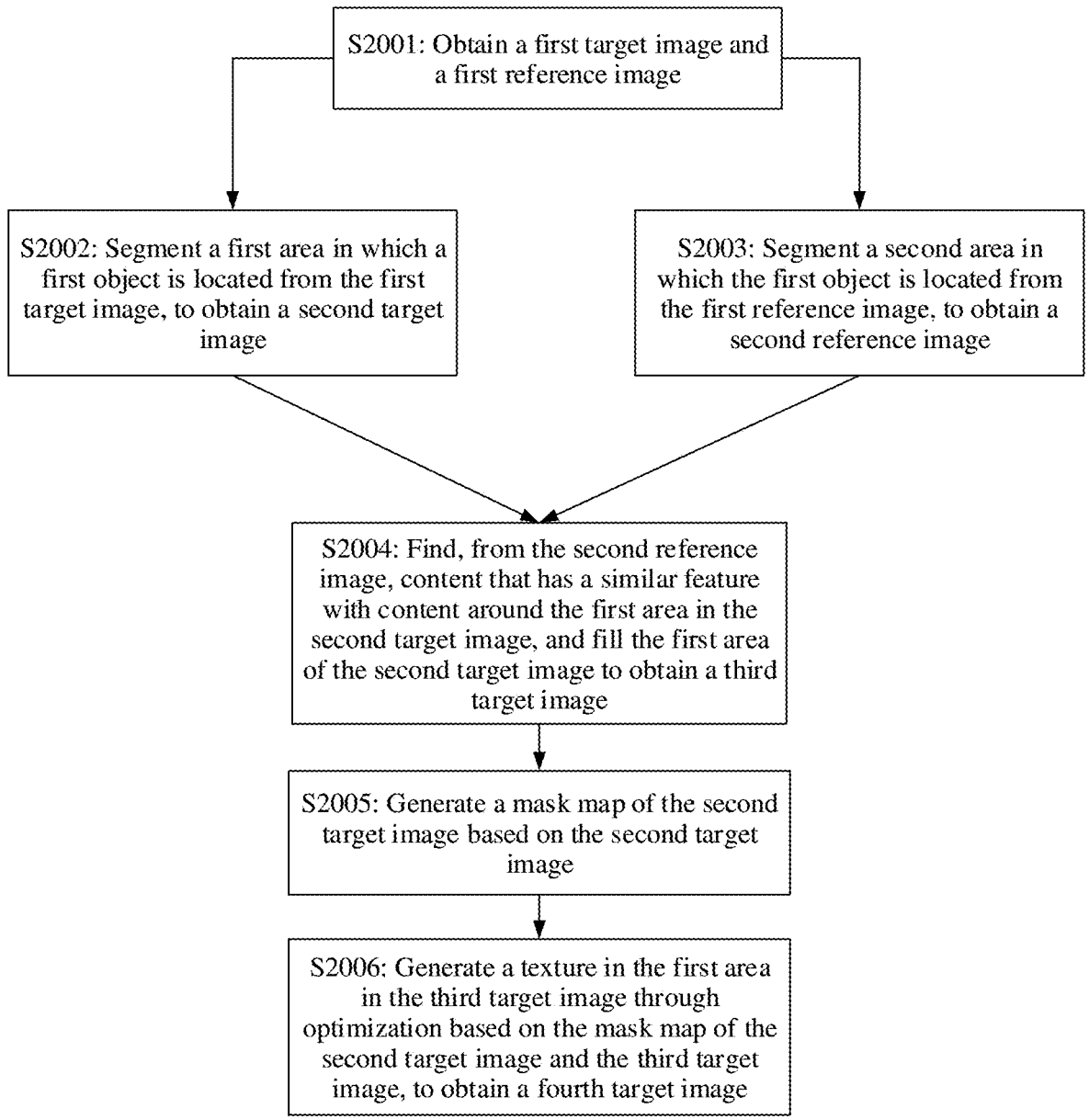
FIG. 20 is a schematic flowchart of an image content removal method according to an embodiment of this application.

FIG. 20 is a schematic flowchart of an image content removal method according to an embodiment of this application.

As shown in FIG. 20, the method includes the following steps.

S2001: The terminal 100 obtains a first target image and a first reference image. The first target image may be a first preview picture captured by a camera of the terminal 100, and the first reference image may be a first reference frame picture captured by the camera before or after the camera captures the first preview picture. Both the first preview picture and the first reference frame picture include image content of a first object and image content of a second object, and in the first preview picture, the image content of the first object shields a partial image of the second object.

For example, the first preview picture may be the preview picture 324 shown in FIG. 3B, the preview picture 324 shown in FIG. 8A, or each frame of picture captured by the camera in the video recording process of the terminal 100 in FIG. 8B and FIG. 8C. For another example, the first preview picture may be the preview picture 324 captured by the camera of the terminal 100 when the terminal 100 receives an input of a user for the shooting control 322 in FIG. 7C.

In some embodiments, the first target image may alternatively be a picture stored in Gallery of the terminal 100, and the first reference image may be a burst picture of the stored picture. For example, the first target image is a picture corresponding to the thumbnail 921 shown in FIG. 9C, or a picture corresponding to the thumbnail 922 shown in FIG. 9C.

In some embodiments, the first target image may alternatively be any frame of picture in a video recording process of the terminal 100, and the first reference image may be an adjacent frame picture of the any frame of picture in the video recording process. For example, the first target image may be any frame of picture captured by the camera of the terminal 100 in the video recording process shown in FIG. 8B and FIG. 8C.

In some embodiments, the first target image may alternatively be any frame of picture in a video stored in the terminal 100, and the first reference image may be an adjacent frame picture of the any frame of picture in the video. For example, the first target image may be any frame of picture in the video 1221 shown in FIG. 12C.

For details, refer to the embodiment shown in FIG. 13.

S2002: The terminal 100 segments a first area in which the first object is located from the first target image, to obtain a second target image.

S2003: The terminal 100 segments a second area in which the first object is located from the first reference image, to obtain a second reference image.

That the first object is used as a to-be-removed object may be defaulted by a system of the terminal 100, or may be selected and input by the user. The first object may include one or more pieces of image content such as a selfie stick, a background person, and glasses. The first object is the specified image content in the foregoing embodiment. For details, refer to the foregoing embodiments. Details are not described herein again.

The terminal 100 performs feature matching with the first target image based on pre-obtained feature information of the first object (for example, the selfie stick), determines, from the first target image, an area in which the first object is located in the first target image, and segments the area in which the first object is located from the first target image, to obtain the second target image. The terminal 100 may perform feature matching with the first reference image based on the pre-obtained feature information of the first object, determine, from the first reference image, an area in which the first object is located in the first reference image, and segment the area in which the first object is located from the first target image, to obtain the second reference image.

In a possible implementation, the terminal 100 may identify, based on RGB information of the first target image and a trained segmentation neural network, a first area in which the first object (for example, the selfie stick) is located in the first target image, and segment the first area from the first target image, to obtain the second target image. The terminal 100 may identify, based on RGB information of the first reference image and the trained segmentation neural network, a second area in which the first object (for example, the selfie stick) is located in the first reference image, and segment the second area from the first reference image, to obtain the second reference image.

In a possible implementation, the terminal 100 may identify, based on RGB information, depth field information, and confidence level information of the first target image and a trained segmentation neural network, a first area in which the first object (for example, the selfie stick) is located in the first target image, and segment the area in which the first object is located from the first target image, to obtain the second target image. The terminal 100 may identify, based on RGB information, depth field information, and confidence level information of the first reference image and the trained segmentation neural network, a second area in which the first object (for example, the selfie stick) is located in the first reference image, and segment the second area from the first reference image, to obtain the second reference image.

In a possible implementation, the terminal 100 may identify, based on RGB information and thermal imaging information of the first target image and a trained segmentation neural network, a first area in which the first object (for example, the selfie stick) is located in the first target image, and segment the area in which the first object is located from the first target image, to obtain the second target image. The terminal 100 may identify, based on RGB information and thermal imaging information of the first reference image and the trained segmentation neural network, a second area in which the first object (for example, the selfie stick) is located in the first reference image, and segment the second area from the first reference image, to obtain the second reference image.

For details, refer to the embodiment shown in FIG. 13.

S2004: The terminal 100 finds, from the second reference image, content that has a similar feature with content around the first area in the second target image, and fills the first area of the second target image to obtain a third target image.

In a possible implementation, the terminal 100 may perform optical flow coarse restoration on the second target image based on the second target image and the second reference image.

Specifically, the terminal 100 may calculate missing optical flow information in the second target image and the second reference image by using the optical flow network. Then, the terminal 100 may complete missing optical flow information in the second target image based on the second reference image and an optical flow completion model, to obtain complete optical flow information between the second target image and the second reference image. Then, the terminal 100 may determine, based on the complete optical flow information, to-be-filled pixel information that is of the second reference image and that needs to be filled in the first area of the second target image, and fill, with the to-be-filled pixel information, a pixel of the first area of the second target image, to obtain the third target image.

In a possible implementation, the terminal 100 may perform multi-frame feature coarse restoration on the second target image based on the second target image and the second reference image.

Specifically, the terminal 100 may encode the second target image into a first target feature map, and encode the second reference image into a first reference feature map. The terminal 100 may find, from the first reference feature map based on the first target feature map and the first reference feature map, feature information similar to a feature around the first area in the first target feature map. The feature information includes a texture, a color, a shape, and the like. Then, the terminal 100 may fill the first area of the first target feature map with the feature information that is of the first reference feature map and that is similar to the feature around the first area in the first target feature map, to obtain a second target feature map. Then, the terminal 100 may decode the second target feature map into the third target image.

In a possible implementation, the terminal 100 may perform single-frame feature coarse restoration on the second target image based on the second target image.

Specifically, the terminal 100 may encode the second target image into a first target feature map. Then, the terminal 100 may find, from the first target feature map, feature information similar to a feature around the first area. Then, the terminal 100 may fill the first area of the first target feature map with the feature information that is of the first target feature map and that is similar to the feature around the first area, to obtain a second target feature map. Then, the terminal 100 may decode the second target feature map into the third target image.

For details, refer to the embodiments shown in FIG. 13, FIG. 15, FIG. 16, and FIG. 18.

S2005: The terminal 100 generates a mask map of the second target image based on the second target image.

For details, refer to the embodiment shown in FIG. 13. Details are not described herein again.

S2006: The terminal 100 generates a texture in the first area in the third target image through optimization based on the mask map of the second target image and the third target image, to obtain a fourth target image.

After the terminal 100 obtains the fourth target image, the terminal 100 may use the fourth target image as a first restored picture, and display the first restored picture. For example, when the first target image is the first preview picture captured by the camera, the terminal 100 may display, on a Camera interface, the fourth target image as a preview picture obtained after the first object is removed. For another example, when the first target image is the stored picture, the terminal 100 may display the fourth target image in a picture preview interface.

In some embodiments, the terminal 100 may not perform step S2006, and directly use the third target image as the first restored picture, and display the first restored picture.

For details, refer to the foregoing embodiments. Details are not described herein again.

In some embodiments, the terminal 100 may remove the first object from consecutive frames of pictures. For example, after enabling Camera, the terminal 100 may remove the first object (for example, the selfie stick) from each frame of picture captured by the camera. The terminal 100 may remove the first object from the first two frames of pictures based on the first two frames of pictures and the image content removal procedure in the embodiments shown in FIG. 13 and the like. When the terminal 100 removes the first object from the third frame of picture and the subsequent frame of picture, the terminal 100 may infer a position of the first object in the third frame of picture or the subsequent frame of picture based on a motion speed of the terminal 100, a rotation angle of the terminal 100, and a position of the first object in the first frame of picture. Then, the terminal 100 determines, from the first frame of picture based on the position of the first object in the third frame of picture or the subsequent frame of picture, to-be-filled content of the position of the first object in the third frame of picture or the subsequent frame of picture. Then, the terminal 100 may replace the first object in the third frame of picture or the subsequent frame of picture with the determined to-be-filled content, and fill the determined to-be-filled content in the position of the first object in the third frame of picture or the subsequent frame of picture. In this way, processing time can be reduced for removing the first object in the consecutive frames of pictures.

In a possible implementation, when the terminal boo determines, based on the motion speed of the terminal 100 and the rotation angle of the terminal 100, that the position of the first object in the third frame of picture or the subsequent frame of picture does not change, the terminal 100 may directly replace the first object in the third frame of picture or the subsequent frame of picture with the filled content in the first frame of picture, and fill the position of the first object in the third frame of picture or the subsequent frame of picture with the filled content in the first frame of picture.

In some embodiments, the terminal 100 may remove the first object from consecutive frames of pictures. For example, after enabling Camera, the terminal 100 may remove the first object (for example, the selfie stick) from each frame of picture captured by the camera. For another example, the terminal 100 may remove the first object from each frame of picture of the stored video. The terminal 100 may skip a frame to remove the first object from a frame of picture, and then copy and insert, between two frames of pictures from which the first object is removed, a frame of picture obtained after the first object is removed. In this way, processing time can be reduced for removing the first object in the consecutive frames of pictures.

For example, a video whose duration is is may include 60 frames of pictures. All the 60 frames of pictures may include a selfie stick. When removing the selfie stick from the 60 frames of pictures, the terminal 100 may skip frames to remove the selfie stick in the $1^{st}$ frame of picture, the $11^{th}$ frame of picture, the $21^{st}$ frame of picture, the $31^{st}$ frame of picture, the $41^{st}$ frame of picture, and the $51^{st}$ frame of picture. Then, the terminal 100 may copy a $1^{st}$ frame of picture obtained after the selfie stick is removed, to obtain 10 frames of pictures, and use the 10 frames of pictures as the $1^{st}$ to the $10^{th}$ frames of pictures of a video obtained after the selfie stick is removed. The terminal 100 may copy an $11^{th}$ frame of picture obtained after the selfie stick is removed, to obtain 10 frames of pictures, and use the 10 frames of pictures as the $11^{th}$ to the $10^{th}$ frames of pictures of the video obtained after the selfie stick is removed. The terminal 100 may copy a $21^{st}$ frame of picture obtained after the selfie stick is removed, to obtain 10 frames of pictures, and use the 10 frames of pictures as the $21^{st}$ to the $30^{th}$ frames of pictures of the video obtained after the selfie stick is removed. The terminal 100 may copy a $31^{st}$ frame of picture obtained after the selfie stick is removed, to obtain 10 frames of pictures, and use the 10 frames of pictures as the $31^{st}$ to the $40^{th}$ frames of pictures of the video obtained after the selfie stick is removed. The terminal boo may copy a $41^{st}$ frame of picture obtained after the selfie stick is removed, to obtain 10 frames of pictures, and use the 10 frames of pictures as the $41^{st}$ to the $50^{th}$ frames of pictures of the video obtained after the selfie stick is removed. The terminal 100 may copy a $51^{st}$ frame of picture obtained after the selfie stick is removed, to obtain 10 frames of pictures, and use the 10 frames of pictures as the $51^{st}$ to the $60^{th}$ frames of pictures of the video obtained after the selfie stick is removed.

According to the image content removal method provided in embodiments of this application, the image content (for example, the selfie stick) that a user does not want can be removed from the picture or the video shot by the user on the terminal having no special camera. This improves a display effect of image content that the user wants in the picture or the video, and improves user experience.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method, comprising:
   enabling, by a terminal, a camera application;
   displaying, by the terminal, a photographing preview interface of the camera application;
   obtaining, by the terminal, a first preview picture and a first reference frame picture that are captured by a camera, wherein both the first preview picture and the first reference frame picture comprise image content of a first object and image content of a second object, and in the first preview picture, the image content of the first object shields a partial image of the second object;
   determining, by the terminal, the first object in the first preview picture as a to-be-removed object from the first preview picture;
   determining, by the terminal, to-be-filled content in the first preview picture based on the first reference frame picture, the to-be-filled content being image content that is of the second object and that is shielded by the first object in the first preview picture;
   generating, by the terminal, a first restored picture of the first preview picture based on the to-be-filled content and the first preview picture, wherein in the first restored picture, the image content of the first object is replaced with content of the partial image of the second object that is shielded by the image content of the first object;
   displaying, by the terminal, the first restored picture in the photographing preview interface; and
   displaying, by the terminal, a removal disabling control in the photographing preview interface, the removal disabling control being configured for a user to control to cancel replacing the image content of the first object.

2. The method according to claim 1, wherein after displaying, by the terminal, the removal disabling control, the method further comprises:

receiving, by the terminal, a first input of the user for the removal disabling control;

in response to the first input, obtaining, by the terminal, a second preview picture captured by the camera; and displaying, by the terminal, the second preview picture in the photographing preview interface.

3. The method according to claim 1, wherein before obtaining, by the terminal, the first preview picture and the first reference frame picture that are captured by the camera, the method further comprises:

displaying, by the terminal, a third preview picture in the photographing preview interface;

displaying, by the terminal, a removal confirmation control after identifying that the third preview picture comprises the to-be-removed object, the removal confirmation control being configured for a user to confirm to remove the to-be-removed object; and receiving, by the terminal, a second input of the user for the removal confirmation control; and wherein obtaining, by the terminal, the first preview picture and the first reference frame picture that are captured by the camera comprises:

in response to the second input, obtaining, by the terminal, the first preview picture and the first reference frame picture that are captured by the camera.

4. The method according to claim 3, further comprising:

in response to the second input, displaying, by the terminal, a countdown for specified duration in the photographing preview interface.

5. The method according to claim 1, wherein before displaying, by the terminal, the first restored picture in the photographing preview interface, the method further comprises:

displaying, by the terminal, a third preview picture in the photographing preview interface; and receiving, by the terminal, a tap operation performed by a user on the third preview picture; and determining, by the terminal, the first object in the first preview picture as the to-be-removed object comprises:

in response to the tap operation, identifying, by the terminal, a tap position of the tap operation on the third preview picture; and determining, by the terminal, the first object as the to-be-removed object based on image content at the tap position in the third preview picture.

6. The method according to claim 1, wherein before displaying, by the terminal, the first restored picture in the photographing preview interface, the method further comprises:

displaying, by the terminal, a third preview picture in photographing preview interface of the camera application;

identifying, by the terminal, image content of one or more removable objects in the third preview picture, and displaying a removal control corresponding to each of the one or more removable objects; and receiving, by the terminal, a fourth input of a user for the removal control corresponding to a first removable object of the one or more removable objects; and determining, by the terminal, the first object in the first preview picture as the to-be-removed object comprises:

in response to the fourth input, determining, by the terminal, the first removable object as the to-be-removed object.

7. The method according to claim 1, wherein before obtaining, by the terminal, the first preview picture and the first reference frame picture that are captured by the camera, the method further comprises:

displaying, by the terminal, a first shooting mode control in the photographing preview interface; and receiving, by the terminal, a fifth input of a user for the first shooting mode control; and obtaining, by the terminal, the first preview picture and the first reference frame picture that are captured by the camera comprises:

in response to the fifth input, obtaining, by the terminal, the first preview picture and the first reference frame picture that are captured by the camera.

8. The method according to claim 1, wherein before obtaining, by the terminal, the first preview picture and the first reference frame picture that are captured by the camera, the method further comprises:

displaying, by the terminal, a picture shaking prompt when the terminal determines that a picture shot by the terminal experiences a large range of motion, the picture shaking prompt prompting that the picture shot by the terminal experiences the large range of motion.

9. The method according to claim 8, wherein that the terminal determines that the picture shot by the terminal experiences the large range of motion comprises:

obtaining, by the terminal, angular velocity data and acceleration data of the terminal using an inertial measurement unit; and when an angular velocity in a direction in the angular velocity data is greater than a specified angular velocity value, or an acceleration in a direction in the acceleration data is greater than a specified acceleration value, determining, by the terminal, that the picture shot by the terminal experiences the large range of motion.

10. The method according to claim 1, wherein before obtaining, by the terminal, the first preview picture and the first reference frame picture that are captured by the camera, the method further comprises:

displaying, by the terminal, a third preview picture in the photographing preview interface of the camera application; and displaying, by the terminal, a movement operation prompt when identifying that the third preview picture comprises specified image content, the movement operation prompt prompting a user to move the terminal in a specified direction; and wherein determining, by the terminal, the to-be-filled content in the first preview picture based on the first reference frame picture comprises:

when the terminal determines that a picture range of motion between the first preview picture and the first reference frame picture exceeds a specified threshold, determining, by the terminal, the to-be-filled content in the first preview picture based on the first reference frame picture.

11. The method according to claim 10, wherein that the terminal determines that the picture range of motion between the first preview picture and the first reference frame picture exceeds the specified threshold comprises:

generating, by the terminal, a first mask map after segmenting the first object from the first preview picture;

generating, by the terminal, a second mask map after segmenting the first object from the first reference frame picture; and calculating, by the terminal, an intersection over union between the first mask map and the second mask map, and when the intersection over union between the first mask map and the second mask map is less than a specified intersection over union value, determining, by the terminal, that the picture range of motion between the first preview picture and the first reference frame picture exceeds the specified threshold.

12. The method according to claim 10, wherein that the terminal determines that the picture range of motion between the first preview picture and the first reference frame picture exceeds the specified threshold comprises:
 identifying, by the terminal, the first object in the first preview picture, and segmenting, by the terminal, the first object from the first preview picture;
 identifying, by the terminal, the first object in the first reference frame picture, and segmenting, by the terminal, the first object from the first reference frame picture to obtain a second reference frame picture;
 encoding, by the terminal, the first preview picture with the first object being segmented into a first target feature map;
 encoding, by the terminal, the second reference frame picture into a first reference feature map; and
 calculating, by the terminal, a similarity between the first target feature map and the first reference feature map, and when the similarity between the first target feature map and the first reference feature map is less than a specified similarity value, determining, by the terminal, that the picture range of motion between the first preview picture and the first reference frame picture exceeds the specified threshold.

13. The method according to claim 1, wherein the method further comprises:
 receiving, by the terminal, a fifth input of a user; and
 locally saving, by the terminal, the first restored picture in response to the fifth input.

14. The method according to claim 1, wherein determining, by the terminal, the to-be-filled content in the first preview picture based on the first reference frame picture comprises:
 identifying, by the terminal, the first object in the first preview picture, and segmenting the first object from the first preview picture;
 identifying, by the terminal, the first object in the first reference frame picture, and segmenting the first object from the first reference frame picture to obtain a second reference frame picture;
 calculating, by the terminal, missing optical flow information between the second reference frame picture and the first preview picture with the first object being segmented;
 completing, by the terminal, the missing optical flow information based on the second reference frame picture and an optical flow completion model, to obtain complete optical flow information between the second reference frame picture and the first preview picture with the first object being segmented; and
 determining, by the terminal from the second reference frame picture based on the complete optical flow information, the to-be-filled content in the first preview picture.

15. The method according to claim 1, wherein determining, by the terminal, the to-be-filled content in the first preview picture based on the first reference frame picture comprises:
 identifying, by the terminal, the first object in the first preview picture, and segmenting, by the terminal, the first object from the first preview picture;
 identifying, by the terminal, the first object in the first reference frame picture, and segmenting the first object from the first reference frame picture to obtain a second reference frame picture;
 encoding, by the terminal, the first preview picture, with the first object being segmented, into a first target feature map;
 encoding, by the terminal, the second reference frame picture into a first reference feature map; and
 determining, by the terminal from the first reference feature map, a to-be-filled feature similar to a feature around a first area in the first target feature map; and
 wherein generating, by the terminal, the first restored picture based on the to-be-filled content and the first preview picture comprises:
  filling, by the terminal with the to-be-filled feature, an area in which the first object is located in the first target feature map, to obtain a second target feature map; and
  decoding, by the terminal, the second target feature map to obtain the first restored picture.

16. The method according to claim 1, wherein generating, by the terminal, the first restored picture based on the to-be-filled content and the first preview picture comprises:
 filling, by the terminal with the to-be-filled content, an area in which the first object is located in the first preview picture, to obtain a second restored picture; and
 generating, by the terminal, details and textures of a filled area in the second restored picture to obtain the first restored picture.

17. The method according to claim 1, wherein after determining, by the terminal, the to-be-filled content in the first preview picture based on the first reference frame picture, the method further comprises:
 obtaining, by the terminal, a fourth preview picture captured by the camera;
 obtaining, by the terminal, a motion angle and a rotation angle that are of the terminal and that are between a time point when the camera captures the first preview picture and a time point when the camera captures the fourth preview picture;
 determining, by the terminal based on the motion angle and the rotation angle that are of the terminal and an area in which the first object is located in the first preview picture, an area in which the first object is located in the fourth preview picture;
 segmenting, by the terminal, the first object from the fourth preview picture;
 determining, by the terminal from the first preview picture based on the area in which the first object is located in the fourth preview picture, to-be-filled content of the fourth preview picture;
 filling, by the terminal with the to-be-filled content of the fourth preview picture, the area in which the first object is located in the fourth preview picture, to obtain a second restored picture; and
 displaying, by the terminal, the second restored picture in the photographing preview interface.

18. The method according to claim 1, wherein the first object comprises a selfie stick or a background person.

19. A terminal, comprising a camera, one or more processors, and one or more non-transitory memories, wherein the one or more processors are coupled to the camera and the one or more memories, the one or more memories are configured to store computer program code, the computer program code comprises computer instructions, and when the one or more processors execute the computer instructions, the terminal is caused to:

enable a camera application;

display a photographing preview interface of the camera application;

obtain a first preview picture and a first reference frame picture that are captured by the camera, wherein both the first preview picture and the first reference frame picture comprise image content of a first object and image content of a second object, and in the first preview picture, the image content of the first object shields a partial image of the second object;

determine the first object in the first preview picture as a to-be-removed object from the first preview picture;

determine to-be-filled content in the first preview picture based on the first reference frame picture, the to-be-filled content being image content that is of the second object and that is shielded by the first object in the first preview picture;

generate a first restored picture of the first preview picture based on the to-be-filled content and the first preview picture, wherein in the first restored picture, the image content of the first object is replaced with content of the partial image of the second object that is shielded by the image content of the first object;

display the first restored picture in the photographing preview interface; and display a removal disabling control in the photographing preview interface, the removal disabling control being configured for a user to control to cancel replacing the image content of the first object.

* * * * *